(12) United States Patent
Joao

(10) Patent No.: US 10,861,020 B2
(45) Date of Patent: *Dec. 8, 2020

(54) TRANSACTION SECURITY APPARATUS AND METHOD

(71) Applicant: Raymond Anthony Joao, Yonkers, NY (US)

(72) Inventor: Raymond Anthony Joao, Yonkers, NY (US)

(73) Assignee: GTJ VENTURES, LLC, Yonkers, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,469

(22) Filed: Oct. 29, 2019

(65) Prior Publication Data
US 2020/0065823 A1     Feb. 27, 2020

Related U.S. Application Data

(63) Continuation of application No. 16/166,763, filed on Oct. 22, 2018, now Pat. No. 10,504,123, which is a
(Continued)

(51) Int. Cl.
*G06F 7/08* (2006.01)
*G07F 19/00* (2006.01)
(Continued)

(52) U.S. Cl.
CPC .......... *G06Q 20/425* (2013.01); *G06Q 20/10* (2013.01); *G06Q 20/32* (2013.01);
(Continued)

(58) Field of Classification Search
CPC ...... G06Q 20/10; G06Q 20/32; G06Q 20/322; G06Q 20/3276; G06Q 20/38;
(Continued)

(56) References Cited

U.S. PATENT DOCUMENTS 3,566,081 A    2/1971   Goldman
3,891,830 A    6/1975   Goldman
(Continued)

*Primary Examiner* — Steven S Paik
*Assistant Examiner* — April A Taylor
(74) *Attorney, Agent, or Firm* — Raymond A. Joao, Esq.

(57) ABSTRACT

An apparatus, including a transaction terminal, further comprising: an input device or a receiver, wherein the input device inputs or the receiver receives information regarding an account and transaction information regarding a transaction on or involving the account; a camera or a video recording device, wherein the camera or the video recording device obtains or records a photograph or a video clip of an individual involved in the transaction; a processor, wherein the processor processes the transaction information; and a computer, further comprising: a database, wherein the database stores information regarding the transaction and the photograph or the video clip of the individual involved in the transaction. The information regarding the transaction and the photograph or the video clip of the individual involved in the transaction is transmitted to a communication device independently of any processing of the transaction by a transaction authorization processing computer.

20 Claims, 22 Drawing Sheets

Related U.S. Application Data continuation of application No. 15/873,033, filed on Jan. 17, 2018, now Pat. No. 10,157,385, which is a continuation of application No. 12/925,057, filed on Oct. 13, 2010, now Pat. No. 9,911,124, which is a continuation-in-part of application No. 12/658,180, filed on Feb. 4, 2010, now Pat. No. 9,235,841, which is a continuation-in-part of application No. 11/482,430, filed on Jul. 7, 2006, now Pat. No. 9,245,270.

(60) Provisional application No. 60/701,770, filed on Jul. 22, 2005.

(51) Int. Cl.
| | |
|---|---|
| *G06K 5/00* | (2006.01) |
| *G06Q 20/42* | (2012.01) |
| *G06Q 20/10* | (2012.01) |
| *G06Q 20/32* | (2012.01) |
| *G06Q 20/38* | (2012.01) |
| *G06Q 20/40* | (2012.01) |
| *G06Q 40/08* | (2012.01) |

(52) U.S. Cl.
CPC ....... *G06Q 20/3276* (2013.01); *G06Q 20/389* (2013.01); *G06Q 20/40* (2013.01); *G06Q 40/08* (2013.01); *G07F 19/20* (2013.01)

(58) Field of Classification Search
CPC .... G06Q 20/382; G06Q 20/389; G06Q 20/40; G06Q 20/401; G06Q 20/4014; G06Q 20/40145; G06Q 20/4016; G06Q 20/42; G06Q 20/425
See application file for complete search history.

(56) References Cited

U.S. PATENT DOCUMENTS

| | | | |
|---|---|---|---|
| 4,554,418 A | 11/1985 | Toy | |
| 4,725,719 A | 2/1988 | Oncken et al. | |
| 4,823,264 A | 4/1989 | Deming | |
| 4,837,422 A | 6/1989 | Dethloff et al. | |
| 5,064,999 A | 11/1991 | Okamoto et al. | |
| 5,220,501 A | 6/1993 | Lawlor et al. | |
| 5,221,838 A | 6/1993 | Gutman et al. | |
| 5,231,569 A | 7/1993 | Myatt et al. | |
| 5,412,190 A | 5/1995 | Josephson et al. | |
| 5,500,513 A | 3/1996 | Langhans et al. | |
| 5,513,250 A | 4/1996 | McAllister | |
| 5,530,438 A * | 6/1996 | Bickham | G06Q 20/206 235/380 |
| 5,615,110 A | 3/1997 | Wong | |
| 5,708,422 A | 1/1998 | Blonder et al. | |
| 5,809,144 A | 9/1998 | Sirbu et al. | |
| 5,825,863 A | 10/1998 | Walker | |
| 5,845,260 A | 12/1998 | Nakano et al. | |
| 5,878,337 A | 3/1999 | Joao et al. | |
| 5,903,830 A | 5/1999 | Joao et al. | |
| 6,047,270 A | 4/2000 | Joao et al. | |
| 6,182,052 B1 | 1/2001 | Fulton et al. | |
| 6,529,725 B1 * | 3/2003 | Joao | G06Q 20/04 340/5.4 |
| 7,096,003 B2 | 8/2006 | Joao et al. | |
| 7,529,698 B2 | 5/2009 | Joao | |
| 7,661,585 B2 | 2/2010 | Joao | |
| 7,899,717 B2 * | 3/2011 | Joao | G06Q 10/02 705/26.41 |
| 9,117,206 B2 | 8/2015 | Joao | |
| 9,117,230 B2 | 8/2015 | Joao | |
| 9,235,841 B2 * | 1/2016 | Joao | G06Q 20/10 |
| 9,245,270 B2 * | 1/2016 | Joao | G06Q 20/32 |
| 9,715,691 B2 | 7/2017 | Joao | |
| 9,911,124 B2 * | 3/2018 | Joao | G06Q 20/10 |
| 10,157,385 B2 * | 12/2018 | Joao | G06Q 20/10 |
| 10,504,123 B2 | 12/2019 | Joao | |
| 2001/0051920 A1 | 12/2001 | Joao et al. | |
| 2002/0025797 A1 | 2/2002 | Joao et al. | |
| 2002/0046191 A1 | 4/2002 | Joao | |
| 2002/0095360 A1 | 7/2002 | Joao | |
| 2002/0169685 A1 | 11/2002 | Joao | |
| 2003/0149662 A1 * | 8/2003 | Shore | G06Q 20/04 705/39 |
| 2004/0107170 A1 * | 6/2004 | Labrou | G06Q 20/02 705/64 |
| 2004/0185830 A1 * | 9/2004 | Joao | G06Q 20/04 455/410 |
| 2005/0170814 A1 | 8/2005 | Joao et al. | |
| 2006/0031129 A1 | 2/2006 | Joao | |
| 2006/0131390 A1 * | 6/2006 | Kim | G06Q 20/24 235/380 |
| 2006/0248005 A1 * | 11/2006 | Moore | G06Q 20/10 705/39 |
| 2007/0017974 A1 | 1/2007 | Joao | |
| 2008/0120190 A1 | 5/2008 | Joao et al. | |
| 2008/0275820 A1 * | 11/2008 | Joao | G06Q 20/04 705/44 |
| 2009/0018937 A1 | 1/2009 | Joao | |
| 2009/0173781 A1 * | 7/2009 | Ramachandran | G06Q 20/042 235/379 |
| 2010/0106619 A1 | 4/2010 | Joao | |
| 2010/0138326 A1 | 6/2010 | Joao | |
| 2010/0145737 A1 | 6/2010 | Joao | |
| 2010/0274723 A1 | 10/2010 | Joao | |
| 2019/0057391 A1 | 2/2019 | Joao | G06Q 20/10 |

* cited by examiner

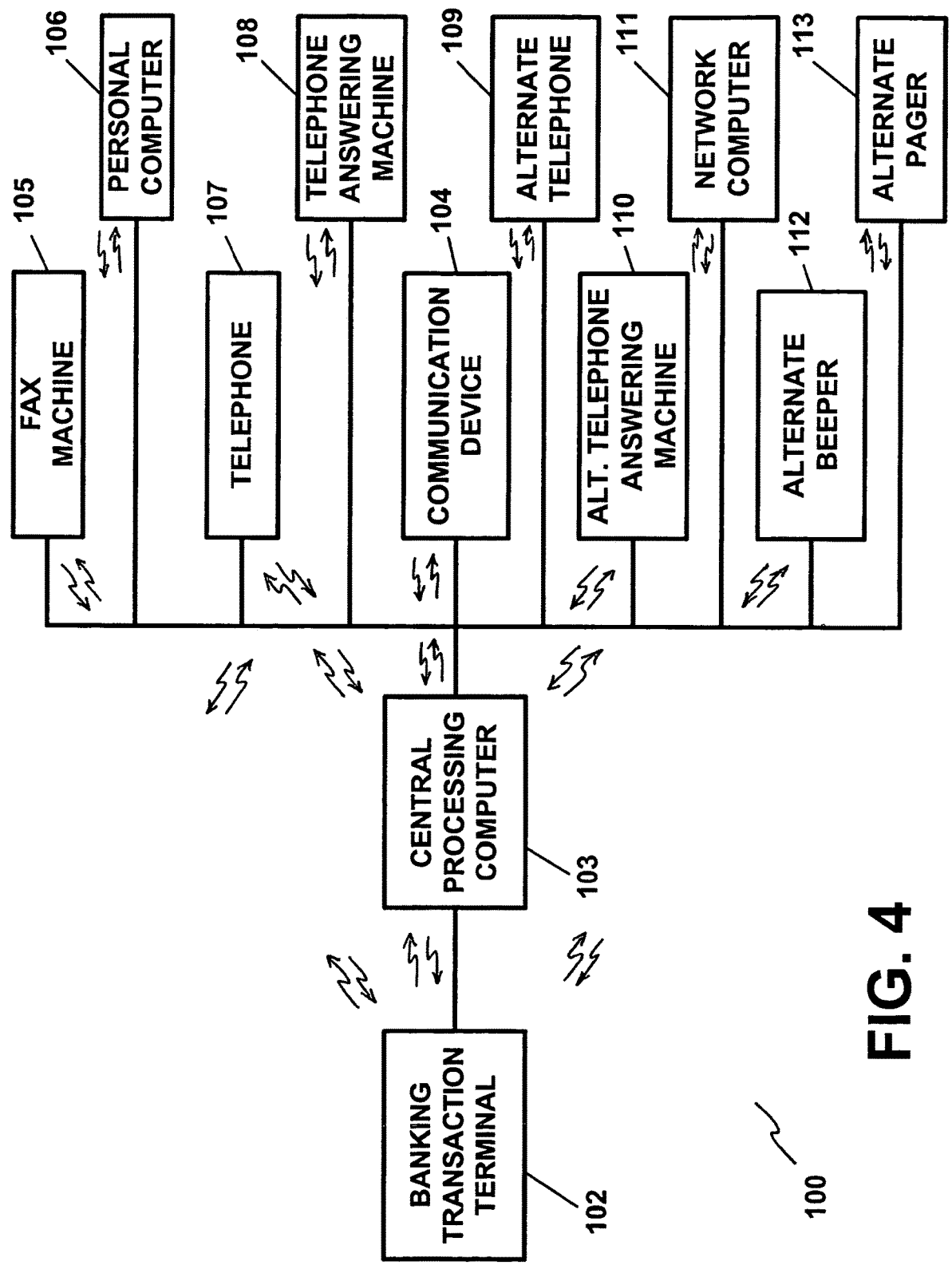

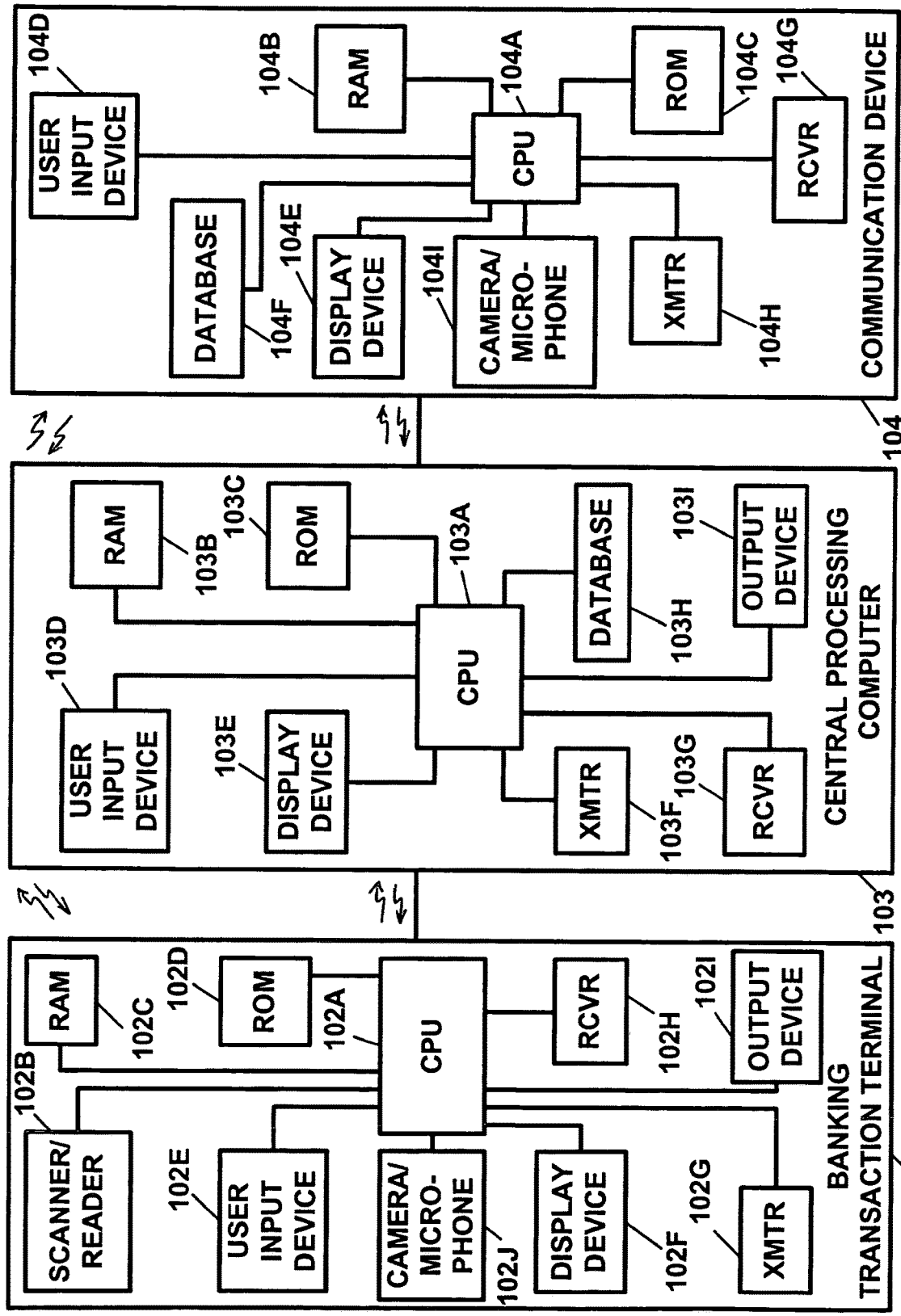

TRANSACTION SECURITY APPARATUS AND METHOD

RELATED APPLICATIONS

This application is a continuation application of U.S. patent application Ser. No. 16/166,763, filed Oct. 22, 2018, and entitled "TRANSACTION SECURITY APPARATUS AND METHOD", which application is a continuation application of U.S. patent application Ser. No. 15/873,033, filed Jan. 17, 2018, and entitled "TRANSACTION SECURITY APPARATUS AND METHOD", now U.S. Pat. No. 10,157,385, which application is a continuation application of U.S. patent application Ser. No. 12/925,057, filed Oct. 13, 2010, and entitled "TRANSACTION SECURITY APPARATUS AND METHOD", now U.S. Pat. No. 9,911,124, which application is a continuation-in-part application of U.S. patent application Ser. No. 12/658,180, filed Feb. 4, 2010, and entitled "TRANSACTION SECURITY APPARATUS AND METHOD", now U.S. Pat. No. 9,235,841, which application is a continuation-in-part application of U.S. patent application Ser. No. 11/482,430, filed Jul. 7, 2006, and entitled "TRANSACTION SECURITY APPARATUS AND METHOD", now U.S. Pat. No. 9,245,270, the subject matter and teachings of which applications are hereby incorporated by reference herein in their entirety. U.S. patent application Ser. No. 11/482,430, now U.S. Pat. No. 9,245,270, claims the benefit of the priority of U.S. Provisional Patent Application Ser. No. 60/701,770, filed Jul. 22, 2005, and entitled "TRANSACTION SECURITY APPARATUS AND METHOD", the subject matter and teachings of which is hereby incorporated by reference herein in its entirety.

FIELD OF THE INVENTION

The present invention pertains to a transaction security apparatus and method and/or to a financial transaction, an account transaction, and/or wireless communication device, authorization, notification and/or security apparatus and method, and, in particular to a financial transaction, an account transaction, and/or wireless communication device authorization, notification and/or security apparatus and method for use in providing authorization, notification and/or security in conjunction with credit card, charge card and/or debit card use, savings and/or checking account activity, and/or brokerage account activity, cellular telephone activity or use, or activity or use of or involving credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other accounts.

BACKGROUND OF THE INVENTION

Millions of individuals enjoy the convenience of utilizing credit cards, charge cards, debit cards, and/or currency or "smart" cards as a convenient way in which to purchase goods and/or services. By utilizing credit cards, charge cards, debit cards, and/or currency or "smart" cards, an individual may enter into a transaction without having to have cash or currency in hand or otherwise. In the case of credit cards, charge cards and debit cards, the individual, in effect obtains an instant loan of the funds needed to make a purchase and/or enter into a transaction. In the case of currency or "smart" cards, the individual may "store" an amount of money on the card(s) and, thereafter, utilize the card(s), instead of cash or currency, in order to make purchases and/or enter into transactions.

Millions of individuals also enjoy the benefits of having savings accounts, checking accounts and/or automated teller machine accounts which allow then to enjoy the security of saving their money in accounts which are usually insured and which allow them to, in some instances, earn interest on their money. In the case of checking accounts, individuals enjoy the convenience of writing checks and/or other transaction instruments which allow them to draw against their money without having to undergo the inconvenience of going to the bank or financial institution to withdraw their money, in currency form, and traveling to, in some cases, a distant location to either make a purchase, payment and/or to otherwise settle an account. In this regard, the ability to write checks, drafts and/or other instruments against an account is a very convenient manner in which to conduct transactions of any kind.

In the case of automated teller machines, individuals may conveniently withdraw and/or deposit money into a bank of other financial account.

Many individuals also enjoy the convenience of owning and/or using wireless, mobile or cellular telephones or devices as a means by which to make telephone calls when a conventional line or permanent telephone is not within reach and/or when the individual is "on the go", such as in an automobile, on foot, and/or in any other type of environment, such as away from home, when a conventional line or permanently fixed telephone is not available.

Unfortunately, with the convenience of each of the above credit cards, charge cards, debit cards, and/or currency or "smart" cards, savings accounts, checking accounts, automated teller machine accounts, and cellular telephones or cellular communications devices, comes many disadvantages and the opportunity for theft and/or fraud. In the case of credit cards, charge cards and/or debit cards, hundreds of millions, if not billions, of dollars a year are lost as a result of the theft of, and/or the fraudulent use of, credit cards, charge cards and/or debit cards, or the account numbers which correspond thereto.

A lost or stolen card may be utilized by an unauthorized individual to spend upwards of thousands of dollars before the unauthorized use is detected and/or before the cardholder can ascertain, and/or be notified, either by the card issuer or servicing institution or when the cardholder detects the unauthorized transaction on his or her monthly account statement, that the card is lost or stolen. Similarly, even in the absence of the physical card, an unauthorized individual may utilize the account number which corresponds to the card in order to make certain transactions.

While card holders are usually protected by various coverages which shield them from the liabilities associated with the fraudulent use of a card or the corresponding account number, the card issuers, credit, charge and/or debit card issuing companies and/or institutions, and/or their insurance companies, end up paying for the above described thefts and/or fraudulent and/or unauthorized uses. Ultimately, the consumer also shoulders the burden of the costs associated with these thefts and/or fraudulent and/or unauthorized uses in the form of increased prices.

While authorization terminals and/or devices are utilized at a point-of-sale and/or at the vendor's, the seller's, or the service provider's, location, these authorization terminals and/or devices typically are utilized to obtain an authorization from the card issuer or account servicing institution which, usually entails a screening of whether the card has been lost, stolen, cancelled, de-activated and/or whether the cardholder has exceeded and/or will exceed his or her credit limit. This current authorization practice fails to prevent the use of a lost or stolen card, or the unauthorized use of either the card or the account number corresponding thereof, if the card has not been reported, and/or discovered, to be lost, stolen or used without authorization and/or if the account credit limit has not yet been reached.

Current practices do not entail and/or do not include the provision for obtaining an authorization, and/or for providing notice to the cardholder before, during and/or shortly after a transaction, which cardholder authorization and/or notification procedure would be helpful and prove to be essential in preventing the fraudulent use and/or unauthorized use of a card and/or the account number corresponding thereto in a unauthorized transaction and/or shortly thereafter an unauthorized transaction has occurred, thereby minimizing the fraudulent and/or unauthorized use of the card and/or the account number corresponding thereto.

In the case of currency or "smart" cards, which typically may serve as bearer instruments, the monetary credit on these cards may be completely depleted before the card owner even discovers same to be lost or stolen. In the case of savings accounts, checking accounts, and/or automated teller machine accounts, these accounts may be accessed, and funds can be withdrawn, without the account owner's notification and/or knowledge. In the case of savings accounts and checking accounts, these accounts may be accessed, and/or funds may be withdrawn therefrom, when checks drawn on insufficient funds are returned, and/or when the account number is inadvertently and/or fraudulently utilized in an endorsement, or otherwise, by an individual attempting to cash or perform a transaction with a fraudulent instrument, a forged instrument and/or an otherwise "bad" check. In these instances, the accounts and/or funds involved are usually accessed, invaded, and/or withdrawn from the account involved without the account owner being notified and/or having a say in the matter.

The account owner is typically notified of the above-described activity involving his or her account days later when he or she either receives a mailed notice and/or when they receive and review their monthly or periodic statement, which notice may be received at a time when it may be too late for the account owner to stop or reverse the transaction and/or, in the case of a check or draft returned for insufficient funds, at a time which is too late for the account owner to attempt to collect the funds. In the case of automated teller machine accounts, these accounts may be accessed, such as with a lost, stolen, or counterfeit card and/or with a card account number(s) and/or associated personal identification number(s), by a thief or by any other unauthorized person who could then make an unauthorized withdrawal(s) therefrom.

Once again, the account owner would not receive notification and/or have knowledge of the unauthorized transaction until they are notified by the bank or financial institution either via a monthly and/or periodic statement, and/or when they attempt a transaction at the automated teller machine and, at that time, discover that funds are missing and/or have been withdrawn. In the case of savings accounts, checking accounts and/or automated teller machine accounts, there is no present apparatus or method by which to provide notification to an account owner at the time of the unauthorized transaction and/or account activity and/or shortly thereafter same.

In the case of cellular telephones, recent practices involving "cloning" cellular telephones, which entails intercepting telephone transmissions from a cellular telephone, which transmissions contain the phone number of the transmitting phone and/or the associated personal identification number (PIN), and utilizing the intercepted information to program a different cellular phone which by then be utilized in conjunction with the account of the "cloned" cellular telephone, has also resulted in widespread theft and fraudulent use of cellular telephones and/or cellular communications devices The "cloned" telephones are typically sold on the "black" market. In these instances, the cellular telephone owner has no way of knowing whether, or when, his or her cellular transmissions are being intercepted and/or if and when a "cloned" cellular phone is created and/or is utilized on, or over, his or her cellular telephone account.

Typically, the cellular telephone owner first becomes aware of the unauthorized usage of his or her cellular telephone account when he or she receives their telephone account statement. Once again, in the time between the "cloning" of the cellular telephone and the discovery of same, hundreds, if not thousands, of dollars worth of cellular telephone calls may have been made before the unauthorized use is detected. At present, there is no apparatus or method for providing notification to the cellular telephone owner as to when his or her cellular telephone and/or cellular telephone number is, or has been, utilized in an unauthorized manner.

SUMMARY OF THE INVENTION

The present invention provides an apparatus and a method for providing financial transaction, or other account transaction, authorization, notification, and/or security, and, in particular, provides an apparatus and a method for providing financial transaction authorization, notification, and/or security in conjunction with credit card, charge card, debit card, and/or currency or "smart" card use, savings and/or checking account activity and use, or other account use, and/or cellular telephone use, which overcomes the shortcomings of the prior art.

The present invention provides an authorization, notification, and/or security, apparatus and method which provides a notification of a transaction on or involving any one or more of the accounts described herein, along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, or used, in or involving a transaction on or involving an account, or related to a transaction on or involving an account.

The apparatus and method of the present invention, which is utilized in conjunction with a credit card, a charge card, a debit card and/or a currency or "smart" card authorization process, comprises a point-of-sale authorization terminal which terminals are found in various establishments and which are utilized in conjunction with the sale of goods and/or services and/or in other types of financial transactions. The point-of-sale terminal may be utilized at the location of the seller and/or service provider, such as at a retail store or office, and/or the point-of-sale terminal may be located at the site of the goods or service provider or vendor, such as in cases when the sale is a telephone order, mail order, and/or other type of transaction, including transactions made on, or over, the Internet and/or other on-line services or communication networks or mediums. The point-of-sale terminal can also include and input device, a keyboard, a mouse, a reader, a scanner, or any combination of same, or any other input device for inputting or for entering information and/or for obtaining an image or a digital copy of a respective document, authorization form, authorization request form, benefit request form, claim form, draft, bank draft, deposit form, withdrawal form, check, form, receipt, request form, or other entity, which is offered, presented, submitted, processed, involved, or used, in or involving a transaction on or involving a respective account, or related to a transaction on or involving an account. The point-of-sale terminal includes a camera and/or a microphone, and/or any other video recording device and/or audio recording device, for obtaining a picture and/or video information and/or audio information regarding an individual engaging in a transaction involving the respective credit card, a charge card, a debit card, and/or a currency or "smart" card. The camera can also be utilized to obtain a photograph or a picture of a document, authorization form, authorization request form, benefit request form, claim form, draft, bank draft, deposit form, withdrawal form, check, form, receipt, request form, or other entity, which is offered, presented, submitted, processed, involved, or used, in or involving a transaction on or involving a respective account, or related to a transaction on or involving an account.

The apparatus also comprises a central processing computer for processing the credit, charge, debit, and/or currency or "smart" card and/or other transaction requests, and data and/or information pertaining thereto, and/or the authorization pertaining thereto. The central processing computer may service any predefined group of card holders and/or any pre-defined group(s) and/or type(s) of cards. The central processing computer may also process accounts for any of the various banks and/or financial institutions which issue and/or manage credit cards, charge cards, debit cards, and/or currency or "smart" cards, and/or process or manage these accounts. The central processing computer can be equipped with a memory device for storing pictures and/or video information and/or audio information which can be obtained for any number of transactions on any of the herein-described accounts associated with any of the herein-described credit cards, charge cards, debit cards and/or currency or "smart" cards. For example, a picture, video information and/or audio information of or regarding an individual engaging in a transaction can be stored in a memory of the central processing computer and/or in a memory associated with the central processing computer. Any number or instances of pictures, video information, and/or audio information, regarding and/or associated with any number of transactions on any account or accounts, can be stored for later use or retrieval as described herein.

The point-of-sale terminal is linked and/or connected to the central processing computer via a communications system, link and/or medium, such as, for example, a telephone network or line. The communications system which is utilized may be any communications system and may include telecommunication systems, satellite communications systems, radio communication systems, digital satellite communications systems, personal communications services communication systems as well as any other appropriate communications system. In a preferred embodiment, as described herein, the communication system can be the Internet and/or the World Wide Web, and/or any other packet—switched communication system and/or any other communication system which uses TCP/IP protocols.

The point-of-sale terminal transmits signals and/or data to the central processing computer as well as receives signals and/or data from the central processing computer.

The apparatus also comprises a cardholder communication device which may receive signals and/or data from either or both of the point-of-sale terminal and/or the central processing computer. The communication device may also be equipped with a transmitter for transmitting signals and/or data to the central processing computer. In this regard, the central processing computer transmits signals and/or data to the communication device as well as receives signals and/or data from the communication device. The communication device may also transmit signals and/or data directly to the point-of-sale terminal and receive signals and/or data directly from the point-of-sale terminal. The communication device can include a camera and/or a microphone, and/or any other video recording device and/or audio recording device, for obtaining a picture and/or video information and/or audio information regarding the cardholder.

The point-of-sale terminal may transmit signals and/or data to the central processing computer and to the communication device and may receive signals and/or data from the central processing computer and from the communication device.

The communication device may be a wireless device. In this regard, the communication device may be a telephone signal receiving device which may be a cellular telephone, a personal digital assistant, a wireless telephone, a home computer, a personal computer, a laptop computer, a notebook computer, a netbook computer, a beeper, and/or a pager or other device, which may be carried by the cardholder and/or be kept on and/or close to the cardholder's person so that the central processing computer may transmit signals and/or data to the communication device so as to communication with the cardholder at any time and at any location.

The apparatus may also comprise a facsimile (fax) machine, a home computer, a personal computer, a laptop computer, a notebook computer, a netbook computer, a telephone, a telephone answering machine, an alternate telephone, an alternate telephone answering machine, a network computer, and/or an alternate beeper or pager. The central processing computer may be linked with the above fax machine, a home computer, personal computer, laptop computer, notebook computer, netbook computer, telephone, associated answering machine, alternate telephone and associated answering machine, network computer, and/or alternate beeper or pager via any suitable communication system. The telecommunications link or telephone line or link, which may or may not be a wireless link depending on the device and/or the circumstances, is utilized in order to link the central processing computer with each of the fax machine, the home computer, the personal computer, the laptop computer, the notebook computer, the netbook computer, the telephone, the associated answering machine, the alternate telephone, alternate telephone answering machine, the network computer, and/or the alternate beeper or pager.

The apparatus and method of the present invention may be utilized in order to provide cardholder authorization, notification and/or security measures in financial transactions involving credit cards, charge cards, debit cards, and/or currency or "smart" cards and may be utilized in order to obtain cardholder authorization in a card-related transaction.

The present invention can provide an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or other entity, used in or involving a transaction on or involving an account, or related to a transaction on or involving an account. The present invention can also provide any number, group, or combinations, of images, digital copies, photographs, pictures, or any combination of same, for any number or combination of documents, authorization forms, authorization request forms, benefit request forms, claim forms, drafts, bank drafts, deposit forms, withdrawal forms, checks, forms, receipts, request forms, or other entities, which is, or which are, offered, presented, submitted, processed, involved, or used, in or involving a transaction, or related to a transaction, on or involving an account or any number of accounts.

The apparatus and method of the present invention may commence operation when the card, which is to be utilized in a credit card, charge card, debit card, and/or currency or "smart" card, or number corresponding thereto, transaction, is offered, presented, transmitted, or submitted, in the transaction, or when a document, authorization form, authorization request form, benefit request form, claim form, draft, bank draft, deposit form, withdrawal form, check, form, receipt, request form, or other entity, or when an image, digital copy, photograph, or picture, of a document, authorization form, authorization request form, benefit request form, claim form, draft, bank draft, deposit form, withdrawal form, check, form, receipt, request form, or other entity, is offered, presented, transmitted, submitted, processed, involved, or used, in or involving the transaction, or related to the transaction, at the point-of-sale or other appropriate location whereupon the attendant or point-of-sale terminal operator will activate the apparatus in any typical manner, such as by obtaining a phone line and entering card information into the point-of-sale terminal.

Data entry may typically be performed by swiping the magnetic strip of the card through a card reader of the point-of-sale terminal. In the case of a document, authorization form, authorization request form, benefit request form, claim form, draft, bank draft, deposit form, withdrawal form, check, form, receipt, request form, or other entity, which is offered, presented, submitted, processed, involved, or used, in or involving the transaction, or related to the transaction, an image or a digital copy of the respective document, authorization form, authorization request form, benefit request form, claim form, draft, bank draft, deposit form, withdrawal form, check, form, receipt, request form, or other entity, involved in, related to, or used in, the transaction can be obtained, scanned, or generated, and/or stored, by or in the point-of-sale terminal or other suitable device, or a photograph or a picture of the respective document, authorization form, authorization request form, benefit request form, claim form, draft, bank draft, deposit form, withdrawal form, check, form, receipt, request form, or other entity, involved in, related to, or used in, the transaction can be obtained, taken, recorded, or generated, or stored, in or by the point-of-sale terminal using the camera/microphone system of the point-of-sale terminal or any other suitable device.

In addition to the above-described transaction data entry, a picture, a video image, or a video clip, containing a picture, photograph or image, video clip, and/or and audio clip or voice print, of the individual involved in the transaction, or offering the respective card or account in the transaction, can be obtained via the respective, camera, video recording device, microphone, or audio recording device. The information and/or data pertinent to the transaction and/or the card, along with the image, digital copy, photograph, or picture, of the document, authorization form, authorization request form, benefit request form, claim form, draft, bank draft, deposit form, withdrawal form, check, form, receipt, request form, or other entity, and/or the respective picture, photograph or image, video clip, and/or and audio clip or voice print, of the individual involved in the transaction, is then transmitted to the central processing computer. The information and/or data pertinent to the transaction and/or the card, along with the image, the digital copy, the photograph, or the picture, of the document, authorization form, authorization request form, benefit request form, claim form, draft, bank draft, deposit form, withdrawal form, check, form, receipt, request form, or other entity, and/or the respective picture, photograph or image, video clip, and/or and audio clip or voice print, of the individual involved in the transaction, can also be transmitted to the communication device.

The image, digital copy, photograph, or picture, of the respective document, authorization form, authorization request form, benefit request form, claim form, draft, bank draft, deposit form, withdrawal form, check, form, receipt, request form, or other entity, involved in or used in the transaction, or related to the transaction, can be in the body of a message containing the information or data sent, such as in the body of the message, or the respective document, authorization form, authorization request form, benefit request form, claim form, draft, bank draft, deposit form, withdrawal form, check, form, receipt, request form, or other entity, involved in or used in the transaction, or related to the transaction, can be, or can be included in, an attachment to the message. The message, or the information or data pertinent to the transaction, can be included in, or can be or can include an electronic mail (e-mail) message, an instant message, a text message, or any other suitable message, electronic, digital, or otherwise, or any other electronic transmission. The photograph, picture, and/or video clip, and/or the voice recording and/or voice print, of the individual involved in the transaction, can also be in the body of the message containing the information or data sent, such as in the body of the message, or the respective photograph, picture, and/or video clip, and/or the voice recording, and/or voice print, of the individual involved in the transaction, can be, or can be included in, an attachment to the message. The cardholder can then, or at any time, review the information in the message, including viewing or reviewing the image, digital copy, photograph, or picture, of the respective document, authorization form, authorization request form, benefit request form, claim form, draft, bank draft, deposit form, withdrawal form, check, form, receipt, request form, or other entity, involved in or used in the transaction, or related to the transaction, or viewing or reviewing the photograph, picture, and/or video clip, and/or the voice recording and/or voice print, of the individual involved in the transaction.

The central processing computer will then process the information and/or data pertinent to the transaction and to the particular card account and may request, if needed, that the point-of-sale operator enter the transaction amount. The central processing computer will process the information and/or data pertinent to the transaction in conjunction with the card account information in order to determine if the card has been lost, stolen and/or cancelled and/or de-activated. Further, the central processing computer may perform a test in order to determine if the maximum credit, charge or debit account limit has been exceeded and/or if the card has been depleted of its currency value.

Once all of the information and/or data processing has been completed, the central processing computer will determine if the card has been lost, stolen, and/or cancelled and/or de-activated and/or if the credit, charge or debit account limit of the card has been reached and/or exceeded and/or if the currency value of the card has been depleted.

The central processing computer may also perform a test in order to determine if the predetermined maximum number of unauthorized transactions have occurred on the account. If any of the above listed conditions are found to exist (i.e. card is lost, stolen, cancelled and/or de-activated, or credit, charge or debit account limit has been reached or exceeded, currency value depleted, or unauthorized transaction limit reached or exceeded), the central processing computer may transmit a signal to the point-of-sale terminal indicating that the transaction is not approved and/or is not authorized. The point-of-sale terminal operator may then cancel the transaction. The point-of-sale terminal operator may then confiscate the card and/or alert the authorities.

If, however, the central processing computer should determine that the card is not lost, stolen, cancelled or de-activated, or that the credit, charge or debit account limit of the card has not been reached or exceeded, or that the of unauthorized transactions count has not reached a predefined limit, the central processing computer may transmit a signal and/or data to the communication device which is located with the cardholder. The information and/or data pertinent to the transaction and/or the card, along with the image, digital copy, photograph, or picture, of the document, authorization form, authorization request form, benefit request form, claim form, draft, bank draft, deposit form, withdrawal form, check, form, receipt, request form, or other entity, and/or the respective picture, photograph or image, video clip and/or and audio clip or voice print, of the individual involved in the transaction, can also be transmitted to, or re-transmitted to, the communication device. The central processing computer may then also transmit respective signals and/or data, including the information and/or data pertinent to the transaction and/or the card, along with the image, digital copy, photograph, or picture, of the document, authorization form, authorization request form, benefit request form, claim form, draft, bank draft, deposit form, withdrawal form, check, form, receipt, request form, or other entity, involved in or used in, or related to, the transaction, and/or the respective picture, photograph or image, video clip and/or and audio clip or voice print, of the individual involved in the transaction, to any one or more of the cardholder's designated fax machine, home computer, personal computer, laptop computer, notebook computer, netbook computer, telephone, telephone answering machine, alternate telephone, cellular telephone, wireless telephone, personal digital assistant, interactive television, digital television, alternate telephone answering machine, network computer, and/or alternate beeper or pager, either sequentially and/or simultaneously.

In addition to the above-described information, the information pertinent to the transaction, along with the image, digital copy, photograph, or picture, of the document, authorization form, authorization request form, benefit request form, claim form, draft, bank draft, deposit form, withdrawal form, check, form, receipt, request form, or other entity, involved in or used in, or related to, the transaction, and/or the picture, photograph or image, video clip and/or and audio clip or voice print, of the individual involved in the transaction, the information and/or data transmitted to the communication device can also include information and/or data identifying the transaction and may include the name of the store or the service provider and the amount of the transaction. The information and/or data may also provide the time of the transaction, the location (i.e. city, town, village, state, country, etc.) of the transaction. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale terminal.

The information and/or data which is transmitted from the central processing computer, and received at the communication device, may be displayed to the cardholder on a display device of the communication device. The information displayed on the display device may include information regarding the transaction, the picture, photograph or image, video clip and/or and audio clip or voice print, of the individual involved in the transaction, and/or the name of the store or the service provider, the amount of the transaction, the time of the transaction and the location of the transaction. The information and/or data may also be supplemented to include the type of goods and/or services involved in the transaction, if such information can be entered at the point-of-sale terminal.

The apparatus, or the central processing computer, may then wait for the cardholder to respond to the transmission. During this time, the cardholder may utilize the respective communication device, such as, for example, the cellular telephone, a personal digital assistant, a wireless telephone, a home computer, a personal computer, a laptop computer, a notebook computer, a netbook computer, an interactive television, a digital television, a beeper, and/or a pager, and/or the reply or two-way pager feature on the communication device in order to either approve, or authorize, the transaction or to disapprove, or void the transaction. The apparatus may then determine if the cardholder has made a reply or response within a pre-defined time limit. The cardholder may also transmit a signal via an appropriate key or button suspending use of the card such as when he or she may first be apprised of the fact that the card has been lost or stolen. If the cardholder has replied or responded to the notice, the response may then be transmitted to, and received by, the central processing computer. The cardholder may also simply telephone the central processing office or processing center, servicing the card, so as to personally notify the office or center of his or her response to the central processing computer transmission regarding the transaction.

If the cardholder does not reply to the central processing computer within a pre-specified time, the central processing computer may transmit a signal and/or data to the point-of-sale terminal indicating that, with the exception of receiving the authorization of the cardholder, the transaction is otherwise approved. The central processing computer may also simply transmit a signal indicating that the transaction is not authorized and, therefore, should be cancelled of voided. The point-of-sale terminal operator may then either proceed to complete the transaction, try to obtain additional information from the purchaser, or cancel the transaction. The cardholder can also respond by transmitting his/her own picture or photograph and/or a voice response or voice print, recorded by or at the communication device, to the central processing computer and/or to the point-of-sale terminal.

The action taken by the point-of-sale terminal operator may be dictated by the specific agreement in effect between the sales or service establishment and the bank or financial institution administering the card accounts. The point-of-sale terminal operator can also view the picture or photograph and/or a voice response or voice print, recorded by or at the communication device. Thereafter, the operation of the apparatus will cease. If the cardholder should reply or respond to the transaction notice at a later period, this information may then be utilized in order to approve, or to disapprove, and/or to dispute the transaction.

The central processing computer, after receiving the reply or response from the cardholder, may then identify the cardholder response. The apparatus, or the central processing computer, may then determine if the cardholder has replied or responded so as to authorize the transaction. If the cardholder's response is to cancel, to disapprove or not authorize, the transaction, the central processing computer may transmit a signal and/or data to the point-of-sale terminal which will notify and/or instruct the point-of-sale terminal operator that the transaction is not authorized and, therefore, should be cancelled or voided. The point-of-sale terminal operator may then cancel the transaction. The point-of-sale terminal operator may then confiscate the card and/or alert the authorities. Thereafter, the apparatus will cease operation.

If, however, the central processing computer identifies the cardholder reply or response as being one to authorize the transaction, the central processing computer may then transmit a signal and/or data to the point-of-sale terminal which may notify and/or instruct the point-of-sale terminal operator that the transaction is authorized and/or approved. The point-of-sale terminal operator may then complete the transaction. Thereafter, operation of the apparatus will cease.

In cases when the cardholder is the party to the transaction, he or she, having the communication device with, or on, his or her person, may authorize the transaction at the point-of-sale location or from his or her remote location. The cardholder may also program and/or set the communication device to automatically authorize or disapprove or disallow transactions.

In this regard, the communication device may be programmable so as to receive and/or to analyze the transaction information and/or data and reply or respond to same automatically and/or with preset or programmed replies and/or responses. The communication device may also be programmable so as to limit and/or restrict the amounts and/or types of transactions, and/or the goods and/or services which may be purchased with the card, the stores or service providers which may be authorized to accept the card, limits on the dollar amounts of transactions pertaining to each authorized vendor, seller and/or service provider, daily spending limits, and/or the geographical area or location to which authorized use may be limited, and/or authorized times for card usage (i.e. specific days, dates, time of day, time of month, year, etc.), and/or any other limitation and/or restriction regarding amount of the transaction, the parties involved, the geographical area limitations, and/or the times of allowed usage. In this regard, the cardholder may provide for temporary transaction and/or purchasing amounts.

The communication device may also be provided with a memory device for storing any number of transactions, as well as any of the information described herein as being provided by the apparatus and method of the present invention, so that the cardholder may review his account activity and/or transactions which have occurred involving his or her card. In this manner, the cardholder may "scroll" through and/or in other ways review account activity at any time and for any time period and/or interval. The communication device may also be equipped to service more than one card. For example, a plurality of cards may be serviced with or by a single communication device.

The apparatus and method of the present invention provides for the real-time, non-real-time, or other, authorization, notification, and/or security, of financial transactions involving credit cards, charge cards, debit cards, and/or currency or "smart" cards, or transaction on or involving any of the herein-described accounts or any other accounts, which provides information regarding the transaction, along with an image, digital copy, photograph, or picture, of a respective document, authorization form, authorization request form, benefit request form, claim form, draft, bank draft, deposit form, withdrawal form, check, form, receipt, request form, or other entity, involved in, used in, or related to, the transaction, and which also enables a cardholder to monitor, in real-time, all activity involving his or her card(s) and the corresponding account numbers. The present invention can provide transaction information or information pertinent to a transaction, along with an image, digital copy, photograph, or picture, of a respective the document, authorization form, authorization request form, benefit request form, claim form, draft, bank draft, deposit form, withdrawal form, check, form, receipt, request form, or other entity, involved in, used in, or related to, a transaction or transactions, for any number or types of transactions and for any number or types of accounts.

In another preferred embodiment, wherein a number of transactions may be batch processed or otherwise processed in batches or processed in groups, the apparatus of the present invention can provide or transmit information and/or data pertinent to each of and/or all of the transactions, and/or the card or account used in same, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, each of the transactions, and/or the photograph, picture, and/or video clip, and/or the voice recording, and/or voice print, of the individual involved in the transaction, associated with each of the transactions. The above-described information can be transmitted to the communication device and the cardholder or account holder can review the information as desired. In this regard, all of the herein-described information pertaining to each transaction processed in a batch processing of transactions on or involving an account or accounts, can be processed, obtained, gathered, or stored, and/or can be transmitted, in a single message, or in a group of messages, to the communication device.

The apparatus and method the present invention also provides for real-time identity verification regarding the individual involved in the transaction and/or the cardholder. The apparatus and method of the present invention also provides a means and a mechanism by which to inform a cardholder that his or her card(s) are lost, stolen and/or are or have been fraudulently used, and/or when his or her card number(s) are or have been fraudulently used, and provides an indication to the cardholder of where his or her card(s) are being or have been utilized in transactions. The cardholder may then report the card lost or stolen and/or cancel and/or de-activate the card.

The apparatus and method of the present invention also provides for identify verification by providing the above-described picture, photograph, image, video clip, audio clip, or voice print of the individual involved in the transaction. The apparatus and method of the present invention also provides for identify verification of the cardholder by providing the above-described picture, photograph, image, video clip, audio clip, or voice print, of the cardholder which can be provided to the point-of-sale terminal operator in real-time for use in verifying that the transaction is not unauthorized and/or fraudulent.

Information pertinent to a transaction or transactions, along with an image or images, a digital copy or digital copies, a photograph or photographs, or a picture or pictures, of a document or documents, an authorization form or authorization forms, an authorization request form or authorization request forms, a benefit request form or benefit request forms, a claim form or claim forms, a draft or drafts, a bank draft or bank drafts, a deposit form or deposit forms, a withdrawal form or withdrawal forms, a check or checks, a form or forms, a receipt or receipts, a request form or request forms, or other entity or entities, involved in, used in, or related to, the transaction or transactions, can be stored in the central processing computer as part of an account transaction history.

A picture, photograph, image, video clip, audio clip, or voice print, of the cardholder, can be stored at the central processing computers as part of an account transaction history. The central processing computer can also transmit any number of pictures, photographs, images, video clips, audio clips, or voice prints, of the cardholder, to the point-of-sale terminal for viewing or hearing at the point-of-sale terminal by the point-of-sale terminal operator so as to provide for identity verification for the transaction.

The present invention also provides a means and a mechanism by which to monitor the number of transactions which are unauthorized by the cardholder and determine whether or not to authorize transactions and/or to cancel or to de-activate the card(s). In the above manner, the present invention provides an apparatus and a method to prevent and/or to drastically limit fraudulent and/or unauthorized use of credit cards, charge cards, debit cards, and/or currency or "smart" cards, and/or the account numbers corresponding thereto.

The present invention, in an alternate embodiment, may be utilized so as to provide authorization, notification and/or security in banking and related financial transactions involving checking accounts, savings accounts and/or automated teller machine (ATM) transactions and/or other transactions wherein an account holder can be notified of a transaction and/or attempted transaction. The present invention, in an alternate embodiment, may be utilized so as to provide authorization, notification, and/or security, in brokerage transactions. In such an alternate embodiment, the apparatus comprises a banking transaction terminal, which terminals are found in banks and financial institutions, and which may be a teller terminal, a processing computer terminal and/or an ATM terminal. The apparatus also comprises a central processing computer and a communication device. The banking transaction terminal transmits an authorization request which may include the data pertaining to the particular account which is accessed and/or involved in the transaction and the type and the amount of the transaction, over a communications medium, to the central processing computer for processing the transaction request and/or the authorization pertaining thereto.

The central processing computer may transmit signals and/or data pertaining to the transaction, along with the image, digital copy, photograph, or picture, of a document, authorization form, authorization request form, benefit request form, claim form, draft, bank draft, deposit form, withdrawal form, check, form, receipt, request form, or other entity, involved in, used in, or related to, the transaction, and/or the respective picture, photograph or image, video clip and/or and audio clip or voice print, of the individual involved in the transaction, to the communication device. The apparatus may then operate and/or be utilized in a manner similar to, or analogous to, the apparatus utilized in conjunction with credit cards, charge cards, debit cards, and/or currency or "smart" cards, and/or the account numbers corresponding thereto, as described above.

The present invention can also provide an authorization, notification and/or security, apparatus and method which provides a notification of a transaction on or involving a bank account, checking account, savings account, or ATM account, or any one or more of the accounts described herein, along with an image, a digital copy, a photograph, or a picture, of a document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a bank account, checking account, savings account, or ATM account.

In this manner, the apparatus and method of the present invention may provide for the real-time, non-real-time, or other, notification, along with providing any or all of the other information described herein as being provided by the present invention, of, and/or for, banking and/or financial transactions involving various bank and/or financial accounts and enable an account owner to monitor, in real-time, all activity involving his or her bank and/or financial accounts. The apparatus and method the present invention also provides for real-time identity verification regarding the individual involved in the transaction and/or the account owner. The apparatus and method of the present invention also provides a means and a mechanism by which to inform an account owner that his or her account is overdrawn, has been charged against and/or that his or her ATM card(s) are lost, stolen, cancelled or de-activated and/or provides an indication to the account owner of when and/or where his or her accounts are being accessed in transactions and/or are being otherwise compromised. The account owner may then report the unauthorized activity, or the discovery of a lost or stolen ATM card, and/or cancel and/or de-activate the respective account(s) and/or ATM card(s).

The present invention can also provide an authorization, notification, and/or security, apparatus and method which provides a notification of a transaction on or involving any one or more of a cellular telephone account, a mobile telephone account, or a wireless telephone account, or any of the other accounts described herein, along with an image, a digital copy, a photograph, or a picture, of a document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a cellular telephone account, a mobile telephone account, or a wireless telephone account.

In another alternate embodiment, the apparatus and method of the present invention may also be utilized so as to provide authorization, notification, and/or security, along with providing any and/or all of the other information described herein as being provided by the present invention, for, and in conjunction with, cellular, wireless, and/or mobile telephones and/or communication systems wherein a cellular or mobile telephone owner and/or account holder can be notified of a transmission and/or an attempted transmission and/or telephone call made with his or her cellular or mobile telephone and/or with the telephone number and/or account information, which information may include, but not be limited to, transmission codes and/or associated signatures and/or data which corresponds to his or her cellular or mobile telephone.

The apparatus utilized in conjunction with a cellular telephone comprises a cellular telephone which serves as the transaction terminal, a central processing computer and a communication device. The cellular telephone transmits signals and/or data which are received by the central processing computer. The central processing computer may then transmit signals and/or data which are received by the communication device. The apparatus may then operate and/or be utilized in a manner similar to, or analogous to, the apparatus utilized in conjunction with credit cards, charge cards, debit cards, and/or currency or "smart" cards, savings accounts, checking accounts and/or automated teller machine accounts, and/or the account numbers corresponding thereto, as described above.

The apparatus and method of the present invention provides for the real-time, non-real-time, or other, notification of cellular or mobile telephone usage which enables a cellular telephone owner and/or account holder to monitor, in real-time, all activity involving his or her cellular telephone. The apparatus and method the present invention also provides for real-time identity verification regarding the individual involved in the transaction or use of the cellular or mobile telephone and/or the cellular or mobile telephone owner and/or account holder. The apparatus and method of the present invention also provides a means and a mechanism by which to inform a cellular telephone owner and/or account holder that his or her cellular telephone is lost, stolen and/or is being fraudulently used, and/or that the telephone number is being used in an unauthorized manner, and provides an indication to the cellular telephone owner and/or account holder of how, when and where his or her cellular telephone, or the account number which corresponds thereto, is being utilized in cellular communication transactions. The cellular telephone owner and/or account holder may then report the cellular telephone lost or stolen and/or cancel and/or de-activate the cellular telephone and/or the corresponding account and/or the account number.

The present invention also provides an apparatus and a method by which to monitor the number of cellular or mobile telephone transactions which are unauthorized by the cellular or mobile telephone owner and to determine whether or not a central processing computer should cancel or de-activate the cellular telephone and/or the account. In the above manner, the present invention provides an apparatus and a method for preventing and/or for drastically limiting fraudulent use and/or unauthorized use of cellular or mobile telephones and/or cellular or mobile telephone numbers. The present invention also provides an apparatus and a method for combating cellular telephone "cloning."

The present invention can also provide an authorization, notification, and/or security, apparatus and method which provides a notification of a transaction on or involving a credit card account, a credit account, a charge card account, a charge account, a debit card account, a debit account, a bank account, a checking account, a savings account, a brokerage account, a pension account, an individual retirement account (IRAs), a self-employed pension (SEP) account, a "smart card accounts, a currency card accounts, a healthcare accounts, a Medicare account, a Medicaid account, an employee benefits plan, a cafeteria plan, a spending plan, a subscription for any goods, products, or services, an insurance policy, plan, or program, a healthcare insurance policy, plan, or program, a healthcare spending plan or program, a life insurance policy, plan, or program, a disability insurance policy, plan, or program, a tuition or tuition reimbursement plan or program, a pharmacy insurance policy, plan, or program, a credit report plan or program, a cable television plan or program, a digital television plan or program, a satellite television plan or program, a social security plan or program, a liability insurance policy, plan, or program, a lease insurance policy, plan, or program, a ticket plan or program, a telephone calling card plan or program, a utility plan or program, an electrical utility plan or program, gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, Internet plan or program, an Internet service provider plan or program, an electronic signature, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, and/or any other account, or any of the other accounts described herein, along with an image, digital copy, photograph, or picture, of a respective document, authorization form, authorization request form, benefit request form, claim form, draft, bank draft, deposit form, withdrawal form, check, form, receipt, request form, or other entity, used in or related to the transaction.

The present invention, in another alternate embodiment, may be utilized so as to provide authorization, notification, and/or security, in transactions involving credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart" card accounts, currency card accounts, healthcare account, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, and/or any other accounts, as well as any cards, devices, and/or other entities, which can be used with or which can be associated with any of the herein-described accounts, wherein an account holder or other individual authorized to use the account can be notified of a transaction and/or attempted transaction on or involving the account. In this embodiment, the apparatus and method of the present invention can provide information pertinent to the transaction, along with an image, a digital copy, a photograph, or a picture, of a document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving the respective account.

In such an alternate embodiment, the apparatus comprises a transaction device or terminal, which devices or terminals can be found in any location where a transaction on or involving the respective account can take place and/or at any other location for processing a transaction on the respective account. The transaction can be any suitable computer, communication device, or transaction device, which can be used to process information regarding a transaction or information regarding a transaction authorization. The apparatus also comprises a central processing computer and a communication device. The transaction device or terminal transmits an authorization request which may include the data pertaining to the particular account which is accessed and/or involved in the transaction and the type and/or the amount of the transaction, over a communications medium, to the central processing computer for processing the transaction request and/or the authorization pertaining thereto.

The central processing computer may transmit signals and/or data pertaining to the transaction device, along with an image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the respective picture, photograph or image, video clip and/or and audio clip or voice print, of the individual involved in the transaction, to the communication device. The apparatus may then operate and/or be utilized in a manner similar to, or analogous to, the apparatus utilized in conjunction with credit cards, charge cards, debit cards, and/or currency or "smart" cards, and/or the account numbers corresponding thereto, as described above.

In this manner, the apparatus and method of the present invention may provide for the real-time, non-real-time, or other, notification of transactions on or involving any of the herein-described credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card account, currency card account, healthcare account, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, and/or any other accounts, as well as any cards, devices, and/or other entities, which can be used with or which can be associated with any of the herein-described accounts, and enable an account owner to monitor, in real-time or otherwise, all activity involving his or her respective account(s). The apparatus and method the present invention also provides for real-time, non-real-time, or other, identity verification regarding the individual involved in the transaction and/or the account owner. The apparatus and method of the present invention also provides a means and a mechanism by which to inform an account owner that his or her account is being used or accessed, has been used or accessed, has been charged against and/or that his or her card(s) associated with the respective account are lost, stolen, cancelled or de-activated and/or provides an indication to the account owner of when and/or where his or her accounts are being accessed in transactions and/or are being otherwise compromised.

The account owner may then report the unauthorized activity on or involving the respective account, or the discovery of a lost or stolen card associated with the respective account, and/or cancel and/or de-activate the respective account(s) and/or card(s) associated with the respective account.

The apparatus and method of the present invention may also be utilized in connection with an on-line service and/or on, or over, the Internet and/or the World Wide Web, so as to provide for a means by which the authorized user or operator may utilize the apparatus in conjunction with a home and/or a personal computer and/or a commercial or industrial computer system (i.e., an Internet server computer) and/or any other appropriate device, including a personal communication and/or computing device, in a network environment, and which may be utilized over any suitable and/or appropriate communications network or medium.

The communications system utilized in conjunction with the present invention may operate anywhere in the electromagnetic and/or the radio spectrum. A preferred communication system, as described herein, is the Internet and/or the World Wide Web, and/or any other packet-switched communication system and/or any other communication system which uses TCP/IP protocols. Personal communication service (PCS) systems and devices, including stationary, portable and/or handheld devices, and digital signal communications devices and systems, may also be utilized. The communication system or medium should provide for the transmission and for the reception of a multitude of remote electrical, electronic, electromagnetic, and/or other suitable signals, over long distances and/or in a mobile and/or a wireless communications environment.

The apparatus and method of the present invention may be utilized in conjunction any appropriate communications device which may be utilized with any appropriate communications system and/or medium.

The present invention may also be equipped with, and be utilized with, hardware and software necessary for providing self-monitoring functions, automatic control and/or responses to occurrences, automatic notice of an occurrence and/or a situation, to an owner, user and/or authorized individual. In this regard, any and all of the embodiments described above may comprise a monitoring device, a triggering device and/or any other suitable device for detecting an occurrence and/or identifying a situation which may warrant providing notice to a card holder, account owner, cellular telephone owner and/or an authorized individual.

In this regard, the apparatus and method may provide a transmission of any appropriate signal from a transmitter and, if desired, from a voice synthesizer to the card holder, account owner and/or cellular, telephone owner. The, signal utilized could be in the form of a communication transmission, depending upon the communication medium utilized, a telephone call, a voice message, a beeper and/or a pager message, an electronic mail message, a fax transmission, and/or any other mode of communication which may be utilized with any of the apparatuses, devices and/or components described herein.

In this regard, the apparatus may be designed or programmed to telephone the cardholder, account owner and/or cellular telephone owner, and/or other authorized individual, at a primary phone number, at an alternate or forwarding phone number, and/or at a business phone number, send a beeper or pager message to the individual, and/or send a fax message, an electronic mail (e-mail) message, a voice mail message and/or an answering service message to, or for, the card holder, account owner and/or cellular telephone owner or authorized individual. In this manner, the apparatus may communicate with the desired individual by utilizing multiple notification and/or reporting avenues and/or devices so as to provide and to ensure that best efforts are to be made to communicate with the desired individual as soon as possible.

The apparatus and method of the present invention may also be programmable for programmed and/or automatic activation, self-activation, programmed and/or automatic operation and/or self-operation. The apparatus and method of the present invention may provide for an immediate, as well as for a deferred, authorization, notification, and/or security, in any of the above-described financial transactions, other account transactions, transactions on accounts, and/or wireless communication transactions.

The present invention can also provide a respective cardholder, account owner, account holder, or cellular telephone owner and/or cellular communications device owner, with periodic transaction records showing any and/or all transactions on or involving any of the herein-described accounts, for any given time period, which may by provided weekly, bi-weekly, monthly, yearly, or for any given and/or desired time period and/or for or at any time interval or period. For each transaction, information regarding the transaction, along with an image, digital copy, photograph, or picture, of a respective document, authorization form, authorization request form, benefit request form, claim form, draft, bank draft, deposit form, withdrawal form, check, form, receipt, request form, or other entity, involved in, used in, or related to, each transaction, and/or the respective picture, photograph or image, video clip, and/or and audio clip or voice print, of the individual involved in the transaction, can be provided to, or transmitted to, a respective cardholder, account owner, account holder, or cellular telephone owner and/or cellular communications device owner.

The present invention may also be utilized in such a manner that a communication device may receive and/or transmit signals, data and/or information which pertains to multiple accounts and/or multiple types of accounts in order to provide authorization, notification, and/or security, for a plurality of any of the accounts described herein.

The present invention, in any of the embodiments described herein, may also be designed to be user-friendly. In this regard, the present invention may be menu-driven, and/or its operation may be menu-selected, from audio menus, visual menus, or both audio and visual menus.

BRIEF DESCRIPTION OF THE DRAWINGS

In the Drawings:

FIG. 4 illustrates a block diagram of an alternate embodiment of the apparatus of the present invention which is utilized in conjunction with a checking account, a savings account, and/or an automated teller machine transaction;

FIG. 5 illustrates the various components of the apparatus of FIG. 4;

DESCRIPTION OF THE PREFERRED EMBODIMENTS

The present invention pertains to a transaction security apparatus and method and/or to a financial transaction, an account transaction, and/or wireless communication device, authorization, notification, and/or security, apparatus and method, and, in particular to a financial transaction, an account transaction, and/or wireless communication device, authorization, notification, and/or security, apparatus and method for use in providing authorization, notification, and/or security, in conjunction with credit card, charge card and/or debit card use, savings and/or checking account activity, and/or brokerage account activity, and/or cellular telephone use, or activity on or involving any other account.

The present invention can provide an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, involved, or used, in or involving a transaction on or involving an account, or related to a transaction on or involving an account.

In a preferred embodiment of the present invention, the present invention provides an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving an account.

Figure 1:
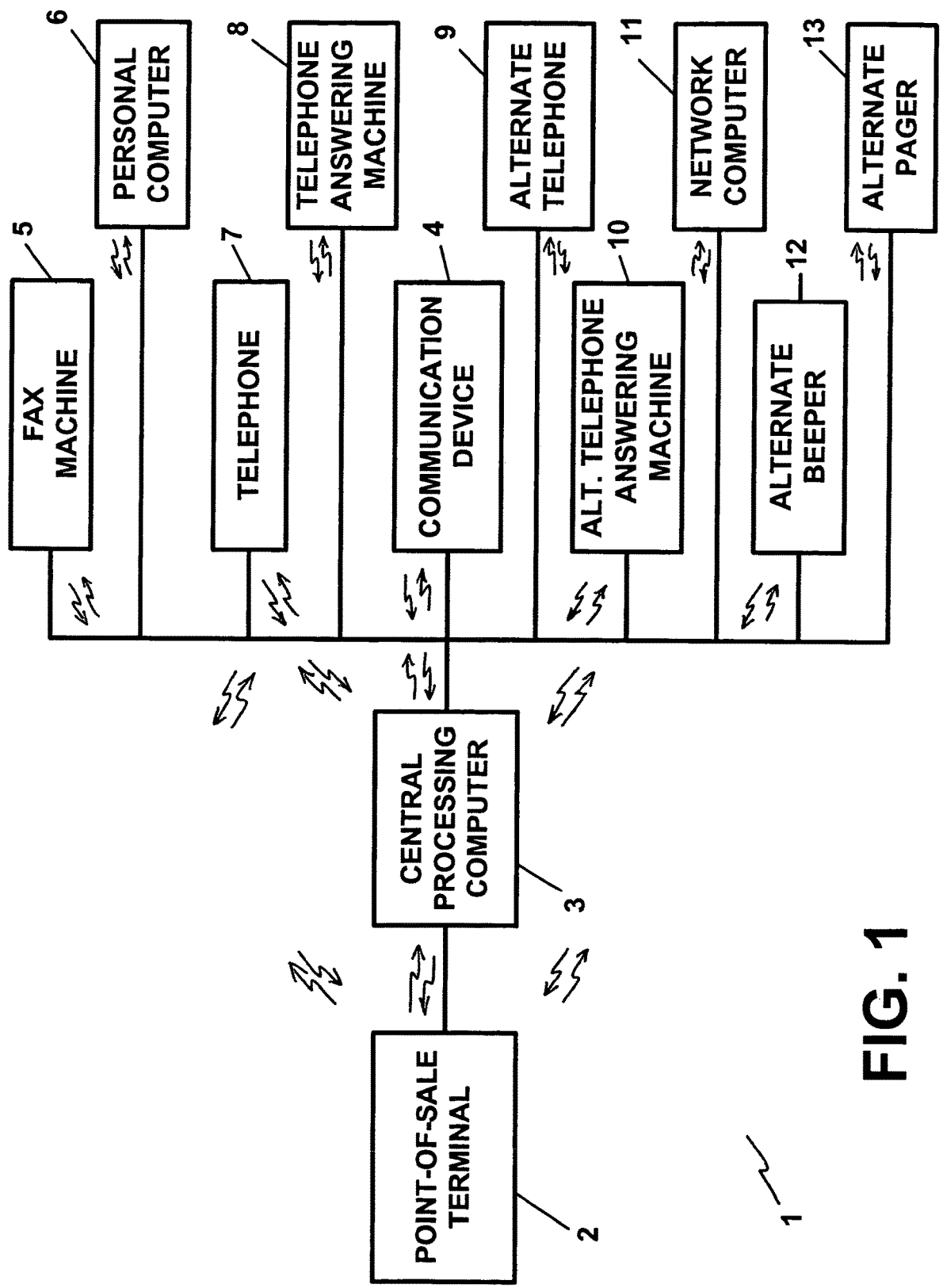
FIG. 1 illustrates a block diagram of the apparatus of the present invention which is utilized in conjunction with a credit card, a charge card, a debit card, and/or a currency or "smart" card authorization process.

FIG. 1 illustrates a block diagram of a preferred embodiment of the apparatus of the present invention, which is utilized in conjunction with a credit card, a charge card, a debit card, and/or a currency or "smart" card, authorization process. The apparatus of FIG. 1 is denoted generally by the reference numeral 1. With reference to FIG. 1, the apparatus 1 consists of a point-of-sale authorization terminal 2 which terminals are found in various establishments and utilized in conjunction with the sale of goods and/or services and in other financial transactions. The point-of-sale terminal 2 includes a camera and/or a microphone, and/or any other video recording device and/or audio recording device, for obtaining a picture and/or video information and/or audio information regarding an individual engaging in a transaction involving the respective credit card, a charge card, a debit card and/or a currency or "smart" card.

The point-of-sale authorization terminal 2 (hereinafter referred to as "point-of-sale terminal") may be any of the widely used and well known terminals or devices for providing point-of-sale authorization for transactions involving credit cards, charge cards, debit cards, and/or other currency or "smart" cards. The point-of-sale terminal 2 may be utilized at the location of the goods and/or service provider, such as the retail store or office, and/or the point-of-sale terminal 2 may be located at the site of the goods or service provider or vendor, such as in cases when the sale is a telephone order, mail order and/or other type of transaction, including transactions made over the Internet and/or other on-line mediums.

Typically, the terminals and devices for providing point-of-sale authorization comprise and utilize a magnetic card reader and/or magnetic strip card reader, for reading data from the magnetic strip located on credit cards, charge cards, debit cards and/or the currency or "smart" cards. The point-of-sale terminal 2 transmits an authorization request which may include the data pertaining to the particular card utilized in the transaction and the amount of the transaction, over a communications medium, to a central processing computer for processing the credit, charge, debit and/or other transaction request and/or the authorization request pertaining thereto.

The point-of-sale terminal 2 also receives the authorization and/or authorization data and/or information from the central processing computer. A printed transaction receipt may also be provided at and/or obtained via the point-of-sale terminal 2, or peripheral device associated therewith, for printing a transaction receipt which is usually or typically signed by the card holder in completing the transaction. The point-of-sale terminal 2 may be designed to read other data besides and/or in addition to magnetic card data. The point-of-sale terminal 2 may also comprise, or have associated therewith, a keypad for the manual entry of transaction information and/or data, such as the amount of the transaction. The point-of-sale terminal 2 may also be an integral component of a cash register or other transaction terminal or device which may provide for the automatic entry of transaction information and/or data. The point-of-sale terminal 2 may also include a scanner or other input device for obtaining an image or a digital copy of a respective document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a respective account.

The apparatus 1 also comprises a central processing computer 3 which services any predefined group of cardholders. For example, the central processing computer 3 may handle all MASTERCARD® transactions for a given financial and/or credit institution. The central processing computer 3, for example, may process credit cards, charge cards, debit cards, and/or currency or "smart" cards and/or combinations of same, such as, for example, VISA®, MASTERCARD®, and/or AMERICAN EXPRESS®, cards and process and/or mange account information pertaining thereto. The central processing computer 3 may also process accounts for any of the various banks and/or financial institutions which issue and/or manage credit cards, charge cards, debit cards, and/or currency or "smart" cards (hereinafter referred to as "card" or "cards") and/or process or manage these accounts.

The central processing computer 3 may be a mainframe computer, a mini-computer, a micro-computer, a server computer, such as those utilized in conjunction with on-line services and/or in a network environment, and/or any other suitable computer or computer system.

In the preferred embodiment, the point-of-sale terminal 2 is linked and/or connected to the central processing computer 3 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems as well as any other appropriate communications system. The point-of-sale terminal 2 transmits signals and/or data to the central processing computer 3 as well as receives signals and/or data from the central processing computer 3.

The apparatus 1 also comprises a cardholder communication device 4 which may receive signals and/or data from either or both of the point-of-sale terminal 2 and/or the central processing computer 3. In the preferred embodiment of FIG. 1, the communication device 4 receives signals and data from the central processing computer 3 with said signals being transmitted via a suitable communication system. In the preferred embodiment, the communications system or network utilized for transmitting signals and/or data to the communication device 4 is a wireless communication network and/or the Internet and/or the World Wide Web and the communication device 4 is a telephone signal receiving device such as a cellular telephone, a wireless telephone, a personal digital assistant, a home computer, a personal computer, a laptop computer, a notebook computer, a netbook computer, or a telephone beeper or pager. The communication device 4 or pager receive s the wireless telephone signals and/or data from the central processing computer 3 during the authorization procedure as will be described in more detail below.

In the preferred embodiment, the communication device 4 is also equipped with a transmitter for transmitting signals and/or data to the central processing computer 3. In this regard, the central processing computer 3 transmits signals and/or data to the communication device 4 as well as receives signals and/or data from the communication device 4. The communication device 4 may also transmit signals and/or data directly to the point-of-sale terminal 2 and receive signals and/or data directly from the point-of-sale terminal 2. In the preferred embodiment, the point-of-sale terminal 2 transmits signals and/or data to the central processing computer 3 and receives signals and/or data from the central processing computer 3. Further, in the preferred embodiment, the communication device 4 receives signals and/or data from the central processing computer 3 and transmits signals and/or data to the central processing computer 3.

As noted above, the communication device 4 is a wireless device. In this regard, the communication device 4 or pager may be carried by the cardholder and/or be kept on and/or close to the cardholder's person so that the central processing computer 3 may transmit signals and/or data to the communication device 4 so as to communicate with the cardholder at any time. The communication device 4 may also comprise any one or more of a facsimile (fax) machine, a home computer, a personal computer, a laptop computer, a notebook computer, a netbook computer, a telephone, a telephone answering machine, an alternate telephone, an alternate telephone answering machine, a network computer, and/or an alternate beeper or pager. The central processing computer 3 may be linked with each of the above devices via any suitable communication system.

In the preferred embodiment, the apparatus 1 also comprises a facsimile (fax) machine 5, a personal computer 6, a telephone 7, a telephone answering machine 8, an alternate telephone 9, an alternate telephone answering machine 10, a network computer 11, an alternate beeper 12 and an alternate pager 13. The central processing computer 3 may be linked with the above fax machine 5, personal computer 6, telephone 7, associated answering machine 8, alternate telephone 9, alternate telephone answering machine 10, network computer 11, and/or alternate beeper 12 or pager 13, via any suitable communication system. In the preferred embodiment, a telecommunications link or telephone network, line or link, which may or may not be a wireless link depending on the device and/or the circumstances, is utilized in order to link the central processing computer 3 with each of the fax machine 5, the personal computer 6, the telephone 7, the associated answering machine 8, the alternate telephone 9, alternate telephone answering machine 10, the network computer 11, and/or the alternate beeper 12 and/or the alternate pager 13.

Figure 2:
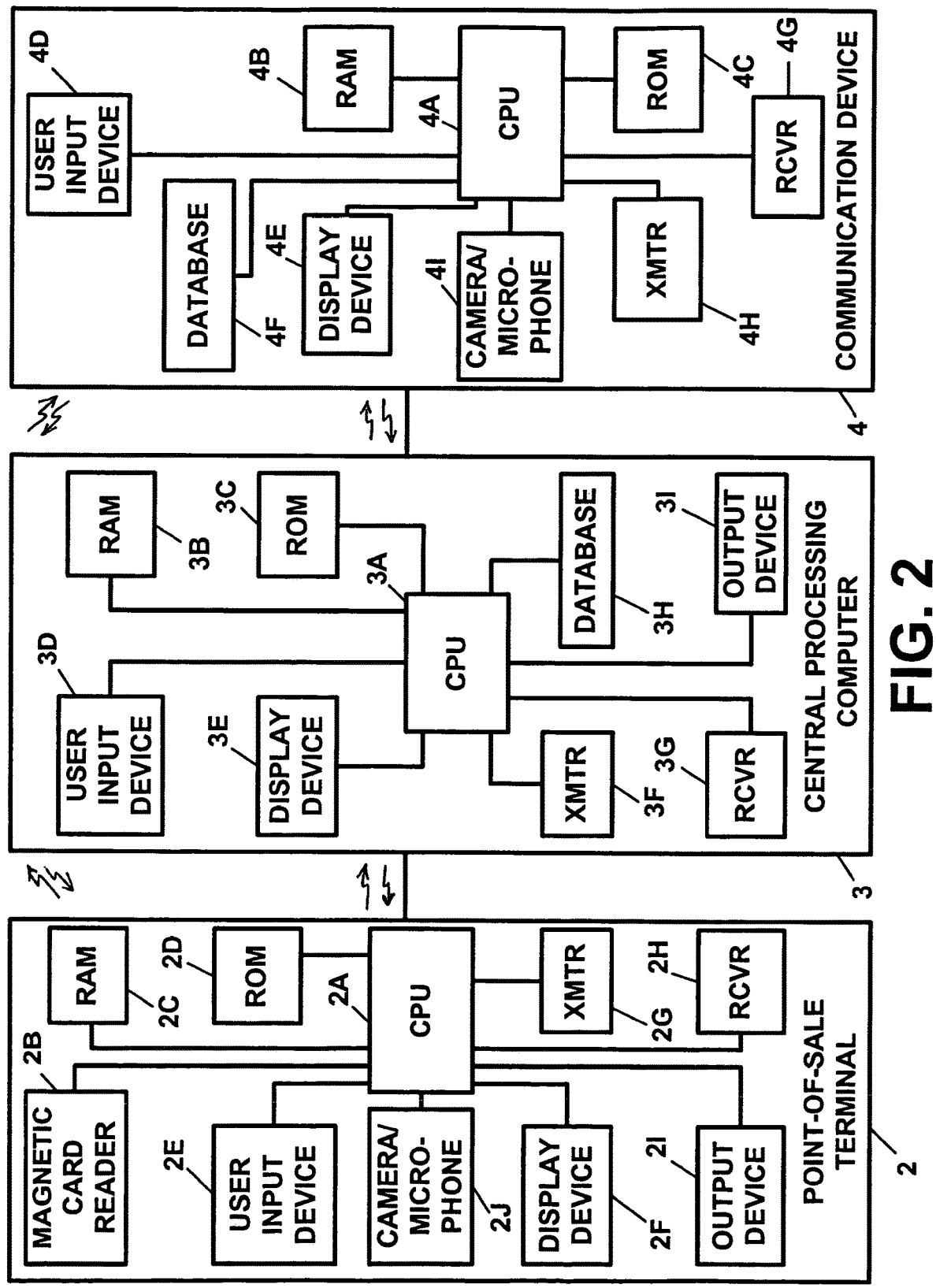
FIG. 2 illustrates the various components of the apparatus of FIG. 1.

FIG. 2 illustrates the various components of the apparatus 1 of FIG. 1. In FIG. 2, the point-of-sale terminal 2, in the preferred embodiment, comprises a central processing unit or CPU 2A, a magnetic card reader 2B, which is connected to the CPU 2A, associated random access memory 2C (RAM) and read only memory 2D (ROM) devices, which are also connected to the CPU 2A, a user input device 2E, which is typically a keypad or other suitable input device, keyboard, mouse, reader, or scanner, or any combination of same, for inputting data into the terminal 2 and which is also connected to the CPU 2A, and a display device 2F for displaying information and/or data to a user.

The point-of-sale terminal 2 also comprises a transmitter 2G for transmitting signals and/or data to the central processing computer 3, and/or to the communication device 4 and/or to any other device associated with the cardholder and/or the apparatus, if desired. The transmitter 2G is also connected to the CPU 2A. The point-of-sale terminal 2 also comprises a receiver 2H for receiving signals and/or data from the central processing computer 3, and from the communication device 4 and/or any other associated device which may be utilized, if desired. The receiver 2H is also connected to the CPU 2A. The point-of-sale terminal 2 also comprises a printer 2I or other appropriate output device for outputting data to the user. The printer 2I is also connected to the CPU 2A. In the preferred embodiment, the printer 2I prints receipts corresponding to the transaction.

The point-of-sale terminal 2 also includes a camera/microphone system 2J. In the preferred embodiment, the camera/microphone system 2J can include a camera or a video recording device which can be used to take a picture, a photograph, or a video clip of an individual or individuals involved in a transaction involving a credit card, a charge card, a debit card, and/or a currency or "smart" card. In the preferred embodiment, the camera/microphone system 2J can also include a microphone or an audio recording device which can be used to record audio information and/or the voice of an individual involved in a transaction involving a credit card, a charge card, a debit card, and/or a currency or "smart" card. In a preferred embodiment, voice information can be processed by the CPU 2A in order to generate a voiceprint file of the recorded voice.

In the preferred embodiment, the camera/microphone system 2J is also used to take a picture or a photograph of a respective a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a respective account.

In the preferred embodiment, the camera/microphone system 2J can be located on or in the vicinity of the point-of-sale terminal 2 so as to record the respective picture, photograph, or video clip, of the individual or individuals involved in a transaction, and/or so as to record the audio information and/or the voice of the individual involved in the transaction.

In the preferred embodiment, the point-of-sale terminal 2 can also include a database (not shown) which can be utilized to store information regarding transactions processed by the point-of-sale terminal 2. The information can include, for each of any number of transactions, a picture, a photograph, or a video clip, of the individual or individuals involved in a transaction, and/or audio information, a voice message or sample, and/or a voice print, which is a digital representation of a voice message or sample, obtained from the individual involved in the transaction. The database of the point-of-sale terminal 2 can also contain copies of any of the images, digital copies, photographs, or pictures, of any of the respective documents, authorization forms, checks, forms, receipts, request forms, or other entities, which have been, or which were, offered, presented, submitted, processed, involved, or used, in or involving, or related to, a transaction or transactions on or involving any of the accounts serviced by the apparatus 1.

In FIG. 2, the central processing computer 3, in the preferred embodiment, comprises a central processing unit or CPU 3A, associated random access memory 3B (RAM) and read only memory 3C (ROM) devices, which are connected to the CPU 3A, a user input device 3D, which is a keypad and/or any other suitable input device for inputting data into the central processing computer 3 and which is also connected to the CPU 3A and a display device 3E for displaying information and/or data to a user or operator.

The central processing computer 3 also comprises a transmitter(s) 3F for transmitting signals and/or data to the point-of-sale terminal 2 and to the communication device 4 and/or to any one or more of the fax machine 5, personal computer 6, telephone 7, telephone answering machine 8, alternate telephone 9, alternate telephone answering machine 10, network computer 11, and/or alternate beeper 12 or alternate pager 13. The transmitter(s) 3F is also connected to the CPU 3A. The central processing computer 3 also comprises a receiver(s) 3G for receiving signals and/or data from the point-of-sale terminal 2 and from the communication device 4 and/or from any other suitable device which may be utilized in conjunction with the apparatus 1. The receiver(s) 3G is also connected to the CPU 3A. The central processing computer 3, in any and/or all of the embodiments described herein, may utilize a fax/modem and/or any other suitable computer communication device.

The central processing computer 3 also comprises a database(s) 3H which contains account information and data pertaining to the cardholders and/or to the cardholder accounts. The database 3H contains information about the cardholder, the cardholders account number, credit and/or account limits, previous purchases, number of unauthorized purchases made to the account and other information and/or data necessary to manage and/or process an account transaction as described herein.

The database 3H may also comprise data and/or information regarding specific limitations and/or restrictions which may be placed on a particular account, which may be pre-selected and/or programmed by the cardholder and which may include limitations and/or restrictions on the usage of the card. The limitations and/or restrictions may include the types of transactions which are allowed and/or authorized, the goods and/or services which may be purchased with the card, the vendors, stores and/or service provider which may be authorized to accept the card, limits on the dollar amounts of transactions pertaining to each authorized vendor, seller and/or service provider, daily spending limits, and/or the geographical area or location wherein authorized card use may be limited, and/or authorized times for card usage (i.e. specific days, dates, time of day, time of month, year, etc.), and/or any other limitation and/or restriction regarding amount of transaction, parties involved, geographical area, and/or times of allowed usage. The database 3H is also connected to the CPU 3A. The central processing computer 3 also comprises a printer 31 or other appropriate output device for outputting information and/or data to a user or operator.

The database 3H can also include or store information regarding transactions processed by the central processing computer 3 for any account(s) serviced by the central processing computer 3. The information can include, for each of any number of transactions for each or any number of accounts, a picture, a photograph, or a video clip, of the individual or individuals involved in a transaction, and/or audio information, a voice message or sample, and/or a voice print, which is a digital representation of a voice message or sample, obtained from the individual involved in the transaction, for each of any number of transactions processed by the central processing computer 3. For example, for any given account, the central processing computer 3 can store information for any number of transactions occurring on a given credit card account, charge card account, debit card account, and/or currency or "smart" card account. In this manner, a picture, a photograph, or a video clip, of the individual or individuals involved in a transaction, and/or audio information, a voice message or sample, and/or a voice print, which is a digital representation of a voice message or sample, obtained from the individual involved in the transaction, can be stored for any number of transactions on a respective card account, in order to perform identity verification for an individual involved in a transaction.

The database 3H of the central processing computer 3 can also contain copies of any of the images, digital copies, photographs, or pictures, of any of the respective documents, authorization forms, checks, forms, receipts, request forms, or other entities, which have been, or which were, offered, presented, submitted, processed, involved, or used, in or involving, or related to, a transaction or transactions on or involving any of the accounts serviced by the apparatus 1.

It is envisioned that a cardholder, or other authorized individual, of a respective credit card account, charge card account, debit card account, and/or currency or "smart" card account, can submit a photograph or picture or his or her face which can be stored in the database 3H as a "file photograph" or a "file picture" associated with the respective account. In a preferred embodiment, and "file photograph" or a "file picture" is stored as a digital file. It is also envisioned that the cardholder or authorized individual can also submit a pre-recorded voice message which can be digitized into a voice print which can be stored as a "file voiceprint".

In processing a transaction involving a respective credit card account, charge card account, debit card account, and/or currency or "smart" card account, the central processing computer 3 can process a picture, a photograph, or a video clip, of the individual or individuals involved in the transaction, and/or audio information, a voice message or sample, and/or a voice print, obtained from the individual involved in the transaction using the respective "file photograph", "file picture", and/or "file voice print", and/or can provide the "file photograph", "file picture", and/or "file voice print", to point-of-sale terminal 2 so that the operator of the point-of-sale terminal 2 can use same in verifying that the individual is the cardholder or authorized individual.

In FIG. 2, the communication device 4, in the preferred embodiment, comprises a central processing unit or CPU 4A, associated random access memory 4B (RAM) and read only memory 4C (ROM) devices, which are connected to the CPU 4A, a user input device 4D, which is a keypad or a plurality of keys and/or switches for inputting data into the communication device 4 and which is also connected to the CPU 4A, and a display device 4E, for displaying information and/or data to the cardholder, and a database 4F, which are also connected to the CPU 4A. The communication device 4 also comprises a receiver 4G for receiving signals and/or data from the central processing computer 3 and which is also connected to the CPU 4A, a transmitter 4H for transmitting signals and/or data to the central processing computer 3 and which is also connected to the CPU 4A.

The communication device 4 also includes a camera/microphone system 4I. In the preferred embodiment, the camera/microphone system 4I can include a camera or a video recording device which can be used to take a picture, a photograph, or a video clip of the cardholder. In the preferred embodiment, the camera/microphone system 4I can also include a microphone or an audio recording device which can be used to record audio information and/or the voice of the cardholder. In a preferred embodiment, voice information can be processed by the CPU 4A in order to generate a voiceprint file of the recorded voice.

In the preferred embodiment, the camera/microphone system 4I can be located on or in the communication device 4 so as to record the respective picture, photograph, or video clip, of the cardholder, and/or so as to record the audio information and/or the voice of the cardholder.

In the preferred embodiment, the database 4F can be utilized to store, for each of any number of transactions, a picture, a photograph, or a video clip, of the individual or individuals involved in a transaction, and/or audio information, a voice message or sample, and/or a voice print, which is a digital representation of a voice message or sample, obtained from the individual involved in the transaction at the point-of-sale terminal 2. The database 4F of the communication device 4 can also contain copies of any of the images, digital copies, photographs, or pictures, of any of the respective documents, authorization forms, checks, forms, receipts, request forms, or other entities, which have been, or which were, offered, presented, submitted, processed, involved, or used, in or involving, or related to, a transaction or transactions on or involving any of the accounts serviced by the apparatus 1.

In the preferred embodiment, the communication device 4 which is utilized is a cellular telephone, a personal digital assistant, a wireless telephone, a home computer, a personal computer, a laptop computer, a notebook computer, a netbook computer, an interactive television, and/or pager with a reply feature and/or device, or any of the other devices described-herein as being utilized as a communication device. A two-way pager and/or pager systems may also be utilized for implementing the respective component system (s) in the communication device 4/central processing computer 3 combination and/or link.

The apparatus 1 of the present invention, in the preferred embodiment, may be utilized in order to facilitate cardholder authorization, notification and/or security measures in financial transactions involving credit cards, charge cards, debit cards, and/or currency or "smart" cards, in the manner described below and with reference to FIGS. 3A, 3B, and 3C. In the preferred embodiment, the apparatus 1 of the present invention can provide an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or any other entity, or any number, group, or combination of, documents, authorization forms, authorization request forms, benefit request forms, claim forms, drafts, bank drafts, deposit forms, withdrawal forms, checks, forms, receipts, request forms, or any other entities, which is, or which are, offered, presented, submitted, processed, involved, or used, in or involving, or related to, a transaction on or involving an account.

In this manner, the apparatus 1 of the present invention may be utilized to obtain cardholder authorization in a card-related transaction.

Applicant hereby incorporates by reference herein the subject matter and teachings of U.S. Pat. No. 5,917,405 which teaches an apparatus and method for transmitting video information and/or audio information to a remote device on or over a communication network such as the Internet and/or the World Wide Web.

Figure 3A:
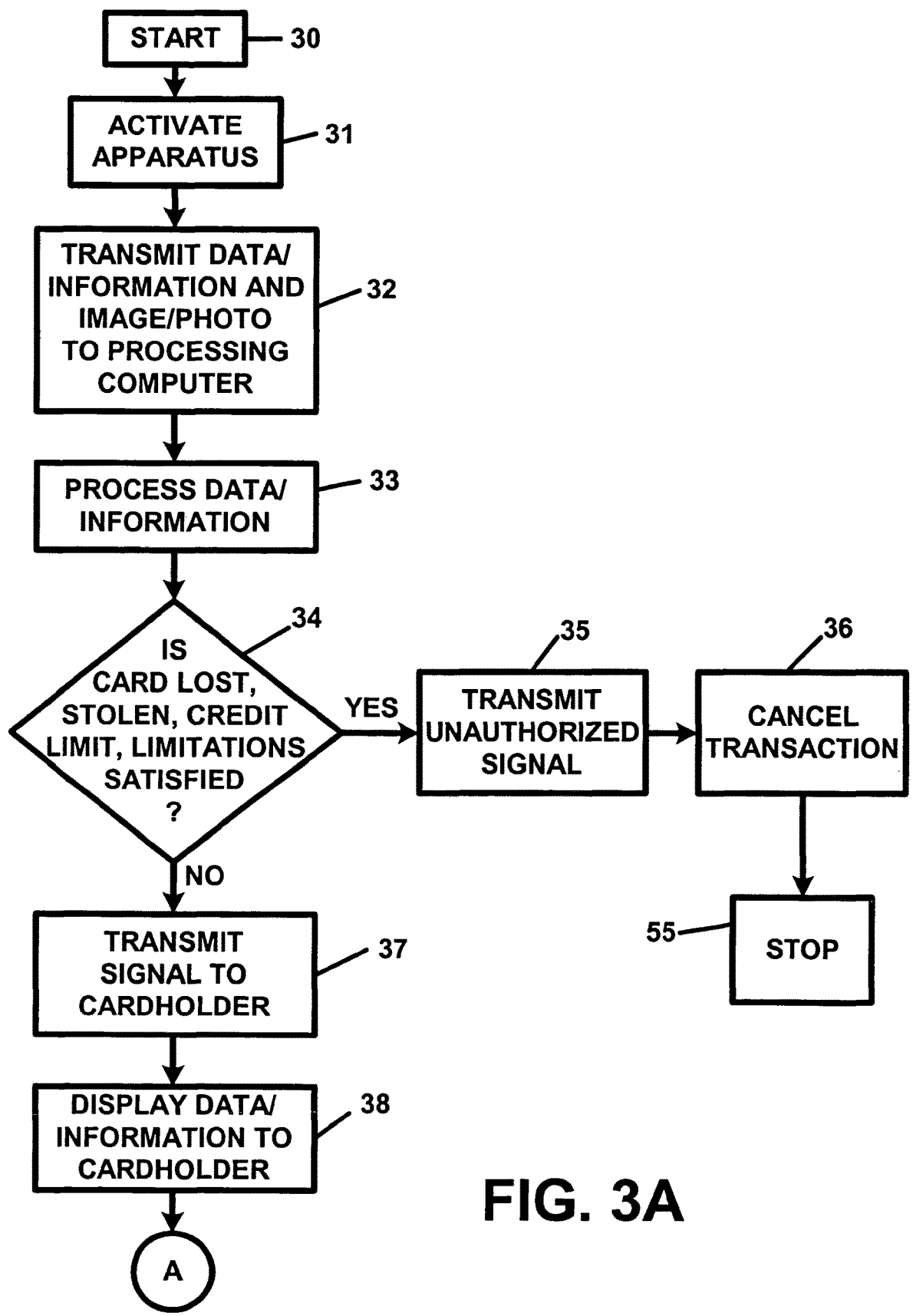
FIGS. 3A, 3B, and 3C illustrate the operation of the apparatus of FIG. 1 in flow diagram form.
Figure 3B:
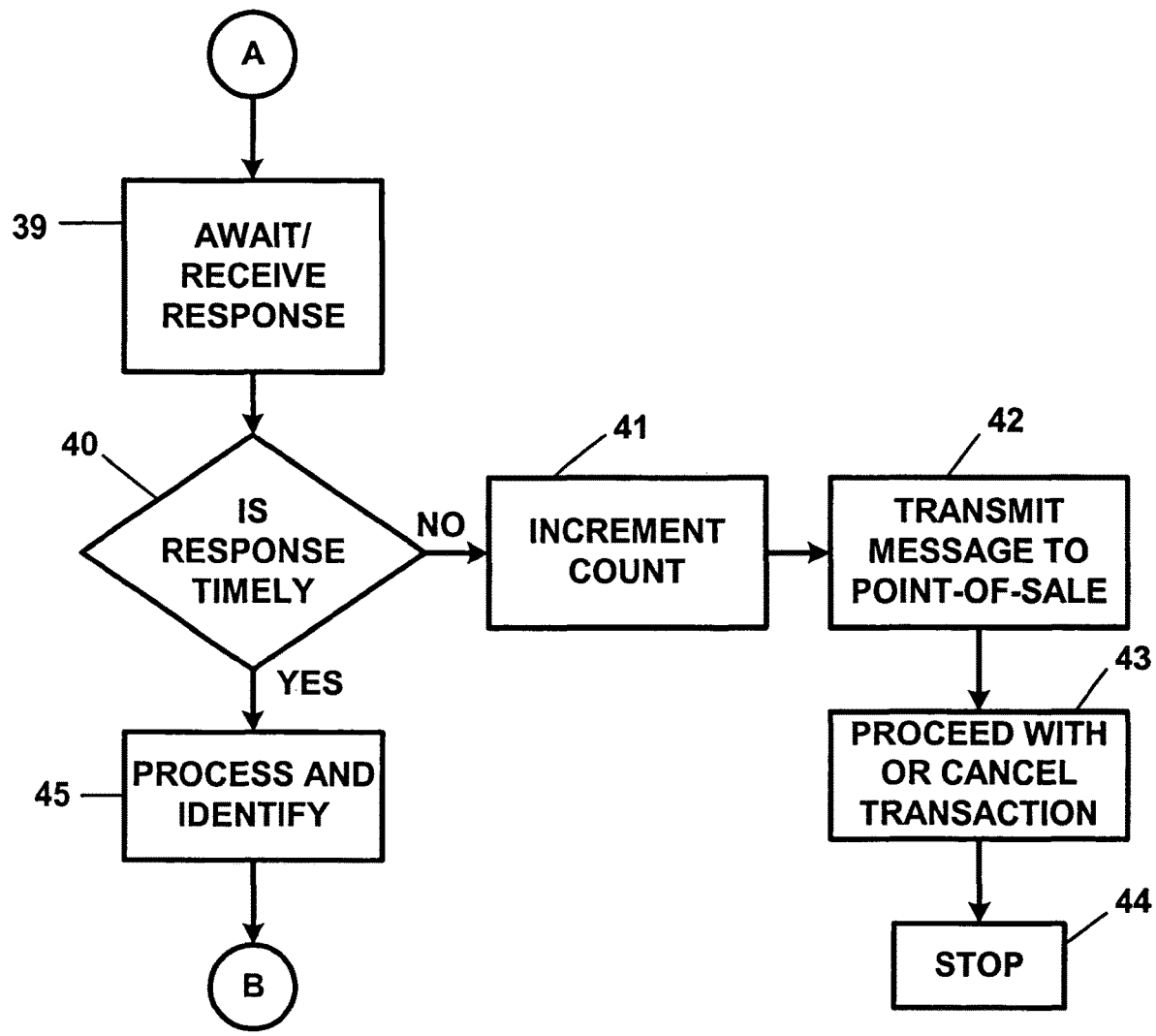
Figure 3C:
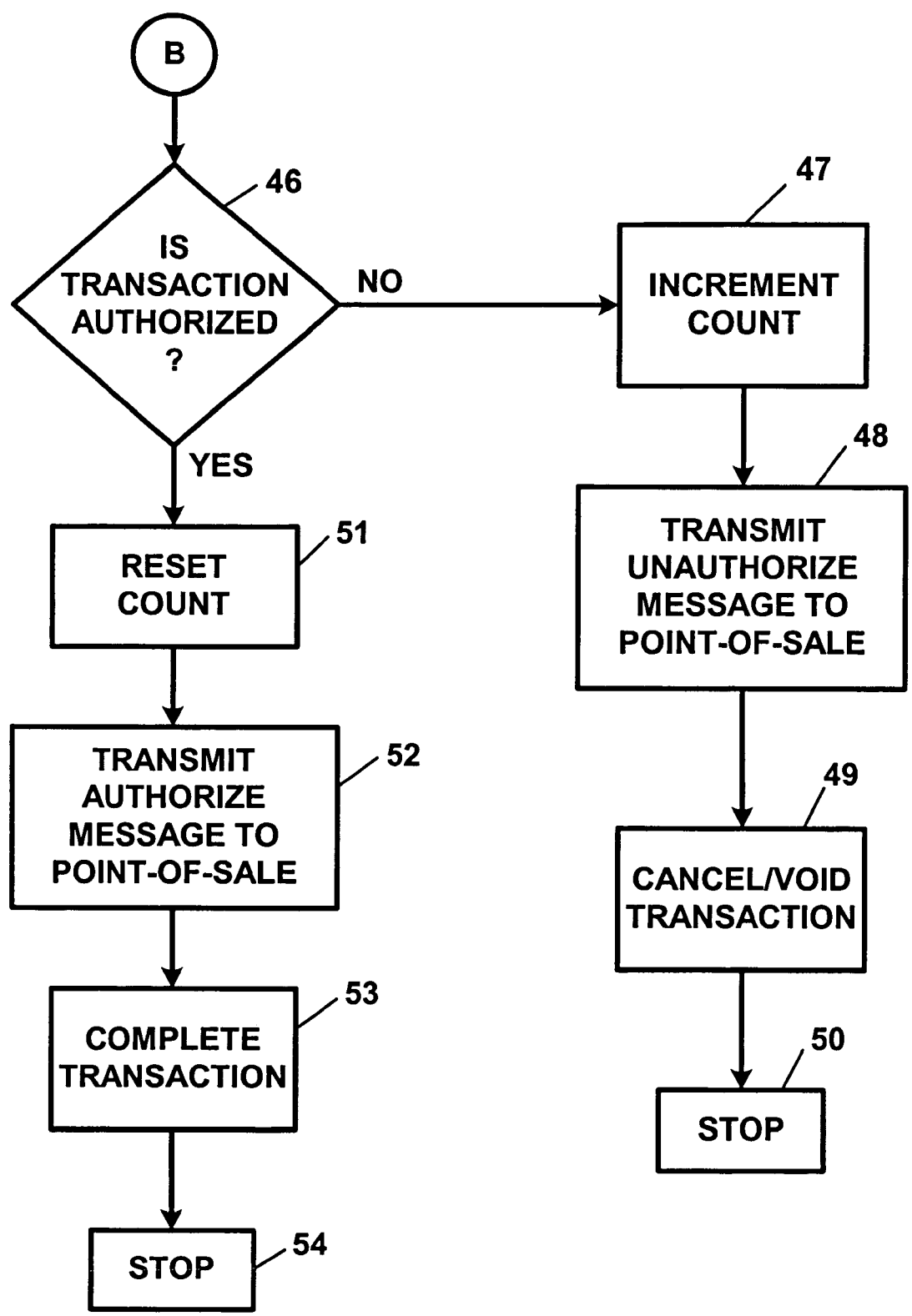

FIGS. 3A, 3B, and 3C illustrate the operation of the apparatus 1 in flow diagram form. With reference to FIGS. 3A, 3B, and 3C, the operation of the apparatus 1 commences at step 30 when the card, which is to be utilized in a credit card, charge card, debit card, and/or currency or "smart" card transaction, is presented, transmitted, or submitted, in the transaction, or when a document, authorization form, authorization request form, benefit request form, claim form, draft, bank draft, deposit form, withdrawal form, check, form, receipt, request form, or any other entity, or when an image, digital copy, photograph, or picture, of a document, authorization form, authorization request form, benefit request form, claim form, draft, bank draft, deposit form, withdrawal form, check, form, receipt, request form, or any other entity, is offered, presented, transmitted, submitted, processed, involved, or used, in or involving, or related to, the transaction.

At step 31, the sales or service attendant or point-of-sale terminal operator (hereinafter "point-of-sale terminal operator") will activate the apparatus 1 in any typical manner, such as by obtaining a phone line and entering card information into the point-of-sale terminal 2. This data entry is typically performed by swiping the magnetic strip of the card through the card reader 2B. In the case of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, the transaction, an image or a digital copy of the respective document, authorization form, authorization request form, benefit request form, claim form, draft, bank draft, deposit form, withdrawal form, check, form, receipt, request form, or any other entity, involved in, used in, or related to, the transaction can be obtained, scanned, or generated, and/or stored, by or in the point-of-sale terminal 2 using the user input device 2E of the point-of-sale terminal 2 or other suitable device, or a photograph or a picture of the respective document, authorization form, authorization request form, benefit request form, claim form, draft, bank draft, deposit form, withdrawal form, check, form, receipt, request form, or any other entity, involved in, used in, or related to, the transaction can be obtained, taken, recorded, or generated, or stored, in or by the point-of-sale terminal 2 using the camera/microphone system 2J of the point-of-sale terminal 2 or other suitable device.

In another preferred embodiment, at step 32, the individual involved in the transaction will be requested or instructed to look into, or pose for, the camera of the camera/microphone system 2J so that a photograph, a picture, or a video clip, can be taken of the individual's face. In the preferred embodiment, a photograph, picture, or video clip, is taken of the individual's face with the camera and a digital file of same is created and stored at the point-of-sale terminal 2. At step 32, the individual will be requested or instructed to recite a predetermined voice message into the microphone of the camera/microphone system 2J, so that a voice recording or a voice print can be obtained. The pre-determined voice message can be any appropriate message such as "My name is Raymond Joao" or "This is my credit card", or any other appropriate message. In a preferred embodiment, the voice message should be the same as that voice message for which a voice print was previously submitted for storage at the central processing computer 3.

In an Internet transaction, wherein the transaction is being performed with a remote point-of-sale terminal 2, the individual can take the photograph, picture, or video clip, by using a camera or web camera associated with his or her computer, home computer, personal computer, laptop computer, notebook computer, netbook computer, cellular telephone, personal digital assistant, or other communication device, and/or record the voice message or voice print on a microphone or other audio recording device associated with the respective computer, home computer, personal computer, laptop computer, notebook computer, netbook computer, cellular telephone, personal digital assistant, or other communication device. The respective photograph, picture, or video clip, and/or voice message or voice print can thereafter be transmitted to the receiver 2H of the point-of-sale terminal 2.

The information and/or data pertinent to the transaction, and/or the card, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the photograph, picture, and/or video clip, and/or the voice recording, and/or voice print, of the individual involved in the transaction, is then transmitted, at step 32, to the central processing computer 3. In a preferred embodiment, at step 32, the information and/or data pertinent to the transaction, and/or the card, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the photograph, picture, and/or video clip, and/or the voice recording, and/or voice print, of the individual involved in the transaction can also be transmitted to the communication device 4 to inform the cardholder and to provide him or her with information regarding the transaction, along with an image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or any or all of the other herein-described information. At step 32, the information regarding the transaction, along with the image or digital copy of the respective document, authorization form, authorization request form, benefit request form, claim form, draft, bank draft, deposit form, withdrawal form, check, form, receipt, request form, or any other entity, involved in, used in, or related to, the transaction, and/or the photograph, picture, and/or video clip, and/or the voice recording, and/or voice print, of the individual involved in the transaction, can also be stored in the central processing computer 3 and, in particular, in the database 3H, and can be retrieved at any time by any authorized individual.

The information and/or data pertinent to the transaction, and/or the card or account, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the photograph, picture, and/or video clip, and/or the voice recording, and/or voice print, of the individual involved in the transaction can thereafter be provided to the cardholder via the communication device 4.

In a preferred embodiment, the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, can be in the body of a message containing the information or data sent, such as in the body of the message, or the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, can be, or can be included, in an attachment to the message. In a preferred embodiment, the message, or the information or data pertinent to the transaction, can be included in, or can include, an electronic mail (e-mail) message, an instant message, or any other suitable message, electronic, digital, or otherwise, or can be included in any other electronic transmission.

In a preferred embodiment, the photograph, picture, and/or video clip, and/or the voice recording, and/or voice print, of the individual involved in the transaction, can be in the body of the message containing the information or data sent, such as in the body of the message, or the respective photograph, picture, and/or video clip, and/or the voice recording, and/or voice print, of the individual involved in the transaction, can be in an attachment to the message.

The cardholder can then, at step 32, or at any other time, review the information in the message, including viewing or reviewing the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, or viewing or reviewing the photograph, picture, and/or video clip, and/or the voice recording, of the individual involved in the transaction.

At any time, if the cardholder determines that the transaction is a fraudulent transaction or an unauthorized transaction, or that the individual is not an individual authorized for engaging in a transaction involving the respective account, the cardholder can transmit an unauthorized message to the point-of-sale terminal 2 so as to stop, cancel, or prevent, the transaction. The cardholder, in another preferred embodiment, can place an immediate or real-time telephone call to a telephone or other device associated with the point-of-sale terminal 2 and inform the operator of the point-of-sale terminal 2 that the transaction is unauthorized and/or fraudulent. The above telephone call can be a conventional telephone call or a voice over IP telephone call.

The central processing computer 3 will, at step 33, process the information and/or data pertinent to the transaction and/or to the particular card account and may request, if needed, that the point-of-sale operator enter the transaction amount. The central processing computer 3 will then process the information and/or data pertinent to the transaction in conjunction with the card account information in order to determine if the card has been lost, stolen and/or cancelled and/or de-activated. Further, the central processing computer 3 will perform a test to determine if the card has reached and/or exceeded the maximum credit, charge or debit limit and/or if the card has been depleted of its currency value.

The central processing computer 3 can also process the photograph or picture against the "file photograph" or "file picture" and/or can process the voice message against the "file voice print".

The central processing computer 3 may utilize any of the widely known data processing and/or software routines, which are known to those skilled in that art, in order to process transaction requests and/or authorizations involving the use of the respective card(s).

Once the information and/or data processing has been completed at step 33, the central processing computer 3, at step 34, will determine if the card has been lost, stolen, and/or cancelled and/or de-activated, or if the credit, charge or debit limit of the card has been reached and/or exceeded, or if the currency value of the card has been depleted.

The central processing computer 3 will, at step 34, also perform a test in order to determine if the predetermined maximum number of unauthorized transactions have occurred on the account. The unauthorized transactions count refers to transactions which are not authorized by the cardholder as will be described herein. The authorized transaction count (UNAUTHCT) is a variable which is pre-set to zero (0) at the time the card account is issued. Each time an unauthorized transaction occurs, the unauthorized transaction count is incremented by one (1). Once the unauthorized transaction count reaches a pre-defined limit of, for example, three (3), the central processing computer 3 will cancel the transaction and de-activate the card. The central processing computer 3 will then notify the cardholder. In this manner, the apparatus 1 will enable the central processing computer 3 of an issuing and/or card servicing institution to cancel and/or de-activate the card, either permanently and/or temporarily, in cases when the cardholder may have failed to respond or to reply to transaction notices, which may be the case when the cardholder is not aware that the card has been lost or stolen, or when the card or account number has been duplicated, "cloned", or in other ways utilized without the cardholder's authorization, and/or when the cardholder is unable to respond or reply to the transaction notices for some other reason(s). This feature of the present invention serves to put a usage limit on the use of the card(s). The central processing computer 3, at step 34, will also perform a test(s) to determine if any additional limitations and/or restrictions have been met and/or satisfied. The central processing computer 3 can also process the photograph or picture against the "file photograph" or "file picture" and/or can process the voice message against the "file voice print" to determine if the individual is not the cardholder or other authorized individual.

If any of the above listed conditions exist (i.e. card is lost, stolen, cancelled and/or de-activated, or credit, charge or debit limit is reached and/or exceeded, currency value depleted, unauthorized transaction limit reached or exceeded limitations and/or restrictions violated, etc.), the central processing computer 3 will, at step 35, transmit a signal to the point-of-sale terminal 2 indicating that the transaction is not approved and/or is not authorized. The point-of-sale terminal operator may then cancel the transaction, at step 36. The point-of-sale terminal operator may then confiscate the card and/or alert the authorities. Upon the completion of step 36, the apparatus will cease operation at step 55. At step 34, if requested pursuant to a pre-existing agreement between the respective merchant and operator of the central processing computer 3, and/or if requested by the point-of-sale terminal operator during the transaction, the central processing computer 3 can retrieve and transmit a "file photograph" or "file picture", of the cardholder or authorized individual or authorized individuals, to the point-of-sale terminal 2 for display thereat. If the point-of-sale terminal operator does not recognize the individual involved in the transaction as being the cardholder or other authorized individual, then the point-of-sale terminal operator can stop, void, or cancel the transaction at that moment and at step 55 and so inform the central processing computer 3 and/or the cardholder by transmitting an appropriate signal or message to the central processing computer 3 or the cardholder's communication device 4.

If, at step 34, the central processing computer 3 determines that the card is not lost, stolen, cancelled or de-activated, or that the credit, charge or debit limit of the card has not been reached or exceeded, or that the of unauthorized transactions count (UNAUTHCT) has not reached a pre-defined limit, or whether any other pre-defined, pre-selected and/or programmed limitation(s) and/or restriction(s) have been met, have been satisfied and/or have been reconciled, the central processing computer 3 will, at step 37, transmit a signal and/or data containing any and/or all of the above-described information regarding the transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or and audio clip or voice print, of the individual involved in the transaction, to the communication device 4. In this regard, at step 37, a signal and/or data containing any and/or all of the above-described information regarding the transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or audio clip or voice print, of the individual involved in the transaction, can also be transmitted to, or re-transmitted to, the communication device 4, which can be any one or more of the communication devices 4 described herein, which is located at the cardholder.

At step 37, the central processing computer 3 will then also transmit respective signals and/or data, containing any and/or all of the above-described information regarding the transaction, including information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or audio clip or voice print, of the individual involved in the transaction, to any one or more of the cardholder's designated fax machine 5, personal computer 6, telephone 7, telephone answering machine 8, alternate telephone 9, alternate telephone answering machine 10, network computer 11, and/or alternate beeper 12 or alternate pager 13, or any other communication device. The signals and/or data can be transmitted to more than one of the above devices 5-13, or to any other communication device or devices, either sequentially or simultaneously.

The information and/or data which is transmitted to the communication device 4, can include, in addition to any of the herein-described information, the information pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or audio clip or voice print, of the individual involved in the transaction, and can also include information and/or data identifying the transaction and may include the name of the store or the service provider and the amount of the transaction, as well as the photograph, picture, and/or video clip, and/or the voice recording, and/or voice print. The information and/or data may also provide the time of the transaction, the location (i.e. city, town, village, state, country etc.) of the transaction. The information and/or data may also include the phone number of the central processing office and/or computer servicing the account so that the cardholder may telephone same in order to authorize or cancel the transaction. The information and/or data may also be supplemented to include the type of goods and/or services involved in the transaction, if such information can be entered at the point-of-sale terminal 2.

At step 38, the information and/or data which is transmitted from the central processing computer 3 and received at the communication device 4 is displayed to the cardholder on the display device 4E of the communication device 4. The information displayed on the display device 4E includes the name of the store or the service provider, the amount of the transaction, the time of the transaction and the location of the transaction. The information and/or data may also be supplemented to include the type of goods and/or services involved in the transaction, if such information can be entered at the point-of-sale terminal 2.

In an instance where the cardholder has not responded earlier, the apparatus 1 will then, at step 39, wait for the cardholder to respond to the transmission. During this time, the cardholder may utilize the communication device 4, which in a preferred embodiment, may be a cellular telephone, a personal digital assistant, a wireless telephone, a home computer, a personal computer, a laptop computer, a notebook computer, a netbook computer, a television, an interactive television, a digital television, a beeper, or a pager, or any of the communication devices 4 described herein, and/or a reply or two-way pager feature on the communication device 4, or any other communication device, in order to either approve or authorize the transaction or disapprove of or void the transaction. At step 39, the central processing computer 3 will also receive the response if one is sent. At step 40, the apparatus 1 will determine if the cardholder has made a reply or response within the pre-defined time limit which is chosen, in the preferred embodiment, to be one (1) minute. The cardholder may also transmit a signal via an appropriate key or button suspending use of the card such as when he or she may first be apprised of the fact that the card has been lost or stolen. In instances when the communication device 4 does not have a reply feature associated with the communication device 4, or means for communicating with the central processing computer 3, the cardholder may simply telephone the central processing office or a processing center for the card in order to personally appraise the center or office of his or her response to the central processing computer transmission regarding the transaction.

If the cardholder does not respond or reply to the central processing office within the pre-specified time, chosen, in the preferred embodiment, to be one (1) minute, the central office computer will, at step 41, increment the unauthorized transaction count (UNAUTHCT) by one (1) and will, at step 42, transmit a signal and/or data to the point-of-sale terminal 2 indicating that, with the exception of receiving the authorization of the cardholder, the transaction is otherwise approved. The point-of-sale terminal operator may then, at step 43, either proceed to consummate the transaction, try to obtain additional information from the purchaser, or cancel the transaction. The action taken by the point-of-sale terminal operator may be dictated by the specific agreement in effect between the sales and/or service provider establishment and the bank or financial institution administering the card account. Upon the completion of step 43, the operation of the apparatus 1 will cease at step 44. If the cardholder should reply or respond to the transaction notice at a later period, the response or reply information may then be utilized in order to approve of, or to disapprove and/or to dispute, the transaction.

If, at step 40, the response or reply is determined to be timely, the central processing computer 3 will, at step 45, process and identify the cardholder response. At step 46, the central processing computer 3 will determine if the cardholder has replied or responded so as to authorize the transaction. If the cardholder's response is to cancel, disapprove or, or not to authorize, the transaction, the central processing computer 3 will, at step 47, increment an unauthorized transaction count by 1. At this juncture, it is important to note that the unauthorized count (UNAUTHCT) is set to zero at the time of the issuance of the card. After the unauthorized transaction count has been incremented, the central processing computer 3 will, at step 48, transmit a signal and/or data to the point-of-sale terminal 2 which will notify and/or instruct the point-of-sale terminal operator that the transaction is not authorized and should, therefore, be cancelled or voided. The point-of-sale terminal operator may then cancel the transaction at step 49. The point-of-sale terminal operator may then confiscate the card and/or alert the authorities. Upon the completion of step 49, the apparatus will cease operation at step 50.

If, at step 46, the central processing computer 3 identifies the cardholder reply or response as being one to authorize the transaction, the central processing computer 3, at step 51, will reset the unauthorized transaction count (UNAUTHCT) to 0. An unauthorized transaction count (UNAUTHCT) of 0 will signify that any string of unauthorized transactions has now been broken by the cardholder, and further, that the present transaction is approved by the cardholder. The central processing computer 3 will then, at step 52, transmit a signal and/or data to the point-of-sale terminal 2 which will notify and/or instruct the point-of-sale terminal operator that the transaction is authorized and/or approved. In another preferred embodiment, the cardholder can also transmit an authorization message to the point-of-sale terminal 2.

The point-of-sale terminal operator may then complete the transaction, at step 53. After the transaction has been completed at step 53, the operation of the apparatus 1 will cease at step 54.

In instances when the cardholder is a party to the transaction, he or she, having the communication device 4 on his or her person, may authorize the transaction at the point-of-sale location. If the transaction is a telephone and/or other remotely made transaction, the cardholder may authorize the transaction from his or her remote location. The cardholder may also program and/or set the communication device 4 to automatically authorize or disapprove or disallow transactions. In this regard, the communication device 4 may be programmable so as to receive and analyze the transaction information and/or data and reply and/or respond to same automatically and/or with preset and/or programmed relies and/or responses. The communication device 4 may also be programmable so as to limit the amounts of transactions. In this regard, the cardholder may provide for temporary transaction and/or purchasing amounts.

The communication device 4, in the preferred embodiment, is provided with a memory device for storing any of the information or data described herein as being provided by the apparatus 1 for any number of transactions so that the cardholder may review his or her card and/or account activity and/or transactions which have occurred involving his or her card. In this manner, the cardholder may "scroll" through and/or in other ways review card and/or account activity. The communication device 4 may also be equipped to service more than one card. For example, a cardholder's MASTERCARD®, VISA®, and/or AMERICAN EXPRESS®, card or cards and the accounts corresponding thereto may all be serviced with or by a single communication device 4.

The apparatus and method of the present invention provides for the real-time notification of financial transactions involving credit cards, charge cards, debit cards, and/or currency or "smart" cards, which also provides information regarding the transaction, along with an image, digital copy, photograph, or picture, of a respective document, authorization form, authorization request form, benefit request form, claim form, draft, bank draft, deposit form, withdrawal form, check, form, receipt, request form, or any other entity, involved in, used in, or related to, the transaction, and which also enables a cardholder to monitor, in real-time, activity involving his or her card(s) and the corresponding accounts. The apparatus and method of the present invention also provides a means and a mechanism by which to inform a cardholder that his or her card(s) are lost or stolen, and/or that his or her card(s), and/or the account numbers corresponding thereto, are utilized without his or her authorization and also provides an indication to the cardholder of where his or her card(s) or corresponding account number(s) is being utilized in transactions while also providing the cardholder with an image, digital copy, photograph, or picture, of a respective document, authorization form, authorization request form, benefit request form, claim form, draft, bank draft, deposit form, withdrawal form, check, form, receipt, request form, or any other entity, involved in, used in, or related to, the transaction. The cardholder may then report the card lost or stolen and/or cancel and/or de-activate the card and/or the account.

The present invention also provides a means and a mechanism by which to monitor the number of transactions which are unauthorized by the cardholder and to determine whether or not to authorize transactions and/or cancel or de-activate the card(s) and/or the account. In the above manner, the apparatus and method of the present invention provides an apparatus and a method for preventing and/or for drastically limiting fraudulent and/or unauthorized use of credit cards, charge cards, debit cards, and/or currency or "smart" cards, and/or the account numbers corresponding thereto. The present invention also provides a means and a mechanism for providing an image, digital copy, photograph, or picture, of a respective document, authorization form, authorization request form, benefit request form, claim form, draft, bank draft, deposit form, withdrawal form, check, form, receipt, request form, or any other entity, involved in, used in, or related to, a transaction or transactions, for any number of transactions and for any number of accounts.

In another preferred embodiment, wherein a number of transactions may be batch processed or otherwise processed in batches or processed in groups, the apparatus 1 can, at step 32 and/or at step 37, transmit the information and/or data pertinent to each of and/or all of the transactions, and/or the card or account used in same, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, each of the transactions, and/or the photograph, picture, and/or video clip, and/or the voice recording, and/or voice print, of the individual involved in the transaction, associated with each of the transactions, can be transmitted to the communication device 4 and the cardholder or account holder can review the information as desired. In this regard, in another preferred embodiment, all of the herein-described information pertaining to each transaction processed in a batch processing of transactions on or involving an account or accounts, can be processed, obtained, gathered, or stored, and/or can be transmitted, in a single message, or in any number of messages, to the communication device at step 32 and/or at step 37.

The present invention, in an alternate embodiment, may be utilized so as to provide authorization, notification, and/or security, in banking and related financial transactions involving checking accounts, savings accounts, and/or automated teller machine (ATM) accounts, and transactions and/or other transactions wherein an account owner may be notified of a transaction and/or an attempted transaction.

In another preferred embodiment of the present invention, the present invention provides an authorization, notification, and/or security, apparatus and method which provides a notification of a transaction on or involving any one or more of the accounts described herein along with an image, digital copy, photograph, or picture, of a respective document, authorization form, authorization request form, benefit request form, claim form, draft, bank draft, deposit form, withdrawal form, check, form, receipt, request form, or any other entity, involved in, used in, or related to, a transaction, which is offered, presented, submitted, processed, involved, or used, in or involving, or related to, a transaction on or involving a bank account, checking account, savings account, or ATM account.

FIG. 4 illustrates a block diagram of an alternate embodiment of the apparatus of the present invention which is utilized in conjunction with a checking account, savings account, and/or ATM account and/or transaction (hereinafter referred to as a "banking transaction") and/or the authorization process involved therewith. The apparatus of FIG. 4 is denoted generally by the reference numeral 100. In FIG. 4, the apparatus 100 consists of a banking transaction terminal which terminals are found in banks and financial establishments. In the preferred embodiment, the banking transaction terminal 102 is a teller terminal, a processing computer terminal and/or an ATM terminal. Any other terminal or similar device may also be utilized as the banking transaction terminal 102 depending upon the application and/or the transaction. The banking transaction terminal 102 includes a camera and/or a microphone, and/or any other video recording device and/or audio recording device, for obtaining a picture and/or video information and/or audio information regarding an individual engaging in a banking transaction.

The banking transaction terminal 102 (hereinafter referred to as "banking terminal") may be any of the widely used and well known terminals or devices for providing banking transactions over-the-counter, ATM transactions and/or in any other type of financial transactions, including clearing transactions, check clearing and/or account charging and/or charge-back transactions, which transactions banks and financial institutions perform and/or engage in.

Typically, the banking terminals and/or devices comprise a computer terminal having an input device such as a keyboard and/or various reader and/or scanning device for reading and/or scanning, respectively, information and/or data necessary in order to perform the transaction. The banking terminal transmits an authorization request which may include the data pertaining to the particular account which is accessed and/or involved in the transaction and the type and the amount of the transaction, over a communications medium, to a central processing computer for processing the transaction, the transaction request and/or the authorization request pertaining thereto. The banking terminal may transmit the transaction authorization request and/or notice to a central processing computer via a central bank computer (not shown) which may be a central computer at the particular bank or financial institution. The central processing computer may also be a central computer system which is not located at the bank or financial institution, but rather, services the particular bank or financial institution or a group of banks or financial institutions.

The banking terminal 102 also receives the transaction and/or authorization data and/or information from the central processing computer. If a central bank computer is utilized, the data transmitted from the central processing computer would be transmitted to the banking terminal 102 via the central bank computer. A printed transaction receipt may also be provided at and/or obtained via the banking terminal 102, or peripheral device associated therewith, for printing a transaction receipt which is usually provided to the account holder at the time and/or location of the transaction.

The banking terminal or other device 102 may also comprise, and/or have associated therewith, a keypad for the manual entry of transaction information and/or data, such as the amount of the transaction, account number, etc. The banking terminal 102 may also be an integral component of a teller and/or cashier work station and/or other transaction terminals and/or devices, including those which may provide for the automatic entry of transaction information and/or data. The banking terminal or other device 102 may also include a scanner or other input device for obtaining an image or a digital copy of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving an account.

The apparatus 100 also comprises a central processing computer 103 which services any bank and/or financial institution and/or any pre-defined group of banks and/or financial institutions and/or any number of accounts associated therewith. For example, the central processing computer 103 may handle all checking accounts, savings accounts and/or other accounts for a given bank or banks. The central processing computer 103, for example, may process and maintain records of deposits, withdrawals, checks cashed, drafts, ATM deposits, ATM withdrawals, charges made against an account, credits made to an account, etc., and/or any combinations of same. The central processing computer 103 may process accounts for any of the various banks and/or financial institutions.

In the preferred embodiment, the banking terminal 102 is linked and/or connected to the central processing computer 103 via a telecommunications system, link and/or medium (hereinafter referred to as "communications system") such as, for example, a telephone network or line. As noted above, the banking terminal 102 may or may not be linked to the central processing computer 103 via a central bank computer. It is important to note that the communications system which is utilized may be any communications system and may include telecommunication systems, satellite communications systems, radio communication systems, digital communications systems, digital satellite communications systems, personal communications services communication systems as well as any other appropriate communications system. The banking terminal 102 transmits signals and/or data to the central processing computer 103 as well as receives signals and/or data from the central processing computer 103.

The central processing computer 103 may be a mainframe computer, a mini-computer, a micro-computer, a server computer, such as those utilized in conjunction with on-line services and/or in a network environment, and/or any other suitable computer or computer system.

The apparatus 100 also comprises an account owner communication device 104 which may receive signals and/or data from either or both of the banking transaction terminal 102 and/or the central processing computer 103. In the preferred embodiment of FIG. 4, the communication device 104 receives signals and/or data from the central processing computer 103 with said signals being transmitted via a suitable communication system. In the preferred embodiment, the communications system or network utilized for transmitting signals and/or data to the communication device 104 is a wireless communication network and/or the Internet and/or the World Wide Web and the communication device 104 is a telephone signal receiving device such as a cellular telephone, a wireless telephone, a personal digital assistant, a home computer, a personal computer, a laptop computer, a notebook computer, a netbook computer, or a telephone beeper or pager. The communication device 104, which may be a pager, receives the wireless telephone signals and/or data from the central processing computer 103 during the authorization procedure as will be described in more detail below.

In the preferred embodiment, the communication device 104 is also equipped with a transmitter for transmitting signals and/or data to the central processing computer 103. In this regard, the central processing computer 103 transmits signals and/or data to the communication device 104 as well as receives signals and/or data from the communication device 104. The communication device 104 may also transmit signals and/or data directly to the banking terminal 102 and receive signals and/or data directly from the banking terminal 102. In the preferred embodiment, the banking terminal 102 transmits signals and/or data to the central processing computer 103 and receives signals and/or data from the central processing computer 103. Further, in the preferred embodiment, the communication device 104 receives signals and/or data from the central processing computer 3 and transmits signals and/or data to the central processing computer 103.

As noted above, the communication device 104 is a wireless device. In this regard, the communication device 104 or pager may be carried by the account owner and/or be kept on and/or close to the account owner's person so that the central processing computer 103 may transmit signals and/or data to the communication device 104 so as to communication with the account owner at any time.

In the preferred embodiment, the apparatus 100 also comprises a facsimile (fax) machine 105, a personal computer 106, a telephone 107, a telephone answering machine 108, an alternate telephone 109, an alternate telephone answering machine 110, a network computer 111, and/or an alternate beeper 112 or alternate pager 113. The central processing computer 103 may be linked with the above fax machine 105, personal computer 106, telephone 107, associated answering machine 108, alternate telephone 109, alternate telephone answering machine 110, network computer 111, alternate beeper 112 and alternate pager 113, via any suitable communication system. In the preferred embodiment, a telecommunications link or telephone line or link, which may or may not be a wireless link, depending on the device and/or the circumstances, is utilized in order to link the central processing computer 103 with each of the fax machine 105, the personal computer 106, the telephone 107, the associated answering machine 108, the alternate telephone 109, the alternate telephone answering machine 110, the network computer 111, the alternate beeper 112 and the alternate pager 113.

FIG. 5 illustrates the various components of the apparatus 100 of FIG. 4. In FIG. 5, the banking transaction terminal 102 ("banking terminal"), in the preferred embodiment, comprises a central processing unit or CPU 102A, a scanner or reader 102B, which is connected to the CPU 102A, associated random access memory 102C (RAM) and read only memory 102D (ROM) devices, which are also connected to the CPU 102A, a user input device 102E, which is typically a keypad, keyboard, mouse, reader, or scanner, or any combination of same, or other suitable input device for inputting data into the banking terminal 102 and which is also connected to the CPU 102A, and a display device 102F for displaying information and/or data to a user or operator, which display device 102F is also connected to the CPU 102A.

The banking terminal 102 also comprises a transmitter 102G for transmitting signals and/or data to the central processing computer 103, and/or to the communication device 104 and/or to any other device associated with the account owner and/or the apparatus, if desired. The transmitter 102G is also connected to the CPU 102A. The banking terminal 102 also comprises a receiver 102H for receiving signals and/or data from the central processing computer 103, and from the communication device 104 and/or from any other associated device which may be utilized, if desired. The receiver 102H is also connected to the CPU 102A. The banking terminal 102 also comprises a printer 102I or other appropriate output device for outputting data to the operator. The printer 102I is also connected to the CPU 102A. In the preferred embodiment, the printer 102I prints receipts corresponding to the transaction.

The banking terminal 102 also includes a camera/microphone system 102J. In the preferred embodiment, the camera/microphone system 102J can include a camera or a video recording device which can be used to take a picture, a photograph, or a video clip of an individual or individuals involved in a banking transaction involving a checking account, a savings account, and/or an automated teller machine account. In the preferred embodiment, the camera/microphone system 102J can also include a microphone or an audio recording device which can be used to record audio information and/or the voice of an individual involved in a banking transaction involving a checking account, a savings account, and/or an automated teller machine account. In a preferred embodiment, voice information can be processed by the CPU 102A in order to generate a voiceprint file of the recorded voice.

In the preferred embodiment, the camera/microphone system 102J is also used to take a picture or a photograph of a respective document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a respective account.

In the preferred embodiment, the camera/microphone system 102J can be located on or in the vicinity of the banking terminal 102 so as to record the respective picture, photograph, or video clip, of the individual or individuals involved in a banking transaction, and/or so as to record the audio information and/or the voice of the individual involved in the banking transaction.

In the preferred embodiment, the banking terminal 102 can also include a database (not shown) which can be utilized to store information regarding banking transactions processed by the banking terminal 102. The information can include, for each of any number of banking transactions, a picture, a photograph, or a video clip, of the individual or individuals involved in a banking transaction, and/or audio information, a voice message or sample, and/or a voice print, which is a digital representation of a voice message or sample, obtained from the individual involved in the banking transaction.

The database of the banking terminal 102 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 100.

In FIG. 5, the central processing computer 103, in the preferred embodiment, comprises a central processing unit or CPU 103A, associated random access memory 103B (RAM) and read only memory 103C (ROM) devices, which are connected to the CPU 103A, a user input device 103D, which is a keypad or any other suitable input device, for inputting data into the central processing computer 103 and which is also connected to the CPU 103A, and a display device 103E for displaying information and/or data to a user or operator.

The central processing computer 103 also comprises a transmitter(s) 103F for transmitting signals and/or data to the banking terminal 102 and to the communication device 104 and/or to any one or more of the fax machine 105, the personal computer 106, the telephone 107, the telephone answering machine 108, the alternate telephone 109, the alternate telephone answering machine 110, the network computer 111, the alternate beeper 112, and/or the alternate pager 113. The transmitter(s) 103F is also connected to the CPU 103A. The central processing computer 103 also comprises a receiver(s) 103G for receiving signals and/or data from the banking transaction terminal 102 and from the communication device 104 and/or from any other suitable device which may be utilized in conjunction with the apparatus 100. The receiver(s) 103G is also connected to the CPU 103A.

The central processing computer 103 also comprises a database(s) 103H which contains account information and data pertaining to the account owner's account(s). The database 103H contains information about the account owner, the account number, etc., and any other information and/or data necessary to manage and/or process an account and/or account transaction as described herein. The database 103H is also connected to the CPU 103A. The central processing computer 103 also comprises a printer 103I or other appropriate output device for outputting information and/or data to a user or operator, which printer 103I or other output device is also connected to the CPU 103A.

The database 103H can also include or store information regarding banking transactions processed by the central processing computer 103 for any account(s) serviced by the central processing computer 103. The information can include, for each of any number of banking transactions for each or any number of accounts, a picture, a photograph, or a video clip, of the individual or individuals involved in a banking transaction, and/or audio information, a voice message or sample, and/or a voice print, which is a digital representation of a voice message or sample, obtained from the individual involved in the banking transaction, for each of any number of banking transactions processed by the central processing computer 103. For example, for any given checking account, savings account, and/or automated teller machine account, the central processing computer 103 can store, for any number of banking transactions occurring on the respective account. In this manner, a picture, a photograph, or a video clip, of the individual or individuals involved in a banking transaction, and/or audio information, a voice message or sample, and/or a voice print, which is a digital representation of a voice message or sample, obtained from the individual involved in the banking transaction, can be stored for any number of banking transactions on a respective checking account, savings account, and/or automated teller machine account, in order to perform identity verification for an individual involved in a banking transaction.

The database 103 of the central processing computer 103 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 100.

It is envisioned that an account holder, or other authorized individual, of a respective checking account, savings account, and/or automated teller machine account, can submit a photograph or picture or his or her face which can be stored in the database 103H as a "file photograph" or a "file picture" associated with the respective account. In a preferred embodiment, and "file photograph" or a "file picture" is stored as a digital file. It is also envisioned that the account holder or other authorized individual can also submit a pre-recorded voice message which can be digitized into a voice print which can be stored as a "file voice print".

In processing a banking transaction involving a respective checking account, savings account, and/or automated teller machine account, the central processing computer 103 can process a picture, a photograph, or a video clip, of the individual or individuals involved in the banking transaction, and/or audio information, a voice message or sample, and/or a voice print, obtained from the individual involved in the banking transaction using the respective "file photograph", "file picture", and/or "file voice print", and/or can provide the "file photograph", "file picture", and/or "file voice print", to banking terminal 102 so that the operator of the banking terminal 1022 can use same in verifying that the individual is the account holder or authorized individual.

In FIG. 5, the communication device 104, in the preferred embodiment, comprises a central processing unit or CPU 104A, associated random access memory 104B (RAM) and read only memory 104C (ROM) devices, which are also connected to the CPU 104A, a user input device 104D, which is a keypad or a plurality of keys and/or switches for inputting data into the communication device 104 and which is also connected to the CPU 104A, and a display device 104E, for displaying information and/or data to the account owner, and a database 104F. This display device 104E and the database 104F are also connected to the CPU 104A. The communication device 104 also comprises a receiver 104G for receiving signals and/or data from the central processing computer 103 and which is also connected to the CPU 104A, and a transmitter 104H for transmitting signals and/or data to the central processing computer 103 and which is also connected to the CPU 104A.

The communication device 104 also includes a camera/microphone system 104I. In the preferred embodiment, the camera/microphone system 104I can include a camera or a video recording device which can be used to take a picture, a photograph, or a video clip of the account holder. In the preferred embodiment, the camera/microphone system 104I can also include a microphone or an audio recording device which can be used to record audio information and/or the voice of the account holder. In a preferred embodiment, voice information can be processed by the CPU 104A in order to generate a voiceprint file of the recorded voice.

In the preferred embodiment, the camera/microphone system 104I can be located on or in the communication device 104 so as to record the respective picture, photograph, or video clip, of the account holder, and/or so as to record the audio information and/or the voice of the account holder.

In the preferred embodiment, the database 104F can be utilized to store, for each of any number of banking transactions, a picture, a photograph, or a video clip, of the individual or individuals involved in a banking transaction, and/or audio information, a voice message or sample, and/or a voice print, which is a digital representation of a voice message or sample, obtained from the individual involved in the banking transaction at the banking terminal 102.

The database 104F of the communication device 104 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 100.

In the preferred embodiment, the communication device 104 which is utilized is a cellular telephone, a personal digital assistant, a wireless telephone, a home computer, a personal computer, a laptop computer, a notebook computer, a netbook computer, an interactive television, and/or pager with a reply feature and/or device, or any of the other devices described-herein as being utilized as a communication device. A two-way pager and/or pager system(s) may also be utilized for implementing the respective component systems in the communication device 104/central processing computer 103 combination and/or link.

The apparatus 100 of the present invention, in the preferred embodiment, may be utilized in order to facilitate account owner authorization, notification and/or security, in financial transactions involving checking accounts, savings accounts, and ATM accounts, and/or any transactions involving same in the manner described below and with reference to FIGS. 6A, 6B and 6C. In the preferred embodiment, the apparatus 100 of the present invention can provide an authorization, notification, and/or security, apparatus and method which provides a notification of a financial transaction on or involving a checking account, a savings account, or an ATM account, and/or in or for any transactions involving same, or any transaction on or involving any one or more of the accounts described herein, along with an image, a digital copy, a photograph, or a picture, of a document, authorization form, authorization request form, benefit request form, claim form, draft, bank draft, deposit form, withdrawal form, check, form, receipt, request form, or other entity, or any number, group, or combination of, documents, authorization forms, authorization request forms, benefit request forms, claim forms, drafts, bank drafts, deposit forms, withdrawal forms, checks, forms, receipts, request forms, or other entities, which is or were, or which are, offered, presented, submitted, processed, involved, or used, in or involving, or related to, a transaction or transactions on or involving a checking account, a savings account, or an ATM account, or any other account. In this manner, the apparatus and method of the present invention may be utilized to obtain account owner authorization in a banking and/or financial transaction.

Figure 6A:
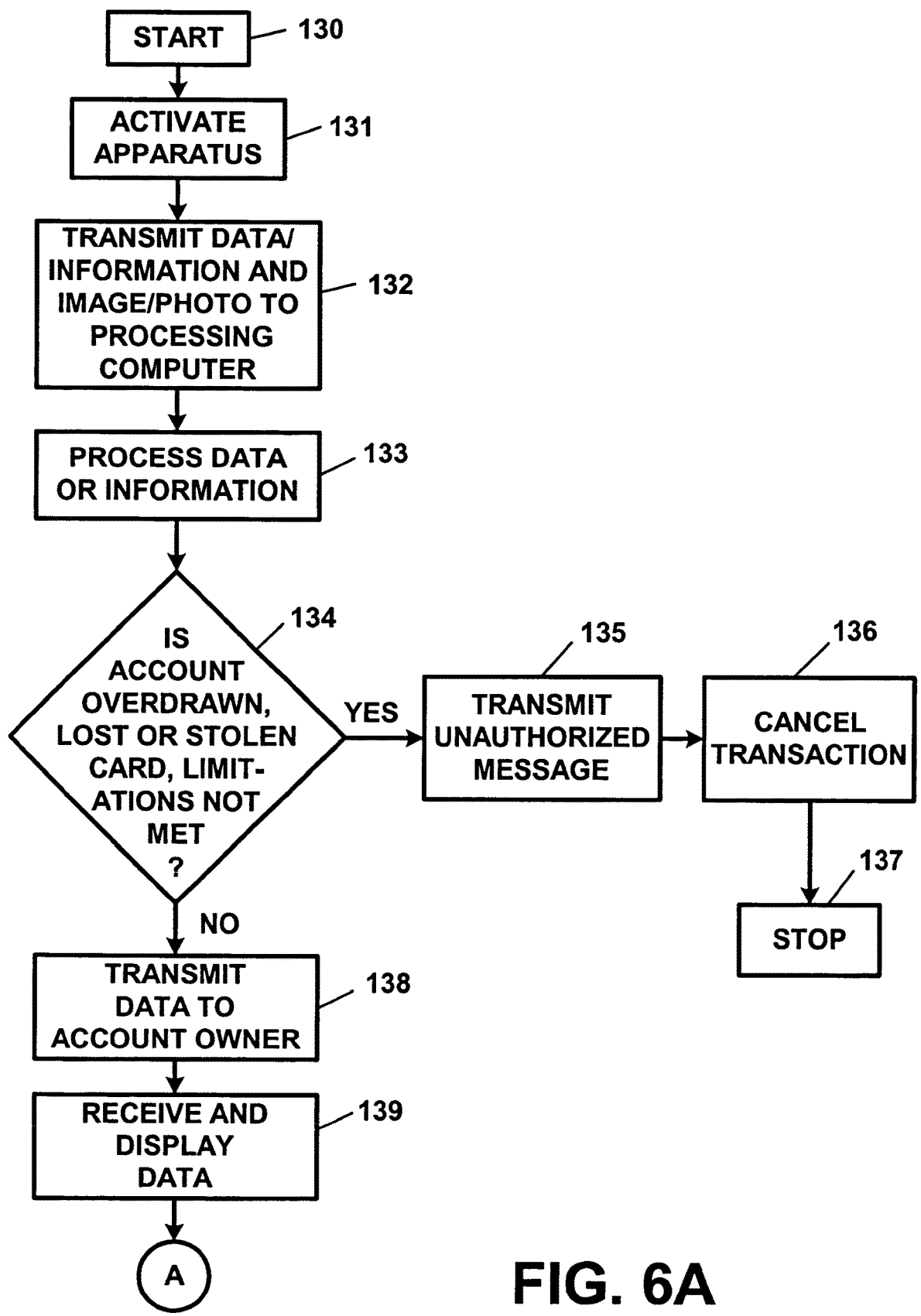
FIGS. 6A, 6B, and 6C illustrate the operation of the apparatus of FIG. 4 in flow diagram form.
Figure 6B:
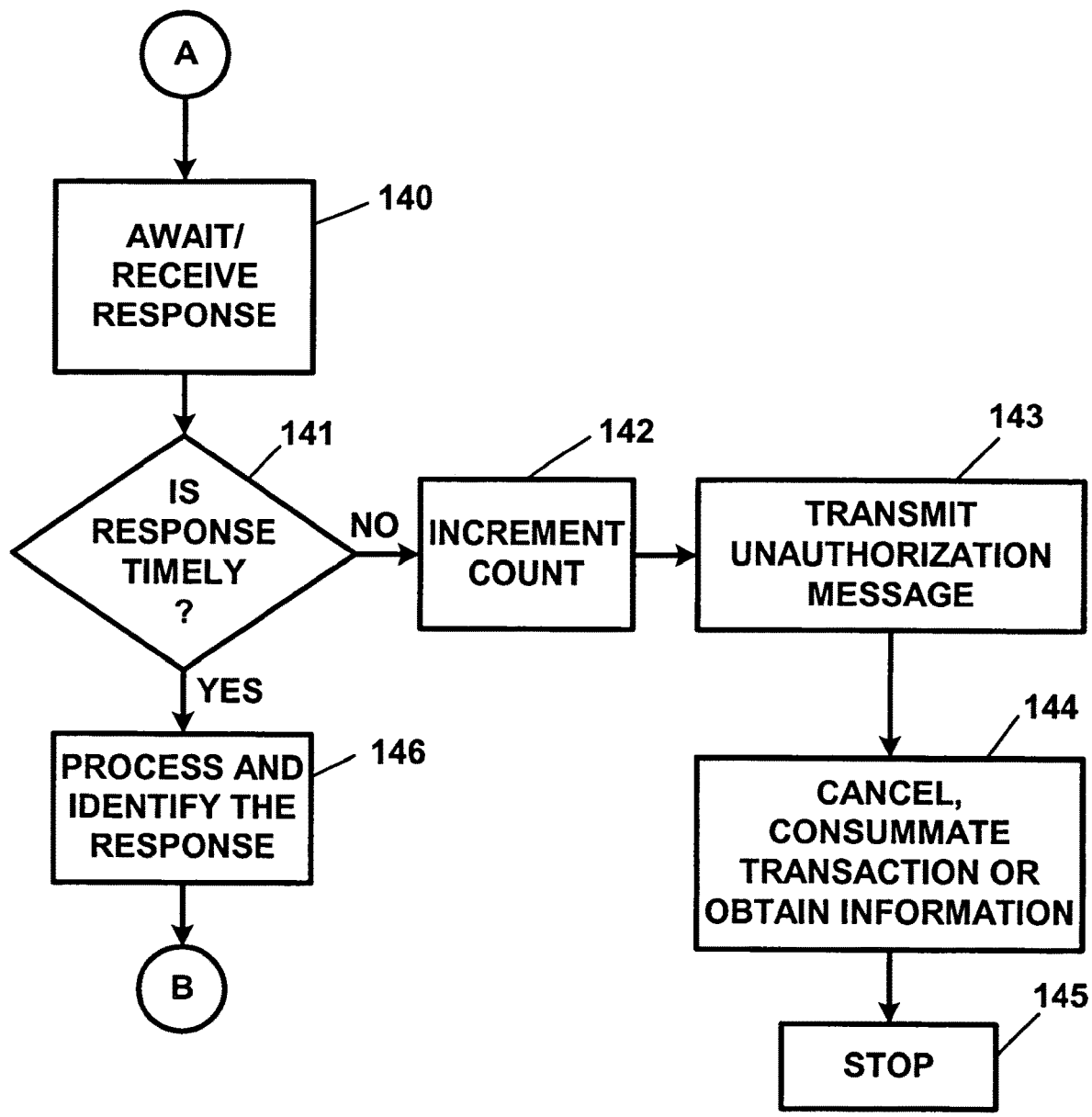
Figure 6C:
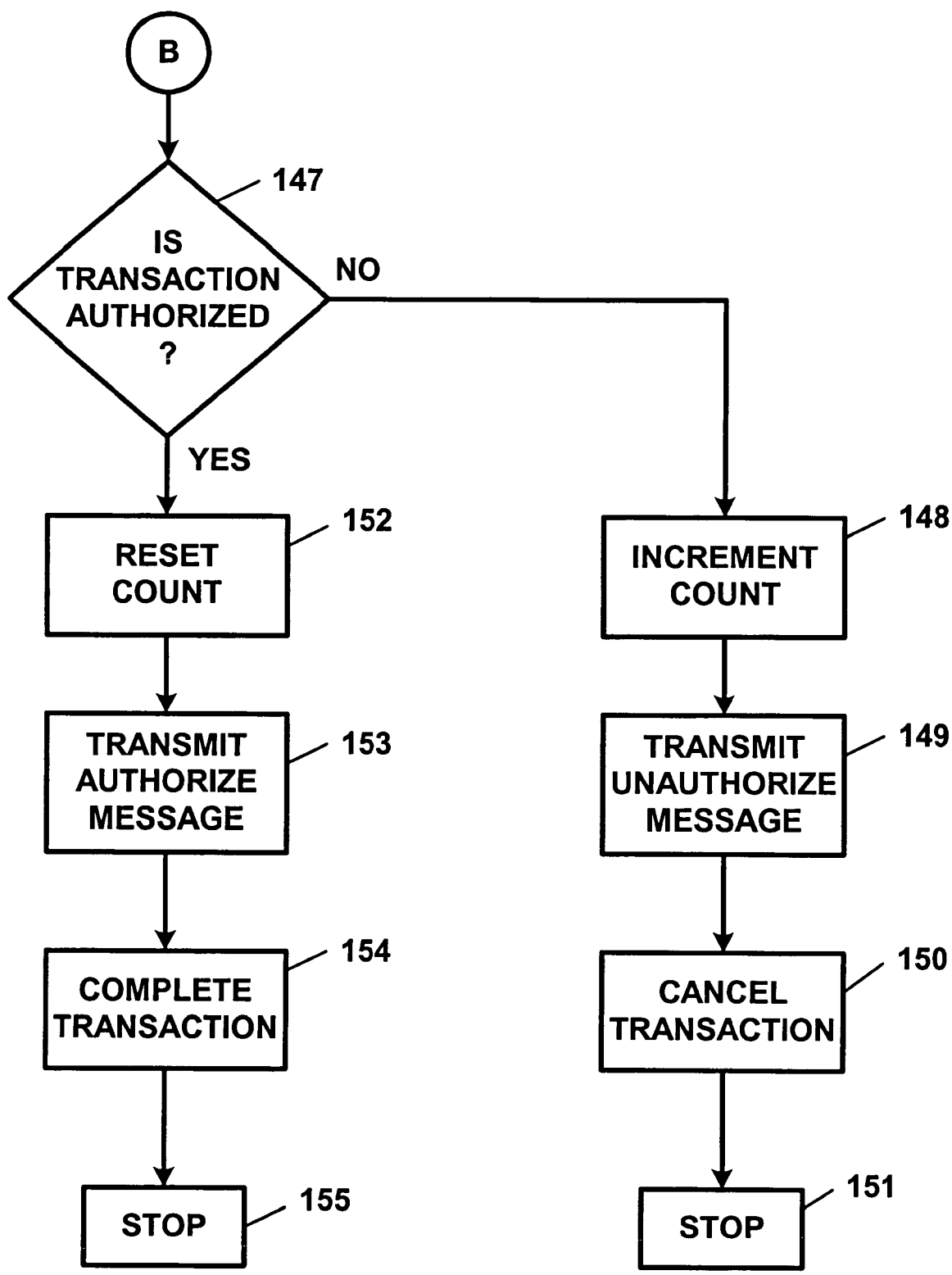

FIGS. 6A, 6B and 6C illustrate the operation of the apparatus 100 in flow diagram form. With reference to FIGS. 6A, 6B and 6C, the operation of the apparatus 100 commences at step 130 when the financial transaction and/or instrument, or when the image, digital copy, photograph, or picture, of the document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, a transaction on or involving an account, or when the ATM card, is presented to the bank or financial institution employee, representative, and/or placed in a card reader or other device used in processing the banking transaction, respectively.

At step 131, the employee or representative of the bank or financial institution will activate the apparatus, via the banking transaction terminal 102, in any typical manner, such as by entering account and/or card information, by entering the document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a respective account, or by entering an image or a digital copy of the respective document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a respective account, into the banking transaction terminal 102 or other device used in processing the banking transaction, or by obtaining, scanning, generating, or entering, an image, a photograph, or a picture, of the document, authorization form, authorization request form, benefit request form, claim form, draft, bank draft, deposit form, withdrawal form, check, form, receipt, request form, or other entity, by or into, into the banking transaction terminal 102 using the user input device 102E of the banking transaction terminal 102 or other device used in processing the banking transaction, or by obtaining, scanning, generating, or entering, and/or storing, a photograph or a picture of the respective document, authorization form, authorization request form, benefit request form, claim form, draft, bank draft, deposit form, withdrawal form, check, form, receipt, request form, or other entity, with or by the point-of-sale terminal 102 using the camera/microphone system 102J of the point-of-sale terminal 102 or other suitable device.

In the case of a document, authorization form, authorization request form, benefit request form, claim form, draft, bank draft, deposit form, withdrawal form, check, form, receipt, request form, or other entity, which is offered, presented, submitted, processed, involved, or used, in or involving, or related to the transaction, the image, digital copy, photograph, or picture, of the respective document, authorization form, authorization request form, benefit request form, claim form, draft, bank draft, deposit form, withdrawal form, check, form, receipt, request form, or other entity, can be obtained, scanned, or generated, and/or stored, by or in the point-of-sale terminal 102 or any suitable device used in connection with same. This data entry is typically performed by manual data entry, electronic data entry, and/or via a card reader or other suitable device or computer, depending upon the transaction.

For example, if a person offers a check for cashing and provides a savings account or a checking account number, as the means by which to endorse the check, the employee or representative will enter the savings account or checking account number into the banking transaction terminal 102 for processing. Similarly, if one desires to withdraw money from an ATM account, the card reader will read and enter the account number and/or information for processing. In another preferred embodiment, at step 132, the individual involved in the banking transaction will be requested or instructed to look into, or pose for, the camera of the camera/microphone system 102J so that a photograph, a picture, or a video clip, can be taken of the individual's face. In the preferred embodiment, a photograph, picture, or video clip, is taken of the individual's face with the camera and a digital file of same is created and stored at the banking transaction terminal 102. At step 132, the individual will be requested or instructed to recite a predetermined voice message into the microphone of the camera/microphone system 102J, so that a voice recording or a voice print can be obtained. The pre-determined voice message can be any appropriate message such as "My name is Raymond Joao" or "This is my bank account", or any other appropriate message. In a preferred embodiment, the voice message should be the same as that voice message for which a voice print was previously submitted for storage at the central processing computer 103.

In an Internet banking transaction, wherein the banking transaction is being performed with a remote banking transaction terminal 102, the individual can take the photograph, picture, or video clip, by using a camera or web camera associated with his or her computer, home computer, personal computer, laptop computer, notebook computer, netbook computer, cellular telephone, personal digital assistant, or other communication device, and/or record the voice message or voice print on a microphone or other audio recording device associated with the respective computer, home computer, personal computer, laptop computer, notebook computer, netbook computer, cellular telephone, personal digital assistant, or other communication device. The respective photograph, picture, or video clip, and/or voice message or voice print can thereafter be transmitted to the receiver 102H of the banking transaction terminal 102.

The information and/or data pertinent to the banking transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the photograph, picture, and/or video clip, and/or the voice recording, and/or voice print, of the individual involved in the transaction, is then transmitted, at step 132, to the central processing computer 103. In a preferred embodiment, at step 132, the information and/or data pertinent to the banking transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the photograph, picture, and/or video clip, and/or the voice recording, and/or voice print, of the individual involved in the transaction, can also be transmitted to the communication device 104 to inform the account holder and to provide him or her with the information regarding the banking transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the photograph, picture, and/or video clip, and/or the voice recording, and/or voice print, of the individual involved in the transaction, and/or any or all of the other above-described information.

At step 132, the information regarding the transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the photograph, picture, and/or video clip, and/or the voice recording, and/or voice print, of the individual involved in the transaction, can also be stored in the central processing computer 3 and, in particular, in the database 3H, and can be retrieved at any time by any authorized individual.

The information and/or data pertinent to the banking transaction, and/or the card, the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the photograph, picture, and/or video clip, and/or the voice recording, and/or voice print, of the individual involved in the transaction, can thereafter be provided to the account holder via the communication device 104.

At any time, if the account holder determines that the transaction is a fraudulent transaction or an unauthorized transaction, or that the individual is not an individual authorized for engaging in a banking transaction involving the respective account, the account holder can transmit an unauthorized message to the banking transaction terminal 102 so as to stop, cancel, or prevent, the banking transaction. The account holder, in another preferred embodiment, can place an immediate or real-time telephone call to a telephone or other device associated with the banking transaction terminal 102 and inform the operator of the banking transaction terminal 102 that the transaction is unauthorized and/or fraudulent. The above telephone call can be a conventional telephone call or a voice over IP telephone call.

In a preferred embodiment, the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, can be in the body of a message containing the information or data sent, such as in the body of the message, or the respective document, authorization form, authorization request form, benefit request form, claim form, draft, bank draft, deposit form, withdrawal form, check, form, receipt, request form, or other entity, involved in, used in, or related to, the banking transaction can be, or can be included, in an attachment to the message. In a preferred embodiment, the message, or the information or data pertinent to the banking transaction, can be included in, or can include, an electronic mail (e-mail) message, an instant message, a text message, or any other suitable message, electronic, digital, or otherwise, or other electronic transmission. In a preferred embodiment, the photograph, picture, and/or video clip, and/or the voice recording, and/or voice print, of the individual involved in the transaction, can also be included in the body of the message containing the information or data sent, such as in the body of the message, or the respective photograph, picture, and/or video clip, and/or the voice recording, and/or voice print, of the individual involved in the transaction, can be, or can be included in, an attachment to the message. The account holder can then, at step 132, or at any other time, review the information in the message, including viewing or reviewing the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, or viewing or reviewing the photograph, picture, and/or video clip, and/or the voice recording and/or voice print, of the individual involved in the transaction.

The central processing computer 103 will then, at step 133, process the information and/or data pertinent to the transaction and to the particular account. The central processing computer 103 can also process the photograph or picture against the "file photograph" or "file picture" and/or can process the voice message against the "file voice print".

The central processing computer 103 may utilize any of the widely known data processing and/or software routines, which are known to those skilled in that art, in order to process transaction requests and/or authorizations involving the use of the respective account(s) and/or related card(s).

The central processing computer 103 will process the information and/or data pertinent to the transaction in conjunction with the account information in order to determine the status of the account (i.e. whether any holds have been placed on the account, such as those prohibiting withdrawal (s). Further, the central processing computer 103 will then perform a test, at step 134, in order to determine if the transaction amount has reached and/or exceeded the amount available in the account and/or if the ATM card has been reported lost, stolen, cancelled and/or de-activated, and/or determine whether any other pre-defined, pre-selected and/or programmed limitations) and/or restriction(s) have been met, satisfied and/or reconciled. The central processing computer 103 can also process the photograph or picture against the "file photograph" or "file picture" and/or can process the voice message against the "file voice print" to determine if the individual is not the cardholder or other authorized individual.

The central processing computer 103 will also perform a test in order to determine if the predetermined maximum number count of unauthorized transactions, pre-defined in the preferred embodiment to be one (1), has occurred on the account.

The unauthorized transaction count refers to a count of the transactions which are not authorized by the account holder or account owner as will be described herein. The authorized transaction count (UNAUTHCT) is a variable which is pre-set to zero (0) at the time the account is opened. Each time an unauthorized transaction occurs, the unauthorized transaction count is incremented by one. Once the unauthorized transaction count reaches a pre-defined limit of, for example, one (1), although it may be pre-defined to be zero (0), the central processing computer 103 will cancel the transaction and de-activate the account and/or the ATM card. The central processing computer 103 will then notify the account owner. In this manner, the apparatus 100 will enable the central processing computer 103 of a banking and/or financial institution to cancel and/or de-activate the account and/or the ATM card, either permanently or temporarily, in cases when the account owner may have failed to respond or to reply to transaction notices, which may be the case when the account owner is not aware that the account has been charged, overdrawn, and/or that the ATM card has been lost or stolen, cancelled or de-activated, duplicated, "cloned", or in other ways utilized without the account owner's knowledge or authorization, or when the account owner is unable to respond or reply to the transaction notices for some other reason(s). This feature of the present invention serves to place a transaction stop limit on the account and/or on the use of the ATM card.

If any of the above listed conditions exist (i.e. account overdrawn and/or ATM card is lost, stolen, cancelled and/or de-activated), the central processing computer 103 will, at step 135, transmit a signal to the banking transaction terminal 102 indicating that the transaction is not approved and/or is not authorized. The banking terminal operator, or employee, or representative, may then cancel the transaction at step 136. The employee or representative may then alert the authorities and/or confiscate the ATM card. In the case when an ATM machine is utilized as the banking terminal 102, the ATM machine may confiscate the ATM card automatically. Upon the completion of step 136, the apparatus will cease operation at step 137.

At step 134, if requested pursuant to a pre-existing agreement between the respective bank or financial institution and operator of the central processing computer 103, and/or if requested by the banking transaction terminal operator during the transaction, the central processing computer 103 can retrieve and transmit a "file photograph" or "file picture", of the account owner or authorized individual or authorized individuals, to the banking transaction terminal 102 for display thereat. If the banking transaction terminal operator does not recognize the individual involved in the banking transaction as being the account owner or other authorized individual, then the banking transaction terminal operator can stop, void, or cancel the transaction at that moment and at step 137 and so inform the central processing computer 103 and/or the account owner by transmitting an appropriate signal or message to the central processing computer 103 or the account owner's communication device 4.

If, at step 134, the central processing computer 103 determines that the account is not overdrawn or that the ATM card is not lost, stolen, cancelled or de-activated, or that the of unauthorized transactions count (UNAUTHCT) has not reached a predefined limit, and/or that pre-defined or pre-specified limitations and/or restrictions have been met, the central processing computer 103 will, at step 138, transmit a signal and/or data, containing any and/or all of the herein-described information regarding the banking transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, and/or the respective photograph, picture, and/or video clip, and/or the voice recording, and/or voice print, of the individual involved in the transaction, to the communication device 104. In this regard, at step 138, a signal and/or data containing any and/or all of the above-described information regarding the transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or audio clip or voice print, of the individual involved in the transaction, can also be transmitted to, or re-transmitted to, the communication device 104, which can be any one or more of the communication devices 104 described herein, which is located at the account holder or account owner.

At step 138, the central processing computer 103 will then also transmit respective signals and/or data, containing any and/or all of the above-described information regarding the banking transaction, including the information and/or data pertinent to the banking transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, and/or the respective photograph, picture, and/or video clip, and/or the voice recording, and/or voice print, of the individual involved in the transaction, to any one or more of the account owner's designated fax machine 105, personal computer 106, telephone 107, telephone answering machine 108, alternate telephone 109, alternate telephone answering machine 110, network computer 111, and/or alternate beeper 112 or alternate pager 113, or any other communication device. The signals and/or data can be transmitted to more than one of the above devices 105-113, or to any other communication device, either sequentially or simultaneously.

The information and/or data transmitted to the communication device 104 includes information and data identifying the transaction, can include, in addition to any of the herein-described information, the information pertinent to the banking transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, and/or the respective photograph, picture, and/or video clip, and/or the voice recording, and/or voice print, of the individual involved in the transaction, and can also include the name of the bank or financial institution where the transaction is taking place, the account number and/or description, the amount of the transaction, the time of the transaction and the location (i.e. city, town, village, state, country etc.) of the transaction, as well as the photograph, picture, and/or video clip, and/or the voice recording, and/or voice print. The information and/or data may also include the phone number of the central processing office and/or computer servicing, and/or the banking and/or financial institution handling, the account so that the account owner may telephone same in order to authorize or cancel the transaction. The information and/or data may also be supplemented to include a description of the person seeking to make the transaction and the type of transaction sought (i.e. cash withdrawal, cashing of check, etc.).

At step 139, the information and/or data which is transmitted from the central processing computer 103, and received at the communication device 104, is displayed to the account owner on the display device 104E of the communication device 104. The information displayed on the display device 104 includes the name of the banking and/or financial institution, the amount of the transaction, the time of the transaction and the location of the transaction. The information and/or data may also include the type of transaction and a description of the person seeking to make the transaction, etc.

In an instance where the account owner has not responded earlier, the apparatus 100, at step 140, will then wait for the account owner to respond to the transmission. During this time, the account owner may utilize the communication device 104, which in a preferred embodiment, may be a cellular telephone, a personal digital assistant, a wireless telephone, a home computer, a personal computer, a laptop computer, a notebook computer, a netbook computer, a television, an interactive television, a digital television, a beeper, or a pager, or any of the communication devices 104 described herein, and/or a reply or two-way pager feature on the communication device 104, or any other communication device, in order to either approve or authorize the transaction or disapprove of, or void, the transaction. At step 140, the apparatus 100 will receive the reply or response from the account owner. At step 141, the central processing computer 103 will determine if the account owner has made a reply or response within the pre-defined time limit which is chosen, in the preferred embodiment, to be one (1) minute. The account owner may also transmit a signal via an appropriate key or button suspending use of the account or ATM card, such as when he or she may first be apprised of the fact that the account is being unlawfully accessed, or the use thereof is unauthorized, or that the ATM card has been lost or stolen.

In instances when the communication device 104 does not have a reply feature associated with the communication device 104, or means for communicating with the central processing computer 103, the account owner may simply telephone the central processing office or processing center and/or the banking or financial institution so as to personally reply or respond to the authorization request.

If, at step 141, it is determined that the account owner's reply or response was not made within the pre-specified time, chosen in the preferred embodiment to be one (1) minute, the central processing computer 103 will, at step 142, increment the unauthorized transaction count (UNAUTHCT) by one (1) and will, at step 143, transmit a signal and/or data to the banking transaction terminal 102 indicating that the transaction is not authorized by the account owner. The banking terminal operator may then, at step 144, either cancel the transaction, proceed to consummate the transaction, and/or attempt to obtain additional information or identification from the customer and/or obtain an alternate account number from which to draw against.

The action taken by the banking transaction terminal operator may be dictated by the specific agreement in effect between the account owner and the bank or financial institution administering the accounts. Upon the completion of step 144, the operation of the apparatus will cease at step 145. If the account owner should reply or respond to the transaction notice at a later period, this information may then be utilized to approve of or to disapprove and/or to dispute the transaction.

If, at step 141, it is determined that the reply or response was timely, the central processing computer 103 will, at step 146, process and identify the account owner response. At step 147, the central processing computer 103 will determine if the account owner has authorized the transaction. If the account owner's response is to cancel, to disapprove, or to not authorize, the transaction, the central processing computer 103 will, at step 148, increment the unauthorized transaction count (UNAUTHCT) by 1. At this juncture, it is important to note that the unauthorized count (UNAUTHCT) is set to zero at the time of the opening of the account.

After the unauthorized transaction count has been incremented, the central processing computer 103 will, at step 149, transmit a signal and/or data to the banking terminal 102 which will notify and/or instruct the banking terminal operator that the transaction is not authorized and should, therefore, be cancelled or voided. The banking terminal operator may then cancel the transaction at step 150. The banking transaction terminal operator or the ATM machine may then confiscate the ATM card and/or alert the authorities. Upon the completion of step 150, the apparatus will cease operation at step 151.

If, at step 147, the central processing computer 103 identifies the account owner's reply or response as being one to authorize the transaction, the central processing computer 103 will, at step 152, reset the unauthorized transaction count (UNAUTHCT) to zero (0). The central processing computer 103 will then, at step 153, transmit a signal and/or data to the banking terminal 102 which will notify and/or instruct the banking terminal operator, and/or the ATM machine, that the transaction is authorized and/or approved. In another embodiment, the account owner can also transmit an authorization message or approval message to the banking transaction terminal 102.

The banking terminal operator, and/or the ATM machine, may then complete the transaction, at step 154. After the transaction has been completed at step 154, the operation of the apparatus 100 will cease at step 155.

In instances when the account owner is a party to the transaction, which should typically be the case in banking and/or financial transactions, the account owner, having the communication device 104 on his or her person, may authorize the transaction at the point of the transaction. If the transaction is an overnight or other remotely made transaction, such as in clearing and/or account settling transactions, the account owner may authorize the transaction from his or her remote location.

The account owner may also program and/or set the communication device 104 so as to automatically authorize or disapprove or disallow transactions. In this regard, the communication device 104 may be programmable so as to receive and analyze the transaction information and/or data and reply or respond to same automatically and/or with preset or programmed replies and/or responses. The communication device 104 may also be programmable so as to limit the amounts of transactions. In this regard, the account owner may provide for temporary transaction types and/or amounts.

The communication device 104, in the preferred embodiment, is provided with a memory device for storing any of the information or data described herein as being capable of being provided by the apparatus 100 for any number of transactions so that the account owner may review his or her account activity and/or transactions which have occurred involving his or her accounts and/or ATM card. In this manner, the account owner may "scroll" through and/or in other ways review account activity. The communication device 104 may also be equipped to service more than one bank and/or financial account and/or ATM card. For example, any number and/or types of accounts may be serviced with or by a single communication device 104.

The apparatus and method of the present invention provides for the real-time notification of banking and/or financial transactions involving various bank and/or financial accounts which also provides information regarding the transaction, along with an image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the banking transaction, and which also enables an account owner to monitor, in real-time, activity involving his or her bank and/or financial accounts and/or ATM card(s). The apparatus and method of the present invention can be utilized in connection with providing transaction security for transactions on or involving brokerage accounts in a similar or analogous manner as described above in connection with FIGS. 4, 5, 6A, 6B, and 6C, and as described herein in connection with FIGS. 10, 11, 12A, 12B, and 12C.

The apparatus and method of the present invention also provides a means and a mechanism by which to inform an account owner that his or her account is overdrawn, has been charged against and/or that his or her ATM card(s) are lost, stolen, cancelled or de-activated and/or provides an indication to the account owner of when and/or where his or her accounts are being accessed in transactions while also providing the account holder with an image, digital copy, photograph, or picture, of a respective document, authorization form, authorization request form, benefit request form, claim form, draft, bank draft, deposit form, withdrawal form, check, form, receipt, request form, or other entity, involved in, used in, or related to, the banking transaction. The account owner may then report the unauthorized activity, and/or the discovery of a lost or stolen ATM card, and/or cancel and/or de-activate the respective account(s) and/or ATM card(s).

The present invention also provides a means and a mechanism by which to monitor the number of banking transactions which are unauthorized by the account holder and to determine whether or not to authorize banking transactions and/or cancel or de-activate a respective account or accounts or a card or cards associated with same. In the above manner, the apparatus and method of the present invention provides an apparatus and a method for preventing and/or for drastically limiting fraudulent and/or unauthorized use of bank accounts, savings accounts, checking accounts, and/or ATM accounts, and/or the account numbers corresponding thereto. The present invention also provides a means and a mechanism for providing an image, digital copy, photograph, or picture, of a respective image, digital copy, photograph, or picture, of the respective document, authorization form, authorization request form, benefit request form, claim form, draft, bank draft, deposit form, withdrawal form, check, form, receipt, request form, or other entity, involved in, used in, or related to, a transaction or transactions, for any number of transactions and for any number of accounts.

In another preferred embodiment, wherein a number of banking transactions may be batch processed or otherwise processed in batches or processed in groups, the apparatus 100 can, at step 132 and/or at step 138, transmit the information and/or data pertinent to each of and/or all of the banking transactions processed in the batch processing routine, and/or the account used in same, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, each of the transactions, and/or the photograph, picture, and/or video clip, and/or the voice recording, and/or voice print, of the individual involved in the transaction, associated with each of the transactions, can be transmitted to the communication device 104 and the account holder or account owner can review the information as desired. In this regard, in another preferred embodiment, all of the herein-described information pertaining to each banking transaction processed in a batch processing of banking transactions on or involving an account or accounts, can be processed, obtained, gathered, or stored, and/or can be transmitted, in a single message, or in any number of messages, to the communication device 104 at step 132 and/or at step 138.

The present invention, in an alternate embodiment, may also be utilized so as to provide authorization, notification, and/or security, for and in conjunction with, cellular and/or mobile telephone and/or communication systems wherein a cellular or mobile telephone owner and/or account owner may be notified of a transmission and/or an attempted transmission and/or telephone call made with his or her cellular or mobile telephone and/or with the telephone number and or transmission codes and/or associated signatures and/or data which corresponds to his or her cellular or mobile telephone.

In another preferred embodiment of the present invention, the present invention provides an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a cellular telephone account, a mobile telephone, or a wireless telephone account.

Figure 7:
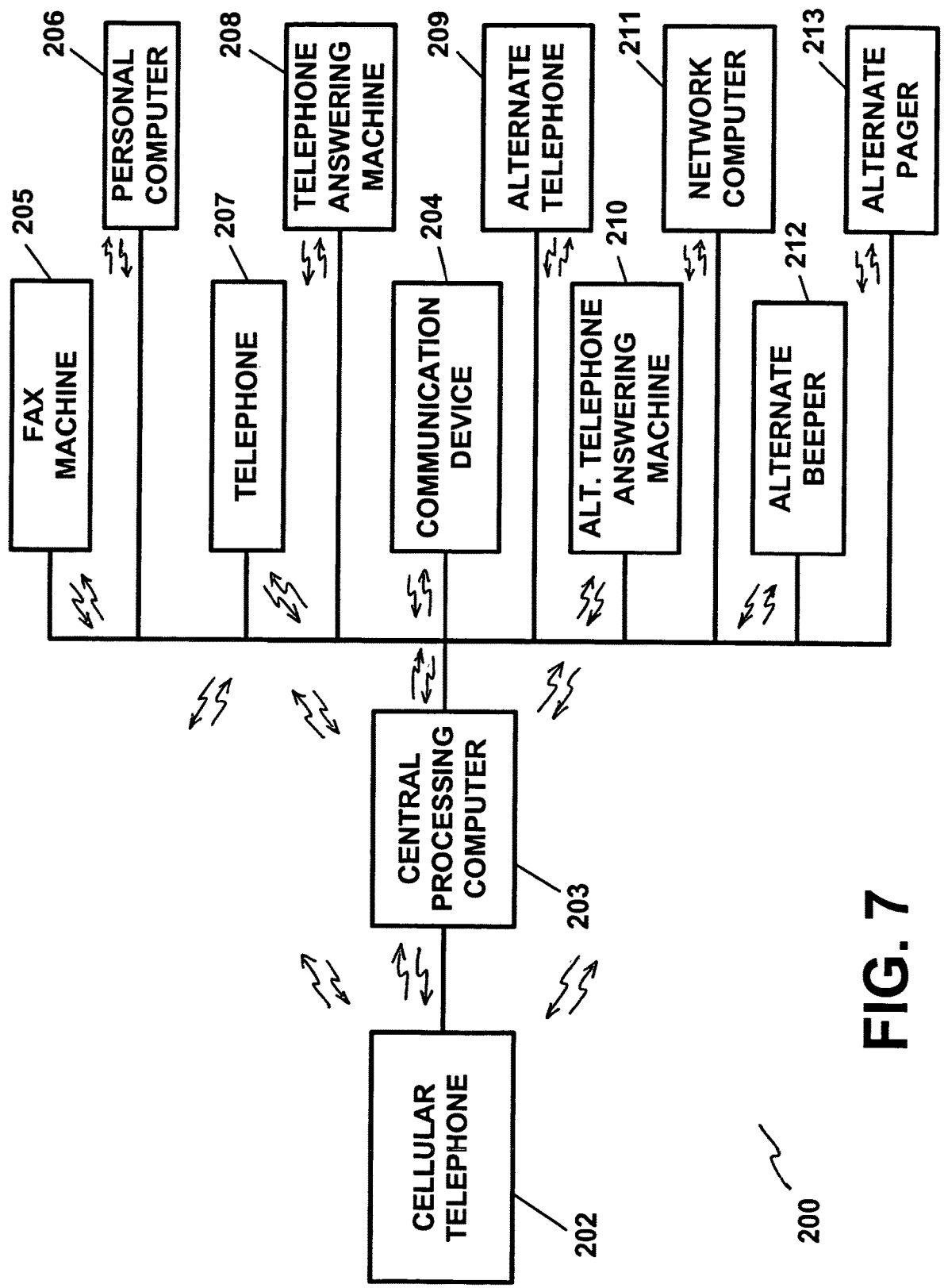
FIG. 7 illustrates a block diagram of an alternate embodiment of the apparatus of the present invention which is utilized in conjunction with a cellular and/or a mobile telephone.

FIG. 7 illustrates a block diagram of an alternate embodiment of the apparatus of the present invention which is utilized in conjunction with a cellular or mobile telephone (hereinafter referred to as "cellular telephone") and/or corresponding cellular telephone account number and/or information related thereto. The apparatus of FIG. 7 is denoted generally by the reference numeral 200. In FIG. 7, the apparatus 200 consists of a cellular telephone 202 which may be any typical cellular and/or mobile telephone. Any other cellular and/or mobile communication device may also be utilized. The cellular telephone 202 includes a camera and/or a microphone, and/or any other video recording device and/or audio recording device, for obtaining a picture and/or video information and/or audio information regarding an individual engaging in a transaction with the cellular telephone 202.

The cellular telephone 202 may be any of the widely used and well known cellular telephones and/or wireless or mobile communication device(s). In the embodiment of FIG. 7, the cellular telephone 202 serves as the transaction terminal which is described above in conjunction with the previous embodiments. As is the case with cellular telephones, the cellular telephone may transmit the authorization request and/or notice to a central processing computer. The cellular telephone 202 may, but need not, receive authorization data and/or information from the central processing computer. The cellular telephone 202 may also comprise, or have associated therewith, a keypad for the manual entry of transaction information and/or data, such as the telephone number and various command codes utilized in making or placing a telephone call. The cellular telephone 202 may also include a scanner or other input device for obtaining an image or a digital copy of a respective a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a respective account.

The apparatus 200 also comprises a central processing computer 203 which services any predefined group of cellular telephones or cellular communication devices. For example, the central processing computer 203 may handle all cellular telephone accounts for a given telecommunications company and/or area. The central processing computer 203, for example, may process and maintain records of cellular telephone calls, including billing information, for any number of cellular telephones, cellular telephone accounts, and/or cellular telephone owners which or who are serviced by a particular communications company or central processing office or computer.

The central processing computer 203 may be a mainframe computer, a mini-computer, a micro-computer, a server computer, such as those utilized in conjunction with on-line services and/or in a network environment, and/or any other suitable computer or computer system.

The central processing computer 203 may also process accounts for any of the various cellular and/or mobile communications accounts and/or devices. In the preferred embodiment, the cellular telephone 202 is linked and/or connected to the central processing computer 203 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems as well as any other appropriate communications system. The cellular telephone 202 transmits signals and/or data to the central processing computer 203 as well as receives signals and/or data from the central processing computer 203.

The apparatus 200 also comprises a cellular telephone owner communication device 204 which may receive signals and/or data from either or both of the cellular telephone 202 and/or the central processing computer 203. In the embodiment of FIG. 7, the communication device 204 receives signals and data from the central processing computer 203 with said signals being transmitted via a suitable communication system. In the embodiment of FIG. 7, the communications system or network utilized for transmitting signals and/or data to the communication device 204 is a wireless communication network and/or the Internet and/or the World Wide Web and the communication device 204 is a telephone signal receiving device such as a cellular telephone, a wireless telephone, a personal digital assistant, a home computer, a personal computer, a laptop computer, a notebook computer, a netbook computer, or a telephone beeper or pager. The communication device 204 receives the wireless telephone signals and/or data from the central processing computer 203 during the authorization procedure as will be described in more detail below.

In the preferred embodiment, the communication device 204 is also equipped with a transmitter for transmitting signals and/or data to the central processing computer 203. In this regard, the central processing computer 203 transmits signals and/or data to the communication device 204 as well as receives signals and/or data from the communication device 204. The communication device 204 may also transmit signals and/or data directly to the cellular telephone 202 and receive signals and/or data directly from the cellular telephone 202.

In the preferred embodiment, signals and/or data which are transmitted by the cellular telephone 202 are received at the central processing computer 203. The cellular telephone 202 also receives signals and/or data from the central processing computer 203. Further, in the alternate embodiment of FIG. 7, the communication device 204 receives signals and/or data from the central processing computer 203 and transmits signals and/or data to the central processing computer 203.

As noted above, the communication device 204 is a wireless device. In this regard, the communication device 204 or pager may be carried by the cellular telephone owner and/or be kept on and/or close to the cellular telephone owner's person so that the central processing computer 203 may transmit signals and/or data to the communication device 204 so as to communicate with the cellular telephone owner at any time.

In the alternate embodiment of FIG. 7, the apparatus 200 also comprises a facsimile (fax) machine 205, a personal computer 206, a telephone 207, a telephone answering machine 208, an alternate telephone 209, an alternate telephone answering machine 210, a network computer 211, an alternate beeper 212, and an alternate pager 213.

The central processing computer 203 may be linked with the above fax machine 205, personal computer 206, telephone 207 and associated answering machine 208, alternate telephone 209 and associated answering machine 210, network computer 211, alternate beeper 212, and/or alternate pager 213, via any suitable communication system. In the preferred embodiment, a telecommunications link or telephone line or link, which may or may not be a wireless link depending on the device and/or the circumstances, is utilized in order to link the central processing computer 203 with each of the fax machine 205, the personal computer 206, the telephone 207 and associated answering machine 208, the alternate telephone 209 and associated answering machine 210, the network computer 211, the alternate beeper 212, and/or the alternate pager 213.

Figure 8:
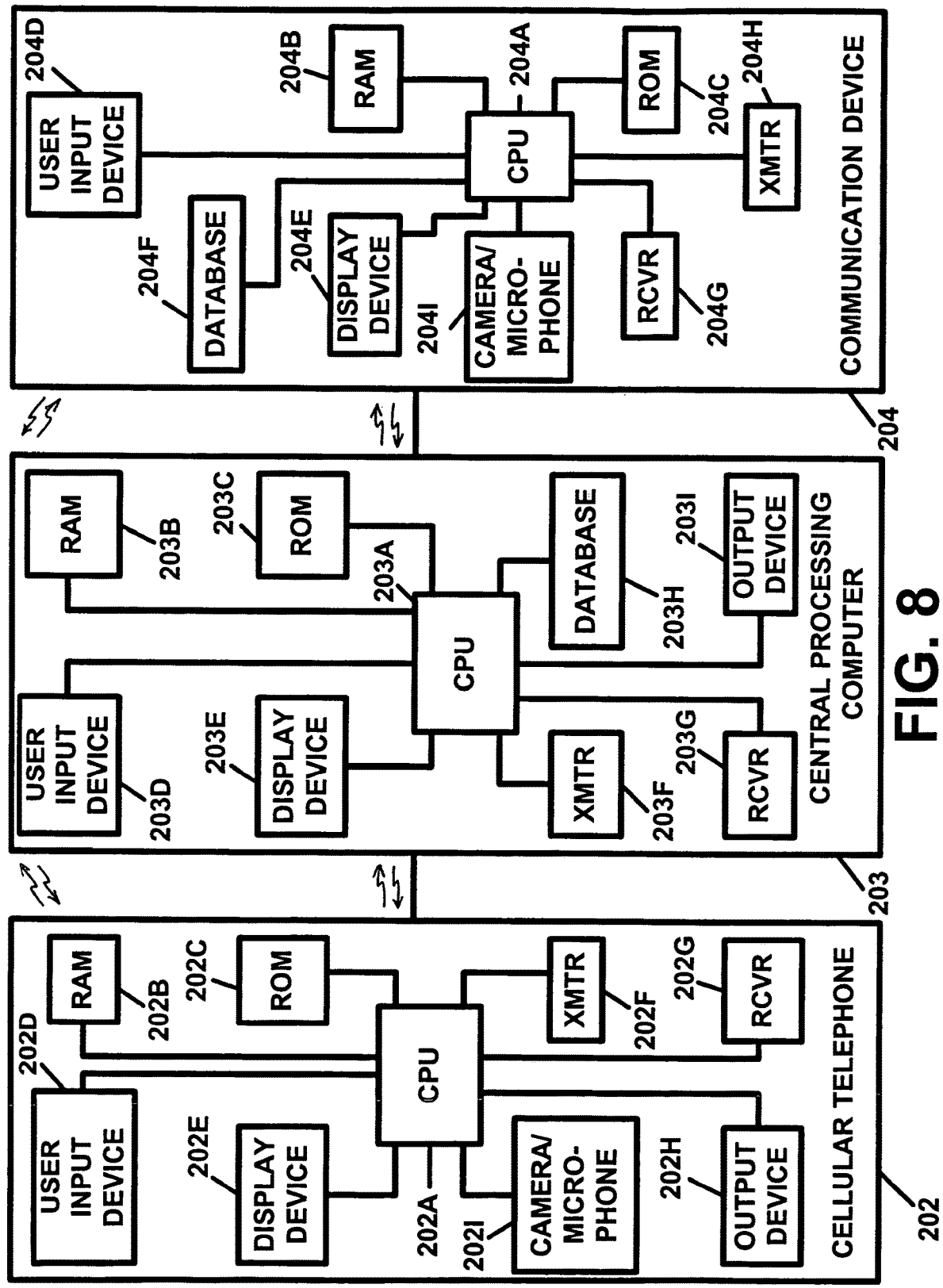
FIG. 8 illustrates the various components of the apparatus of FIG. 7.

FIG. 8 illustrates the various components of the apparatus 200 of FIG. 7. In FIG. 8, the cellular telephone 202, in the preferred embodiment, comprises a central processing unit or CPU 202A, associated random access memory 202B (RAM) and read only memory 202C (ROM) devices, which are also connected to the CPU 202A, a user input device 202D, which is a typically a keypad, keyboard, mouse, reader, or scanner, or any combination of same, or other suitable input device for inputting data into the cellular telephone 202 and which is also connected to the CPU 202A, and a display device 202E for displaying information and/or data to a user or operator.

The cellular telephone 202 also comprises a transmitter 202F for transmitting signals during normal telephone operation and/or for transmitting signals and/or data to the central processing computer 203, and/or to the communication device 204 and/or to any other device associated with the account owner or apparatus 200 if desired. The transmitter 202F is also connected to the CPU 202A. The cellular telephone 202 also comprises a receiver 202G for receiving signals during normal telephone operation and/or for receiving signals and/or data from the central processing computer 203, and from the communication device 204 and/or from any other associated device which may be utilized, if desired.

The receiver 202G is also connected to the CPU 202A. The cellular telephone 202 may also comprise a printer 202H or other appropriate output device for outputting data to the user. The printer 202H, if utilized, is also connected to the CPU 202A. In the preferred embodiment, the printer 202H prints receipts corresponding to the transaction and/or information transmitted during the telephone call or transaction.

The cellular telephone 202 also includes a camera/microphone system 202I. In the preferred embodiment, the camera/microphone system 202I can include a camera or a video recording device which can be used to take a picture, a photograph, or a video clip of an individual or individuals involved in a use of the cellular telephone 202. In the preferred embodiment, the camera/microphone system 202I can also include a microphone or an audio recording device which can be used to record audio information and/or the voice of an individual involved in the use of the cellular telephone 202. In a preferred embodiment, voice information can be processed by the CPU 202A in order to generate a voiceprint file of the recorded voice.

In the preferred embodiment, the camera/microphone system 202I is also used to take a picture or a photograph of a respective document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a respective account.

In the preferred embodiment, the camera/microphone system 202I can be located on the cellular telephone 202 so as to record the respective picture, photograph, or video clip, of the individual or individuals involved in the use of the cellular telephone 202, and/or so as to record the audio information and/or the voice of the individual involved in the use of the cellular telephone 202.

In the preferred embodiment, the cellular telephone 202 can also include a database (not shown) which can be utilized to store information regarding uses of the cellular telephone 202. The information can include, for each of any number of uses of the cellular telephone 202, a picture, a photograph, or a video clip, of the individual or individuals involved in using the cellular telephone 202, and/or audio information, a voice message or sample, and/or a voice print, which is a digital representation of a voice message or sample, obtained from the individual involved in using the cellular telephone 202.

The database of the cellular telephone 202 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or any other entities, which have been or which were offered, presented, submitted, processed, involved, or used, in or involving, or related to, a transaction or transactions on or involving any of the accounts serviced by the apparatus 200.

In FIG. 8, the central processing computer 203, in the preferred embodiment, comprises a central processing unit or CPU 203A, associated random access memory 203B (RAM) and read only memory 203C (ROM) devices, which are connected to the CPU 203A, a user input device 203D, which is a keypad or any other suitable input device for inputting data into the central processing computer 203 and which is also connected to the CPU 203A and a display device 203E for displaying information and/or data to a user or operator.

The central processing computer 203 also comprises a transmitter(s) 203F for transmitting signals and/or data to the cellular telephone 202 and to the communication device 204 and/or to any other device which may be utilized and/or to any one or more of the fax machine 205, personal computer 206, telephone 207 and associated answering machine 208, alternate telephone 209 and associated answering machine 210, network computer 211, alternate beeper 212, and/or alternate pager 213. The transmitter(s) 203F is also connected to the CPU 203A. The central processing computer 203 also comprises a receiver(s) 203G for receiving signals and/or data from the cellular telephone 202 and from the communication device 204 and/or from any other suitable device which may be utilized in conjunction with the apparatus 200. The receiver(s) 203G is also connected to the CPU 203A.

The central processing computer 203 also comprises a database(s) 203H which contains account information and data pertaining to the cellular telephone owner(s) and/or account(s). The database 203H contains information about the cellular telephone owner, the telephone number, etc., and any other information and/or data necessary to the manage and/or process an account and/or account transaction as described herein. The database 203H may also contain information regarding any limitations and/or restrictions placed on the cellular telephone and/or the use thereof. The database 203H is also connected to the CPU 203A. The central processing computer 203 also comprises a printer 203I or other appropriate output device for outputting information and/or data to a user or operator.

The database 203H can also include or store information regarding uses of the cellular telephone 202 processed by the central processing computer 203 for any cellular telephone account(s) or wireless telephone account(s) serviced by the central processing computer 203. The information can include, for each of any number of uses of a cellular telephone 202 for each or any number of cellular telephone account(s) or wireless telephone account(s), a picture, a photograph, or a video clip, of the individual or individuals involved in using the cellular telephone 202, and/or audio information, a voice message or sample, and/or a voice print, which is a digital representation of a voice message or sample, obtained from the individual involved in using the cellular telephone 202, for each of any number of uses of cellular telephone 202 for any number of cellular telephone account(s) or wireless telephone account(s) processed by the central processing computer 203. For example, for any given cellular telephone account or wireless telephone account, the central processing computer 103 can store information for any number of uses of a cellular telephone 202 occurring on the respective account. In this manner, a picture, a photograph, or a video clip, of the individual or individuals involved in using a cellular telephone 202 on a cellular telephone account or wireless telephone account, and/or audio information, a voice message or sample, and/or a voice print, which is a digital representation of a voice message or sample, obtained from the individual involved in using a cellular telephone on a cellular or wireless telephone account, can be stored for any number of uses of a cellular telephone 202 on a cellular telephone account or wireless telephone account.

The database 203H of the central processing computer 203 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or any other entities, which have been or which were offered, presented, submitted, processed, involved, or used, in or involving, or related to, a transaction or transactions on or involving any of the accounts serviced by the apparatus 200.

It is envisioned that a cellular or wireless telephone account holder, or other authorized individual, can submit a photograph or picture or his or her face which can be stored in the database 203H as a "file photograph" or a "file picture" associated with the respective account. In a preferred embodiment, and "file photograph" or a "file picture" is stored as a digital file. It is also envisioned that the cellular or wireless telephone account holder or other authorized individual can also submit a pre-recorded voice message which can be digitized into a voice print which can be stored as a "file voice print".

In processing a transaction involving or use of a cellular or wireless telephone account, a respective checking account, savings account, and/or automated teller machine account, the central processing computer 203 can process a picture, a photograph, or a video clip, of the individual or individuals using the cellular or wireless telephone account, and/or audio information, a voice message or sample, and/or a voice print, obtained from the individual using the cellular or wireless telephone account using the respective "file photograph", "file picture", and/or "file voice print", and/or can provide the "file photograph", "file picture", and/or "file voice print", to the communication device 204 for use in allowing the cellular or wireless telephone account holder to verify that the use of the cellular or wireless telephone account is authorized.

In FIG. 8, the communication device 204, in the preferred embodiment, comprises a central processing unit or CPU 204A, associated random access memory 204B (RAM) and read only memory 204C (ROM) devices, which also connected to the CPU 204A, a user input device 204D, which is a keypad or a plurality of keys and/or switches for inputting data into the communication device 204 and which is also connected to the CPU 204A, and a display device 204E, for displaying information and/or data to the cellular telephone owner, and a database 204F, which are also connected to the CPU 204A.

The communication device 204 also comprises a receiver 204G for receiving signals and/or data from the central processing computer 203 and which is also connected to the CPU 204A, a transmitter 204H for transmitting signals and/or data to the central processing computer 203 and which is also connected to the CPU 204A.

The communication device 204 also includes a camera/microphone system 204I. In the preferred embodiment, the camera/microphone system 204I can include a camera or a video recording device which can be used to take a picture, a photograph, or a video clip of the cellular telephone owner. In the preferred embodiment, the camera/microphone system 204I can also include a microphone or an audio recording device which can be used to record audio information and/or the voice of the cellular telephone owner. In a preferred embodiment, voice information can be processed by the CPU 204A in order to generate a voiceprint file of the recorded voice.

In the preferred embodiment, the camera/microphone system 204I can be located on or in the communication device 204 so as to record the respective picture, photograph, or video clip, of the cellular telephone owner, and/or so as to record the audio information and/or the voice of the cellular telephone owner.

In the preferred embodiment, the database 204F can be utilized to store, for each of any number of uses of the cellular telephone 202 on the cellular telephone account or wireless telephone account, a picture, a photograph, or a video clip, of the individual or individuals involved in using the cellular telephone 202 on the cellular telephone account or wireless telephone account, and/or audio information, a voice message or sample, and/or a voice print, which is a digital representation of a voice message or sample, obtained from the individual using the cellular telephone 202 on the cellular telephone account or wireless telephone account.

The database 204F of the communication device 204 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or any other entities, which have been or which were offered, presented, submitted, processed, involved, or used, in or involving, or related to, a transaction or transactions on or involving any of the accounts serviced by the apparatus 200.

In the preferred embodiment, the communication device 204 which is utilized is a cellular telephone, a personal digital assistant, a wireless telephone, a home computer, a personal computer, a laptop computer, a notebook computer, a netbook computer, an interactive television, and/or pager with a reply feature and/or device, or any of the other devices described-herein as being utilized as a communication device. A two-way pager and/or pager systems may also be utilized for implementing the respective components, and/or systems in the communication device 204/central processing computer 203 combination and/or link.

The apparatus 200 of the present invention, in the preferred embodiment, may be utilized in order provide cellular telephone owner and/or account owner authorization, notification and/or security measures in transactions involving cellular telephones and/or cellular telephone numbers, and any transactions involving same in the manner described below and with reference to FIGS. 9A, 9B and 9C. In the preferred embodiment, the apparatus 200 of the present invention can provide an authorization, notification, and/or security, apparatus and method which provides a notification of a telephone call or a transaction involving a cellular telephone and/or a cellular telephone number, and/or in or for any transactions involving same, or any telephone call or transaction on or involving any one or more of the accounts described herein, along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a telephone call or a transaction on or involving a cellular telephone account, a cellular telephone, a cellular telephone number, a mobile telephone account, a wireless telephone account, or any other telephone account or telephone number associated with same, or any other telephone account or telephone number.

In this manner, the apparatus and method of the present invention may be utilized to obtain cellular telephone owner and/or account owner authorization in a transaction involving cellular telephones and/or cellular telephone numbers.

Figure 9A:
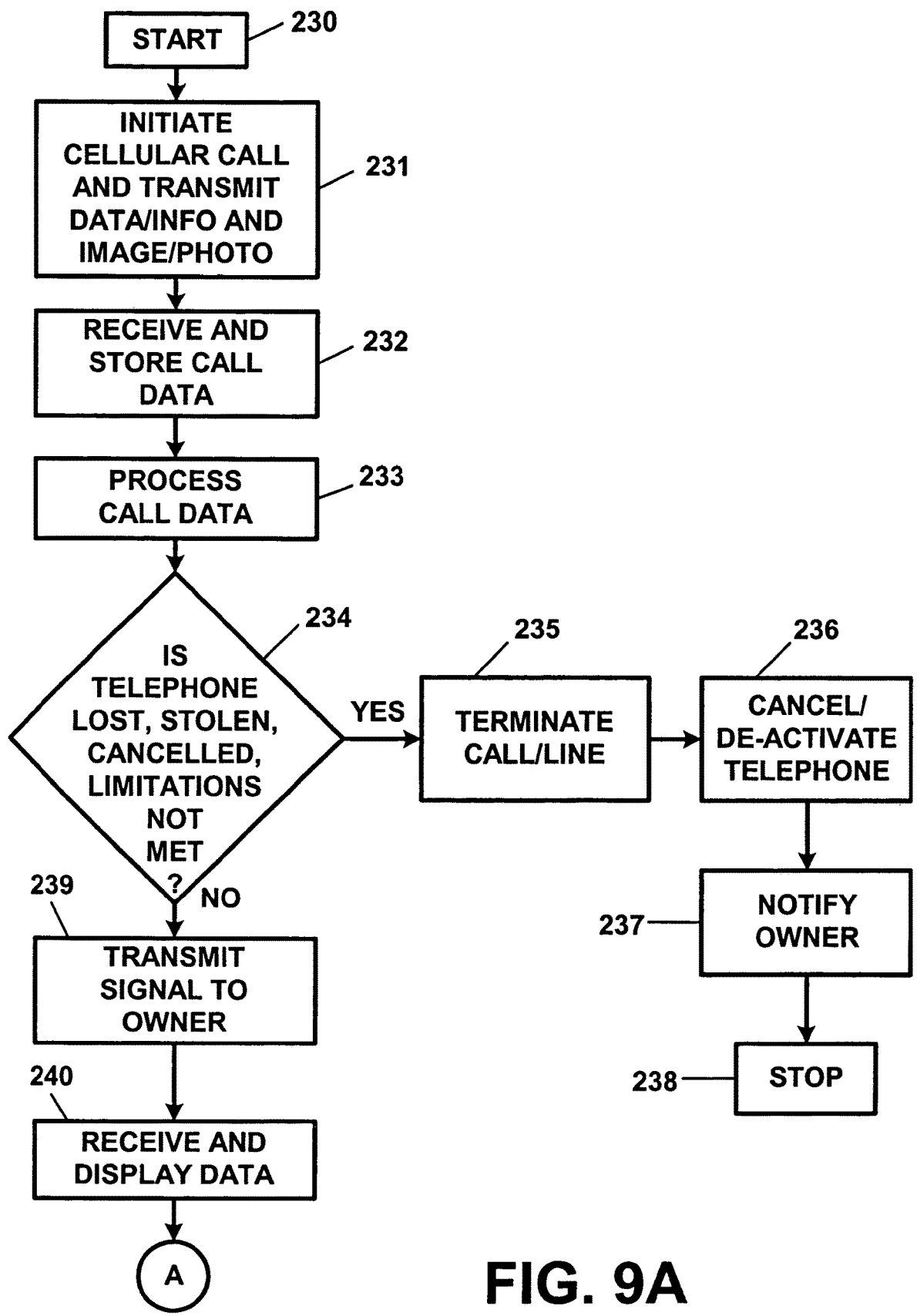
FIGS. 9A, 9B, and 9C illustrate the operation of the apparatus of FIG. 7 in flow diagram form.
Figure 9B:
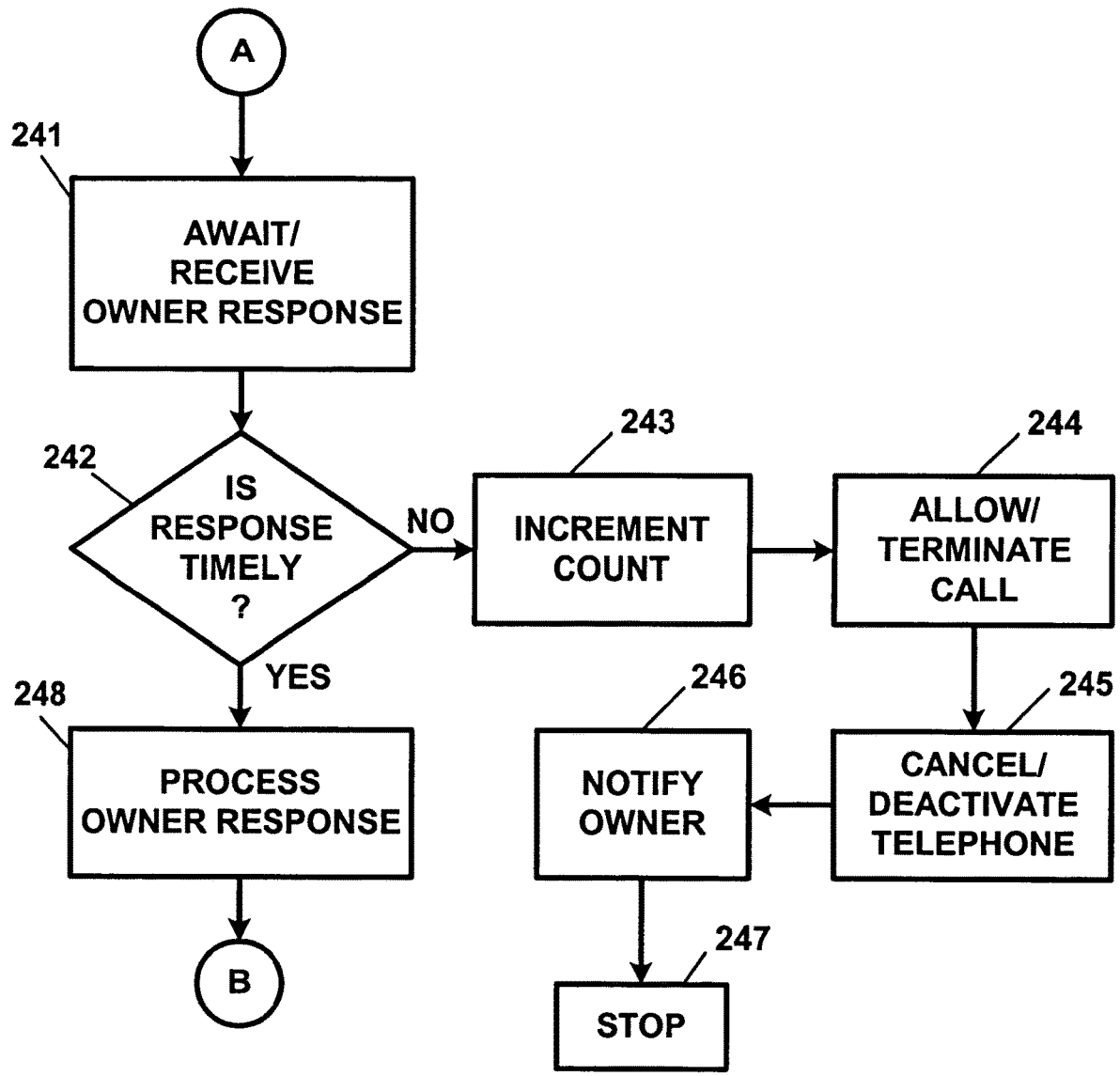
Figure 9C:
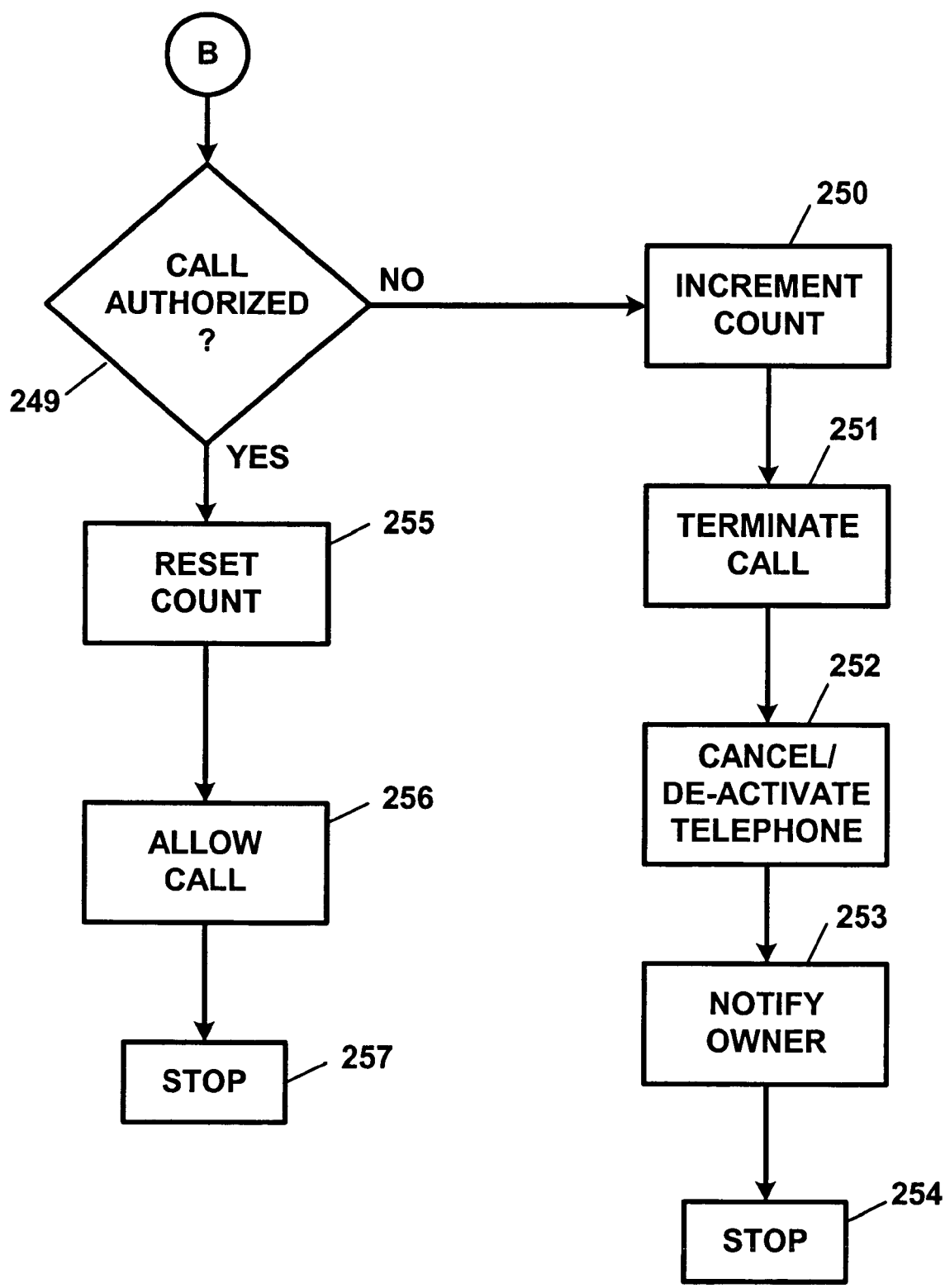

FIGS. 9A, 9B and 9C illustrate the operation of the apparatus 200 of FIG. 7 in flow diagram form. It is important to note, with regards to the apparatus 200 of FIG. 7, that the cellular/telephone replaces the transaction terminal of the previously described embodiments. With reference to FIGS. 9A, 9B and 9C, the operation of the apparatus 200 commences at step 230 when the cellular telephone 202 is utilized to make a cellular telephone call and/or transaction, or when a document, authorization form, authorization request form, benefit request form, claim form, draft, bank draft, deposit form, withdrawal form, check, form, receipt, request form, or any other entity, is offered, presented, transmitted, submitted, processed, involved, or used, in or involving, or related to, a telephone call or a transaction.

The cellular telephone 202 will activate the apparatus 200, at step 231, with the initiation of the cellular telephone call, and/or in any other typical manner, such as when a cellular telephone is utilized to gain access to the telephone network so that the calling connection may be established via the cellular communications network and/or the cell site.

In the case of a document, authorization form, authorization request form, benefit request form, claim form, draft, bank draft, deposit form, withdrawal form, check, form, receipt, request form, or any other entity, is offered, presented, transmitted, submitted, processed, involved, or used, in or involving, or related to, the telephone call or the transaction, an image or a digital copy of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, can be obtained, scanned, or generated, and/or stored, by or in cellular telephone 202 using the user input device 202D of the cellular telephone 202 or other suitable device, or a photograph or a picture of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, can obtained, taken, recorded, or generated, or stored, in or by the point-of-sale terminal 2 using the camera/microphone system 202I of the cellular telephone 202.

In another preferred embodiment, at step 231, the individual using the cellular telephone will also be requested or instructed to look into, or pose for, the camera of the camera/microphone system 202I so that a photograph, a picture, or a video clip, can be taken of the individual's face. At step 231, the individual will also be requested or instructed to recite a predetermined voice message into the microphone of the camera/microphone system 202I, so that a voice recording or a voice print can be obtained. The pre-determined voice message can be any appropriate message such as "My name is Raymond Joao" or "This is my cellular phone", or any other appropriate message. In a preferred embodiment, the voice message should be the same as that voice message for which a voice print was previously submitted for storage at the central processing computer 203.

Upon the making of the cellular telephone call, at step 231, the cellular telephone 202 will transmit data and/or information, which identifies the calling telephone, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the photograph, picture, and/or video clip, and/or the voice recording, and/or voice print, of the individual involved in the transaction, to the central processing computer 203 which services the particular cellular telephone or cellular telephone network, so that appropriate billing and/or accounting of telephone usage may be noted and/or processed. The cellular telephone 202 will also, at step 231, transmit the data or information pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the photograph, picture, and/or video clip, and/or the voice recording, and/or voice print, of the individual involved in the transaction, to the central processing computer 203. In the preferred embodiment, the central processing computer for the particular cellular telephone and/or cellular telephone network is the central processing computer 203.

In a preferred embodiment, at step 231, the information and/or data pertinent to the use of the cellular telephone or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the photograph, picture, and/or video clip, and/or the voice recording, and/or voice print, of the individual involved in the transaction, can also be transmitted to the communication device 204 to inform the cellular telephone owner and to provide him or her with any or all of the above-described information. The information and/or data pertinent to the use of the cellular telephone or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the photograph, picture, and/or video clip, and/or the voice recording, and/or voice print, of the individual involved in the transaction, can thereafter be provided to the cellular telephone owner via the communication device 204. At any time, if the cellular telephone owner determines that the use of the cellular telephone or the cellular telephone account is a fraudulent or an unauthorized use, or that the individual is not an individual authorized for using the cellular telephone or the cellular telephone account, the cellular telephone owner can transmit an unauthorized message from the communication device to the central processing computer 203 so as to stop, cancel, or prevent, the use of the cellular telephone or the cellular telephone account. At step 231, the information regarding the telephone call or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the photograph, picture, and/or video clip, and/or the voice recording, and/or voice print, of the individual involved in the transaction, can also be stored in the central processing computer 203 and, in particular, in the database 203H, and can be retrieved at any time by any authorized individual.

In a preferred embodiment, the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, can be in the body of a message containing the information or data sent, such as in the body of the message, or the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, can be, or can be included in, an attachment to the message. In a preferred embodiment, the message, or the information or data pertinent to the telephone call or the transaction, can be included in, or can include, an electronic mail (e-mail) message, an instant message, a text message, or any other suitable message, electronic, digital, or otherwise, or any other electronic transmission.

In a preferred embodiment, the photograph, picture, and/or video clip, and/or the voice recording, and/or voice print, of the individual involved in the transaction, can also be in the body of the message containing the information or data sent, such as in the body of the message, or the respective photograph, picture, and/or video clip, and/or the voice recording, and/or voice print, of the individual involved in the transaction, can be, or can be included in, an attachment to the message. The account owner can then, at step 231, or at any other time, review the information in the message, including viewing or reviewing the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, or viewing or reviewing the photograph, picture, and/or video clip, and/or the voice recording, of the individual involved in the telephone call or the transaction.

At step 232, the central processing computer will receive and store the data and/or information which is transmitted by the cellular telephone 202.

At step 233, the central processing computer 203 will process the data and/or information which is received from the cellular telephone 202 and/or from the communication device 204. The central processing computer 203 can also process the photograph or picture against the "file photograph" or "file picture" and/or can process the voice message against the "file voice print".

The central processing computer 203 may utilize any of the widely known data processing and/or software routines, which are known to those skilled in that art, in order to process transaction requests and/or authorizations involving the use of the respective cellular telephone(s) and/or cellular communication device, and/or cellular telephone number. At step 234, the central processing computer 203 will perform a test in order to determine if the cellular telephone is lost, stolen, cancelled or de-activated. If the cellular telephone is determined to be lost, stolen, cancelled or de-activated, the central processing computer 203 will, at step 235, block the telephone call or terminate the call if it has already been connected. The central processing computer 203 will then, at step 236, cancel and/or de-activate the cellular telephone number or account. The central processing computer 203 will then, at step 237, notify the cellular telephone owner that his or her cellular telephone has been cancelled and/or de-activated. The operation of the apparatus will then cease at step 238.

If, at step 234, the central processing computer 203 determines that the cellular telephone is not lost, stolen, cancelled or de-activated, the central processing computer 203 will, at step 239, transmit a signal and/or data, containing any and/or all of the above-described information regarding the use of the cellular telephone or the cellular telephone account, including, but not limited to, information and/or data pertinent to the use of the cellular telephone or the cellular telephone account or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the respective photograph, picture, and/or video clip, and/or the voice recording, and/or voice print, of the individual involved in the use of the cellular telephone, the cellular telephone account, the telephone call, or the transaction, can also be transmitted to, or re-transmitted to, the communication device 204, which can be any one or more of the communication devices 204 described herein, which is located at the cellular telephone owner. At step 240, the communication device 204 will receive and display the data and/or information which is transmitted from the central processing computer 203. The displayed information, in the preferred embodiment, will include the number called, the time of the call, and the duration of the call, any and/or all of the above-described information regarding the use of the cellular telephone or the cellular telephone account, and can also include, in addition to the herein-described information, information pertinent to the use of the cellular telephone or the cellular telephone account, the telephone call, or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and/or the respective photograph, picture, video clip, voice recording, or voice print, of the individual involved in the use of the cellular telephone, the cellular telephone account, the telephone call, or the transaction, in real-time or otherwise. The information will remain displayed during the duration of the call so that the cellular telephone owner will be notified continuously throughout the duration of the call.

In an instance where the cellular telephone owner has not responded earlier, at step 241, the central processing computer 203 will await the cellular telephone owner's reply or response. During this time, the cellular telephone owner may utilize the communication device 204, which can be a cellular telephone, a personal digital assistant, a wireless telephone, a home computer, a personal computer, a laptop computer, a notebook computer, a netbook computer, a television, an interactive television, a digital television, a beeper, or a pager, or any of the communication devices 204 described herein, and/or a reply or two-way pager feature on the communication device 204, or any other communication device, in order to respond. If the cellular telephone owner replies or responds, the reply or response data will also be transmitted to, and received by, the central processing computer 203 at step 241. At step 242, the central processing computer 203 will then determine if the cellular telephone owner's response was made within a pre-defined time period, which is chosen, in the preferred embodiment, to be one (1) minute. If, at step 242, it is determined that the cellular telephone owner did not reply or respond within the pre-defined time limit, the central processing computer will, at step 243, increment the unauthorized transaction count (UNAUTHCT) by one (1).

The central processing computer 203 will then, depending upon pre-defined instructions of the cellular telephone owner, at step 244, either allow the telephone call to continue, such as for a pre-defined duration of one (1) minute, so as to allow for cases wherein an emergency condition exists, or terminate the telephone call immediately. The decision to either allow the telephone call to continue or to terminate the telephone call can be made by the cellular telephone owner and/or by the cellular telephone service provider. Upon the completion of step 244, the central processing computer 203 will then, at step 245, cancel and/or de-activate the cellular telephone. Thereafter, the central processing computer 203 will, at step 246, notify the cellular telephone owner that the cellular telephone number or account has been cancelled and/or de-activated. Upon completion of step 246, the apparatus will cease operation at step 247.

If, at step 242, the cellular telephone owner did respond in time, the central processing computer 203 will process the reply or response data and/or information, at step 248. The central processing computer 203 will then determine, at step 249, if the cellular telephone call is authorized by the cellular telephone owner. If, at step 249, the cellular telephone call is unauthorized, the central processing computer will, at step 250, increment the unauthorized transaction count (UNAUTHCT) by one (1). The central processing computer 203 will then, at step 251, terminate the telephone call immediately. Upon the completion of step 251, the central processing computer 203 will then, at step 252, cancel and/or de-activate the cellular telephone. Thereafter, the central processing computer 203 will, at step 253, notify the cellular telephone owner that the cellular telephone has been cancelled and/or de-activated. Upon completion of step 253, the apparatus will cease operation at step 254.

If, at step 249, the central processing computer 203 identifies the cardholder reply or response as being one to authorize the cellular telephone call, the central processing computer 203 will, at step 255, reset the unauthorized transaction count (UNAUTHCT) to zero (0). An unauthorized transaction count (UNAUTHCT) of 0 will signify that any string of unauthorized transactions has now been broken by the cellular telephone owner. The central processing computer 203 will then, at step 256, allow the cellular telephone call to continue uninterrupted. Upon the completion of the cellular telephone call, at step 256, the apparatus 200 will cease operation at step 257.

In instances when the cellular telephone owner is a party to the cellular telephone call and/or transaction, he or she, having the communication device 204 on his or her person, may authorize the call and/or transaction at his or her present location. If the cellular telephone owner has lent out the cellular telephone, he or she may authorize the cellular telephone call and/or transaction from his or her remote location. The cellular telephone owner may also program and/or set the communication device 204 to automatically authorize or disapprove or disallow cellular telephone calls and/or transactions with said selective authorizations being made as to time of day, calling areas, numbers called, and/or call and/or transaction duration. In this regard, the communication device 204 may be programmable so as to receive and analyze the cellular telephone call information and/or data and reply or respond to same automatically and/or with preset or programmed replies and/or responses. The communication device 204 may also be programmable so as to limit the number of cellular telephone calls made from the cellular telephone and/or with the cellular telephone number.

The communication device 204, in the preferred embodiment, is provided with a memory device for storing any number of cellular telephone calls and/or transactions along with any of the information or data described herein as being capable of being provided by the apparatus 200 so that the cellular telephone owner may review his or her account activity and/or cellular calls and/or transactions made and/or which have occurred involving his or her cellular telephone. In this manner, the cellular telephone owner may "scroll" through and/or in other ways review account activity. The communication device 204 may also be equipped to service more than one cellular telephone and/or mobile communication device(s).

The apparatus and method of the present invention provides for the real-time notification of cellular and/or mobile telephone usage which also provides information regarding the telephone call or the transaction, along with the image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, and which also enables a cellular telephone owner and/or account owner to monitor, in real-time, activity involving his or her cellular telephone and/or cellular telephone number. The apparatus and method of the present invention also provides a means and a mechanism by which to inform a cellular telephone owner that the cellular telephone is lost or stolen, and/or to provide notification to the cellular telephone owner that his or her cellular telephone number is being utilized in calls and/or transactions while also providing the account owner with an image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, such as when a cellular telephone has been illegally "cloned", is being used in an unauthorized or fraudulent manner, or when any other fraud is being perpetrated involving the cellular telephone account or the cellular telephone. The cellular telephone owner may then report the cellular telephone lost or stolen and/or cancel and/or de-activate the cellular telephone number and/or account.

The present invention also provides a means and a mechanism by which to monitor the number of cellular or mobile telephone calls and/or transactions which are unauthorized by the cellular telephone owner and to determine whether or not to de-activate the cellular telephone and/or the cellular telephone number and/or account. The present invention also provides a means and a mechanism for providing an image, digital copy, photograph, or picture, of the respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction, for any number of transactions on or involving a cellular telephone account, a mobile telephone account, a cellular telephone, a mobile telephone, or a cellular telephone number or a mobile telephone number, for any number of accounts.

In another preferred embodiment, wherein a number of transactions may be batch processed or otherwise processed in batches or processed in groups, the apparatus 200 can, at step 231 and/or at step 239, transmit the information and/or data pertinent to each of and/or all of the transactions, and/or the cellular telephone account, cellular telephone, or cellular telephone number, used in same, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, each of the transactions, and/or the photograph, picture, and/or video clip, and/or the voice recording, and/or voice print, of the individual involved in the transaction, associated with each of the transactions, can be transmitted to the communication device 204 and the account owner or account holder can review the information as desired. In this regard, in another preferred embodiment, all of the herein-described information pertaining to each transaction processed in a batch processing of transactions on or involving a cellular telephone account, a cellular telephone, or a cellular telephone number, or any other account, can be processed, obtained, gathered, or stored, and/or can be transmitted, in a single message, or in any number of messages, to the communication device 204 at step 231 and/or at step 239.

In the above manner, the apparatus and method of the present invention provides an apparatus and a method to prevent and/or to drastically limit fraudulent and/or unauthorized use of, and/or the "cloning" of, cellular telephones and/or the unauthorized use of cellular telephone numbers.

In this regard, the apparatus 300 of the present invention provides an authorization, notification, and/or security, apparatus and method which provides a notification of a telephone call or a transaction, on or involving a cellular telephone account, a cellular telephone, or a cellular telephone number, or a wireless or mobile telephone account or number, for any number of cellular telephone accounts, cellular telephones, or cellular telephone numbers, or other accounts, along with an image, digital copy, photograph, or picture, of a respective document, authorization form, authorization request form, benefit request form, claim form, draft, bank draft, deposit form, withdrawal form, check, form, receipt, request form, or any other entity, offered, presented, transmitted, submitted, processed, involved, or used, in or involving, or related to, the telephone call or the transaction.

The apparatus and method of the present invention, in another alternate embodiment, may be utilized so as to provide authorization, notification, and/or security, in transactions involving credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, and/or any other accounts, as well as any cards, devices, and/or other entities, which can be used with or which can be associated with any of the herein-described accounts, wherein an account holder or other individual authorized to use the account can be notified of a transaction and/or attempted transaction on or involving the account.

In another preferred embodiment, the apparatus and method of the present invention provides an authorization, notification, and/or security, apparatus and method which provides a notification of a transaction on or involving any one or more of the accounts described herein along with along with an image, a digital copy, a photograph, or a picture, of a document, authorization form, authorization request form, benefit request form, claim form, draft, bank draft, deposit form, withdrawal form, check, form, receipt, request form, or any other entity, which is offered, presented, submitted, processed, involved, or used, in or involving, or related to, a transaction on or involving a credit card account, a credit account, a charge card account, a charge account, a debit card account, a debit account, a bank account, a checking account, a savings account, a brokerage account, a pension account, an individual retirement account (IRAs), a self-employed pension (SEP) account, a "smart card account, a currency card account, a healthcare account, a Medicare account, a Medicaid account, an employee benefits plan, a cafeteria plan, a spending plan, a subscription for any goods, products, or services, an insurance policy, plan, or program, a healthcare insurance policy, plan, or program, a healthcare spending plan or program, a life insurance policy, plan, or program, a disability insurance policy, plan, or program, a tuition or tuition reimbursement plan or program, a pharmacy insurance policy, plan, or program, a credit report plan or program, a cable television plan or program, a digital television plan or program, a satellite television plan or program, a social security plan or program, a liability insurance policy, plan, or program, a lease insurance policy, plan, or program, a ticket plan or program, a telephone calling card plan or program, a utility plan or program, an electrical utility plan or program, gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, Internet plan or program, an Internet service provider plan or program, an electronic signature, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, or any other account.

In this alternate embodiment, an account can also be associated with, established, or created, to correspond to, or to be the same as, a credit card account, a credit account, a charge card account, a charge account, a debit card account, a debit account, a bank account, a checking account, a savings account, a brokerage account, a pension account, an individual retirement account (IRAs), a self-employed pension (SEP) account, a "smart card accounts, a currency card accounts, a healthcare accounts, a Medicare account, a Medicaid account, an employee benefits plan, a cafeteria plan, a spending plan, a subscription for any goods, products, or services, an insurance policy, plan, or program, a healthcare insurance policy, plan, or program, a healthcare spending plan or program, a life insurance policy, plan, or program, a disability insurance policy, plan, or program, a tuition or tuition reimbursement plan or program, a pharmacy insurance policy, plan, or program, a credit report plan or program, a cable television plan or program, a digital television plan or program, a satellite television plan or program, a social security plan or program, a liability insurance policy, plan, or program, a lease insurance policy, plan, or program, a ticket plan or program, a telephone calling card plan or program, a utility plan or program, an electrical utility plan or program, gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, Internet plan or program, an Internet service provider plan or program, an electronic signature, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, or any other account.

For the sake of simplicity, the apparatus of the embodiment described herein with regards to FIGS. 10, 11, 12A, 12B, and 12B, will be described as being utilized in connection with, or in conjunction with, an "account", with it being understood that the "account" can be any one of the herein-described credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other accounts, as well as any cards, devices, and/or other entities, which can be used with or which can be associated with any of the herein-described accounts, wherein an account holder or other individual authorized to use the account can be notified of a transaction and/or attempted transaction on or involving the account.

The "account" described in connection with the description of the apparatus and method of FIGS. 10, 11, 12A, 12B, and 12C, can be any one of the herein-described credit card account, a credit account, a charge card account, a charge account, a debit card account, a debit account, a bank account, a checking account, a savings account, a brokerage account, a pension account, an individual retirement account (IRAs), a self-employed pension (SEP) account, a "smart card account, a currency card account, a healthcare account, a Medicare account, a Medicaid account, an employee benefits plan, a cafeteria plan, a spending plan, a subscription for any goods, products, or services, an insurance policy, plan, or program, a healthcare insurance policy, plan, or program, a healthcare spending plan or program, a life insurance policy, plan, or program, a disability insurance policy, plan, or program, a tuition or tuition reimbursement plan or program, a pharmacy insurance policy, plan, or program, a credit report plan or program, a cable television plan or program, a digital television plan or program, a satellite television plan or program, a social security plan or program, a liability insurance policy, plan, or program, a lease insurance policy, plan, or program, a ticket plan or program, a telephone calling card plan or program, a utility plan or program, an electrical utility plan or program, gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, Internet plan or program, an Internet service provider plan or program, an electronic signature, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, and/or any other account.

Figure 10:
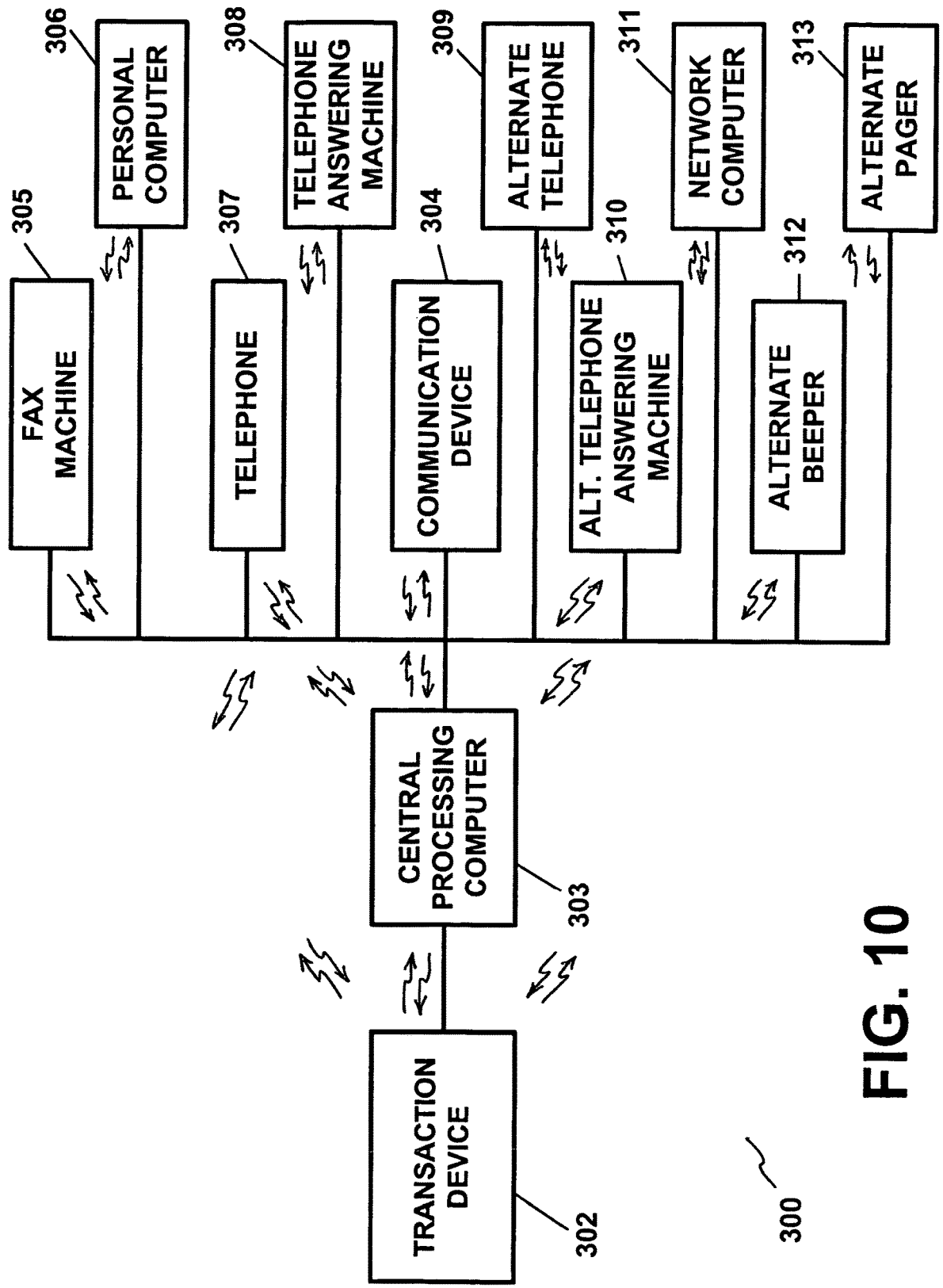
FIG. 10 illustrates another alternate embodiment of the apparatus of the present invention which can be utilized in conjunction with a credit card account, a credit account, a charge card account, a charge account, a debit card account, a debit account, a bank account, a checking account, a savings account, a brokerage account, a pension account, an individual retirement account (IRA), a self-employed pension (SEP) account, a "smart card account, a currency card account, a healthcare account, a Medicare account, a Medicaid account, an employee benefits account, a cafeteria account, a spending account, a subscription account for any goods, products, or services, an insurance account, a healthcare insurance account, a healthcare spending account, a life insurance account, a disability insurance account, a tuition account, a pharmacy account, a credit report account, a cable television account, a digital television account, a satellite television account, a social security account, a liability insurance account, a lease insurance account, a ticket account, a telephone calling card account, a utility account, an electrical utility account, a gas utility account, a fuel oil utility account, an account monitoring use of official seals, an account monitoring use of private, individual, and/or organizational, seals or access codes, a security access account, a computer access code account, a facility access account, a facility security account, a financial account, an electronic money account, an electronic cash account, a communication account, a telephone account, a wireless communication device account, a non-wireless communication device account, a cellular communication device account, a cellular telephone account, an Internet account, an Internet service provider account, an electronic signature account, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, and/or any other account.

FIG. 10 illustrates a block diagram of a preferred embodiment of the apparatus of the present invention, which is utilized in conjunction with a credit card account, a credit account, a charge card account, a charge account, a debit card account, a debit account, a bank account, a checking account, a savings account, a brokerage account, a pension account, an individual retirement account (IRAs), a self-employed pension (SEP) account, a Medicare account, a Medicaid account, an employee benefits plan, a cafeteria plan, a spending plan, a subscription for any goods, products, or services, an insurance policy, plan, or program, a healthcare insurance policy, plan, or program, a healthcare spending plan or program, a life insurance policy, plan, or program, a disability insurance policy, plan, or program, a tuition or tuition reimbursement plan or program, a pharmacy insurance policy, plan, or program, a credit report plan or program, a cable television plan or program, a digital television plan or program, a satellite television plan or program, a social security plan or program, a liability insurance policy, plan, or program, a lease insurance policy, plan, or program, a ticket plan or program, a telephone calling card plan or program, a utility plan or program, an electrical utility plan or program, gas utility plan or program, a fuel oil utility plan or program, a plan or program for monitoring use of an official seal, a plan or program for monitoring use of a private, individual, and/or organizational, seal or access code, a security access plan or program, an access code plan or program, a facility access plan or program, a facility security plan or program, Internet plan or program, an Internet service provider plan or program, an electronic signature, an e-mail account, a membership account, a club membership account, an entertainment membership account, an entertainment tickets account, a sports tickets account, a theatre tickets account, a concert or opera tickets account, a consumer or purchaser membership account, a sports club membership account, a health club membership account, a merchant credit account for customers, a merchant account, an association membership account, a professional association membership account, a trade association membership account, or any other account, transaction and/or authorization process.

The apparatus of FIG. 10 is denoted generally by the reference numeral 300. With reference to FIG. 10, the apparatus 300 consists of a transaction device 302 which can be utilized in processing a transaction involving or on any of the herein-described credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts. The transaction device 302 includes a camera and/or a microphone, and/or any other video recording device and/or audio recording device, for obtaining a picture and/or video information and/or audio information regarding an individual engaging in a transaction involving the respective account.

The transaction device 302 can be any of the widely used and well known devices or terminals or any suitable device or terminal which can be used for providing transaction authorization or processing for transactions on or involving any of the herein-described accounts, or any cards or other entities which are or which may be associated with, or established or created to correspond to, any of the herein-described accounts. The transaction device 302 can or may be utilized at the location of a respective goods or service provider, provider, account servicing business or entity, or any counterparty to a transaction involving, or pursuant to, the respective account, such as, but not limited to, a retail store, an office, a place of business, a place of operations, or any other suitable place where a transaction involving the respective account can or may occur and/or a place where the respective account can be serviced, or the transaction device 302 can or may be located at the site of the goods or service provider or vendor, provider, account servicing business or entity, or any counterparty to a transaction involving the respective account, such as in cases when a transaction involves a sale, a payment, a servicing of, or pursuant to, the respective account, or in situations where the transaction is or involves a telephone request or order, a mail request or order, and/or any other type of transaction via a communication network with any counterparty involving the respective account, including transactions made over or via the Internet and/or the World Wide Web, or any other suitable on-line or communication network or medium. As and for an, if the transaction involves a healthcare insurance account, the transaction device 302 can or may be located at the office of a doctor or dentist. If the transaction involves a request or claim pursuant to an employee benefit, the transaction device can or may be located at a location associated with an employee benefit provider of an employer. The transaction device 302 can also be the respective communication device used by the individual account holder or account owner in a transaction.

In the preferred embodiment, the transaction device 302 can comprise and utilize a magnetic card reader and/or magnetic strip card reader, for reading data from the magnetic strip located on a card associated with the respective account. The transaction device 302 transmits an authorization request which may include the data pertaining to the particular card utilized in the transaction, the amount of the transaction, the individual involved in the transaction or associated with the respective account, or any other information, over or via a communication network or medium, to a central processing computer for processing the transaction, the transaction request, and/or the authorization request pertaining thereto.

The transaction device 302 can also receive the authorization and/or authorization data and/or information from the central processing computer. A printed transaction receipt or other receipt can or may also be provided at and/or obtained via the transaction device 302, or from a peripheral device associated therewith, for printing a transaction receipt which is usually or typically signed by the account holder in acknowledging or in completing the transaction. The transaction device 302 may be designed to read other data besides and/or in addition to magnetic card data. The transaction device 302 may also comprise, or have associated therewith, a keypad for the manual entry of transaction information and/or data, such as the amount of the transaction, or any information regarding the respective account, the transaction, or any other information. The transaction device 302 may also be an integral component of a computer, a home computer, a personal computer, a laptop computer, a notebook computer, a netbook computer, a cash register, a point-of-sale device or terminal, or other transaction terminal or device, which may provide for the entry of transaction information and/or data.

The transaction device 302 may also include a scanner or other input device for obtaining an image or a digital copy of a document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving an account or a policy (hereinafter referred to as an "account").

The apparatus 300 also comprises a central processing computer 303 which services any predefined group of accounts, including the respective account utilized in the transaction. For example, the central processing computer 303 can handle all healthcare insurance transactions or claims for a given healthcare insurance company or the central processing computer 303 can handle employee benefits transactions or requests for a given employer or for a pre-defined group of employers. The central processing computer 303 can also process any and/or all transactions for an account provider as well as process and/or manage account information for any of the accounts serviced by the account provider. The central processing computer 303 can also process transactions and/or information for or regarding any accounts, for any number of account providers, for any number of the herein-described accounts or herein-described account types.

The central processing computer 303 can be a mainframe computer, a mini-computer, a micro-computer, a server computer, such as those utilized in conjunction with on-line services and/or in a network environment, and/or any other suitable computer or computer system.

In the preferred embodiment, the transaction device 302 is linked and/or connected to the central processing computer 303 via a telecommunications system, link and/or medium (hereinafter referred to as "communications system") such as, for example, a telephone network or line. It is important to note that the communications system which is utilized may be any communications system and may include telecommunication systems, satellite communications systems, radio communication systems, digital communications systems, digital satellite communications systems, personal communications services communication systems, the Internet and/or the World Wide Web, as well as any other appropriate communications system. The transaction device 302 transmits signals and/or data to the central processing computer 303 as well as receives signals and/or data from the central processing computer 303.

The apparatus 300 also comprises an account holder communication device 304 which can receive signals and/or data from either or both of the transaction device 302 and/or the central processing computer 303. In the preferred embodiment of FIG. 10, the communication device 304 receives signals and data from the central processing computer 303 and/or from the transaction device 302, with said signals being transmitted via a suitable communication system or network or combination of communication networks. In the preferred embodiment, the communications system or network utilized for transmitting signals and/or data to the communication device 304 is a wireless communication network and/or the Internet and/or the World Wide Web and the communication device 304 is a telephone signal receiving device such as a cellular telephone, a wireless telephone, a personal digital assistant, a home computer, a personal computer, a laptop computer, a notebook computer, a netbook computer, or a telephone beeper or pager. The communication device 304 receives the signals and/or data from the central processing computer 303 or from the transaction device 302 during the transaction authorization procedure as will be described in more detail below.

In the preferred embodiment, the communication device 304 is also equipped with a transmitter for transmitting signals and/or data to the central processing computer 303 or to the transaction device 302. In this regard, the central processing computer 303 transmits signals and/or data to the communication device 304 as well as receives signals and/or data from the communication device 304. The communication device 304 may also transmit signals and/or data directly to the transaction device 302 and receive signals and/or data directly from the transaction device 302. In the preferred embodiment, the transaction device 302 transmits signals and/or data to the central processing computer 303 and receives signals and/or data from the central processing computer 303, and the transaction device 302 transmits signals and/or data to the communication device 304 and receives signals and/or data from the communication device 304. Further, in the preferred embodiment, the communication device 304 receives signals and/or data from the central processing computer 303 and transmits signals and/or data to the central processing computer 303, and the communication device 304 receives signals and/or data from the transaction device 302 and transmits signals and/or data to the transaction device 302.

As noted above, the communication device 304 is a wireless device in the preferred embodiment. In this regard, the communication device 304 may be carried by the account holder and/or be kept on and/or close to the account holder's person so that the central processing computer 303 or the transaction device 302 may transmit signals and/or data to the communication device 304 so as to communicate with the account holder at any time. The communication device 304 may also be or comprise any one or more of a facsimile (fax) machine, a home computer, a personal computer, a laptop computer, a notebook computer, a netbook computer, a telephone, a telephone answering machine, an alternate telephone, an alternate telephone answering machine, a network computer, and/or an alternate beeper or pager, a cellular telephone, a wireless telephone, a personal digital assistant, or any other suitable communication device. The central processing computer 303 may be linked with each of the above devices via any suitable communication system or network.

In the preferred embodiment, the apparatus 300 also comprises a facsimile (fax) machine 305, a personal computer 306, a telephone 307, a telephone answering machine 308, an alternate telephone 309, an alternate telephone answering machine 310, a network computer 311, an alternate beeper 312, and/or an alternate pager 313. The central processing computer 303 may be linked with the above fax machine 305, personal computer 306, telephone 307, associated answering machine 308, alternate telephone 309, alternate telephone answering machine 310, network computer 311, and/or alternate beeper 312 or pager 313, via any suitable communication system o network. In the preferred embodiment, a telecommunications link or telephone network, line or link, which may or may not be a wireless link depending on the device and/or the circumstances, can be utilized in order to link the central processing computer 303 with each of the fax machine 305, the personal computer 306, the telephone 307, the associated answering machine 308, the alternate telephone 309, alternate telephone answering machine 310, the network computer 311, or the alternate beeper 312, the alternate pager 13, or any cellular telephone, wireless telephone, personal digital assistant, or other suitable communication device.

Figure 11:
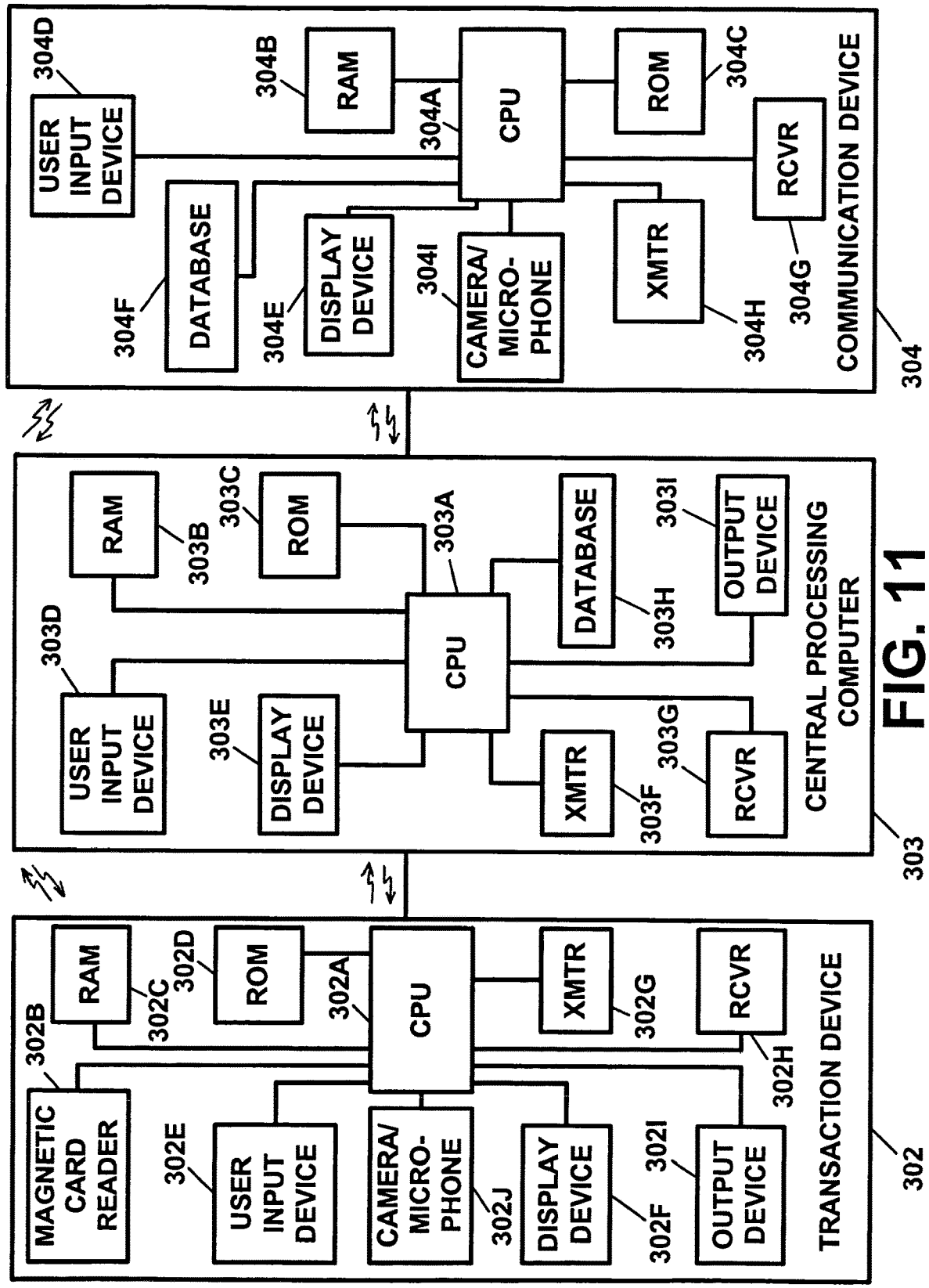
FIG. 11 illustrates the various components of the apparatus of FIG. 10.

FIG. 11 illustrates the various components of the apparatus 300 of FIG. 10. In FIG. 11, the transaction device 302, in the preferred embodiment, comprises a central processing unit or CPU 302A, a magnetic card reader 302B, which is connected to the CPU 302A, associated random access memory 302C (RAM) and read only memory 302D (ROM) devices, which are also connected to the CPU 302A, a user input device 302E, which is typically a keypad, keyboard, mouse, reader, or scanner, or any combination of same, or other suitable input device for inputting data into the transaction device 302 and which is also connected to the CPU 302A, and a display device 302F for displaying information and/or data to a user.

The transaction device 302 also comprises a transmitter 302G for transmitting signals and/or data to the central processing computer 303, and/or to the communication device 304 and/or to any other device associated with the account holder and/or the apparatus, if desired. The transmitter 302G is also connected to the CPU 302A. The transaction device 302 also comprises a receiver 302H for receiving signals and/or data from the central processing computer 303, and from the communication device 304 and/or any other associated device which may be utilized, if desired. The receiver 302H is also connected to the CPU 302A. The transaction device 302 also comprises a printer 302I or other appropriate output device for outputting data to the user. The printer 302I is also connected to the CPU 302A. In the preferred embodiment, the printer 302I prints receipts corresponding to the transaction.

The transaction device 302 also includes a camera/microphone system 302J. In the preferred embodiment, the camera/microphone system 302J can include a camera or a video recording device which can be used to take a picture, a photograph, or a video clip of an individual or individuals involved in a transaction involving the respective account. In the preferred embodiment, the camera/microphone system 302J can also include a microphone or an audio recording device which can be used to record audio information and/or the voice of an individual involved in a transaction involving the respective account. In a preferred embodiment, voice information can be processed by the CPU 302A in order to generate a voiceprint file of the recorded voice.

In the preferred embodiment, the camera/microphone system 302J is also used to take a picture or a photograph of a respective document, authorization form, authorization request form, benefit request form, claim form, draft, bank draft, deposit form, withdrawal form, check, form, receipt, request form, or other entity, which is offered, presented, submitted, processed, involved, or used, in or involving, or related to, a transaction on or involving a respective account.

In the preferred embodiment, the camera/microphone system 302J can be located on or in the vicinity of the transaction device 302 so as to record the respective picture, photograph, or video clip, of the individual or individuals involved in a transaction, and/or so as to record the audio information and/or the voice of the individual involved in the transaction.

In the preferred embodiment, the transaction device 302 can also include a database (not shown) which can be utilized to store information regarding transactions processed by the transaction device 302 and to store any other information described herein as being store in or at the central processing computer 303 or a database in, of, or associated with, the central processing computer as described herein. The information can include, for each of any number of transactions, a picture, a photograph, or a video clip, of the individual or individuals involved in a transaction, and/or audio information, a voice message or sample, and/or a voice print, which is a digital representation of a voice message or sample, obtained from the individual involved in the transaction.

The database of the transaction device 302 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 300.

In FIG. 11, the central processing computer 303, in the preferred embodiment, comprises a central processing unit or CPU 303A, associated random access memory 303B (RAM) and read only memory 303C (ROM) devices, which are connected to the CPU 303A, a user input device 303D, which is a keypad and/or any other suitable input device for inputting data into the central processing computer 303 and which is also connected to the CPU 303A and a display device 303E for displaying information and/or data to a user or operator.

The central processing computer 303 also comprises a transmitter(s) 303F for transmitting signals and/or data to the transaction device 302 and to the communication device 304 and/or to any one or more of the fax machine 305, personal computer 306, telephone 307, telephone answering machine 308, alternate telephone 309, alternate telephone answering machine 310, network computer 311 and/or alternate beeper 312 or alternate pager 313. The transmitter(s) 303F is also connected to the CPU 303A. The central processing computer 303 also comprises a receiver(s) 303G for receiving signals and/or data from the transaction device 302 and from the communication device 304 and/or from any other suitable device which may be utilized in conjunction with the apparatus 300. The receiver(s) 303G is also connected to the CPU 303A. The central processing computer 303, in any and/or all of the embodiments described herein, may utilize a fax/modem and/or any other suitable computer communication device.

The central processing computer 303 also comprises a database(s) 303H which contains account information and data pertaining to the account holders and/or to the account holders' accounts which are serviced by the central processing computer 303. The database 303H, for example, contains information about the account holder, the account holder's account number, account limits, previous activities, transactions, claims made, or purchases, etc., number of unauthorized activities, transactions, claims attempted, or purchases, made or attempted on or involving the respective account, and/or any other information and/or data necessary to manage and/or process an account transaction as described herein, to manage transactions for a respective account or types of accounts, and/or to provide the functionality described herein as being provided by the central processing computer 303.

The database 303H can also comprise data and/or information regarding specific limitations and/or restrictions which may be placed on a particular account, which may be pre-selected and/or programmed by the account holder and/or which may include limitations and/or restrictions on the usage of the account. The limitations and/or restrictions may include the types of transactions which are allowed and/or authorized, the goods or services which may be purchased on or with the account, the vendors, stores, or service providers, or account servicing providers or entities who or which may be authorized to engage in a transaction on or involving the account, copayments for services rendered, limits on the dollar amounts of transactions pertaining to each authorized vendor, seller, service provider, or account servicing provider or entity, daily spending limits on the account, and/or the geographical area or location wherein authorized account use may be limited, and/or authorized times for account usage (i.e. specific days, dates, time of day, time of month, year, etc.), and/or any other limitation and/or restriction regarding amount of transaction, parties involved, geographical area, and/or times of allowed usage. For each of the herein-described accounts, the database 303H can include any information, data, limitation, or restriction, which is needed or desired for servicing each of the respective accounts. The database 303H is also connected to the CPU 303A. The central processing computer 303 also comprises a printer 303I or other appropriate output device for outputting information and/or data to a user or operator.

The database 303H can also include or store information regarding transactions processed by the central processing computer 303 for any account(s) serviced by the central processing computer 303. The information can include, for each of any number of transactions for each of any number of accounts, a picture, a photograph, or a video clip, of the individual or individuals involved in a transaction, and/or audio information, a voice message or sample, and/or a voice print, which is a digital representation of a voice message or sample, obtained from the individual involved in the transaction, for each of any number of transactions processed by the central processing computer 303. For example, for any given account, the central processing computer 303 can store information for any number of transactions occurring on a given account. In this manner, a picture, a photograph, or a video clip, of the individual or individuals involved in a transaction, and/or audio information, a voice message or sample, and/or a voice print, which is a digital representation of a voice message or sample, obtained from the individual involved in the transaction, can be stored for any number of transactions on a respective account, in order to perform identity verification for an individual involved in a transaction.

The database 303H of the central processing computer 303 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 300.

It is envisioned that an account holder, or other authorized individual, of a respective account can submit a photograph or picture or his or her face which can be stored in the database 303H as a "file photograph" or a "file picture" associated with the respective account. In a preferred embodiment, and "file photograph" or a "file picture" is stored as a digital file. It is also envisioned that the account holder or authorized individual can also submit a pre-recorded voice message which can be digitized into a voice print which can be stored as a "file voiceprint".

In processing a transaction involving a respective account, the central processing computer 303 can process a picture, a photograph, or a video clip, of the individual or individuals involved in the transaction, and/or audio information, a voice message or sample, and/or a voice print, obtained from the individual involved in the transaction using the respective "file photograph", "file picture", and/or "file voice print", and/or can provide the "file photograph", "file picture", and/or "file voice print", to transaction device 302 so that the operator of the transaction device 302 can use same in verifying that the individual is the account holder or authorized individual.

In FIG. 11, the communication device 304, in the preferred embodiment, comprises a central processing unit or CPU 304A, associated random access memory 304B (RAM) and read only memory 304C (ROM) devices, which are connected to the CPU 304A, a user input device 304D, which is a keypad or a plurality of keys and/or switches for inputting data into the communication device 304 and which is also connected to the CPU 304A, and a display device 304E, for displaying information and/or data to the account holder, and a database 304F, which are also connected to the CPU 304A. The communication device 304 also comprises a receiver 304G for receiving signals and/or data from the central processing computer 303 and which is also connected to the CPU 304A, a transmitter 304H for transmitting signals and/or data to the central processing computer 303 and which is also connected to the CPU 304A.

The communication device 304 also includes a camera/microphone system 304I. In the preferred embodiment, the camera/microphone system 304I can include a camera or a video recording device which can be used to take a picture, a photograph, or a video clip of the account holder. In the preferred embodiment, the camera/microphone system 304I can also include a microphone or an audio recording device which can be used to record audio information and/or the voice of the account holder. In a preferred embodiment, voice information can be processed by the CPU 304A in order to generate a voiceprint file of the recorded voice.

In the preferred embodiment, the camera/microphone system 304I can be located on or in the communication device 304 so as to record the respective picture, photograph, or video clip, of the account holder, and/or so as to record the audio information and/or the voice of the account holder.

In the preferred embodiment, the database 304F can be utilized to store, for each of any number of transactions, a picture, a photograph, or a video clip, of the individual or individuals involved in a transaction, and/or audio information, a voice message or sample, and/or a voice print, which is a digital representation of a voice message or sample, obtained from the individual involved in the transaction at the transaction device 302.

The database 304F of the communication device 304 can also contain copies of any of the images, digital copies, photographs, or pictures, of any of the respective documents, authorization forms, authorization request forms, benefit request forms, claim forms, drafts, bank drafts, deposit forms, withdrawal forms, checks, forms, receipts, request forms, or other entities, which have been, or which were, offered, presented, submitted, processed, involved, or used, in or involving, or related to, a transaction or transactions on or involving any of the accounts serviced by the apparatus 300.

In the preferred embodiment, the communication device 304 which is utilized is a cellular telephone, a personal digital assistant, a wireless telephone, a home computer, a personal computer, a laptop computer, a notebook computer, a netbook computer, an interactive television, and/or pager with a reply feature and/or device, or any of the other devices described-herein as being utilized as a communication device. A two-way pager and/or pager systems may also be utilized for implementing the respective component system(s) in the communication device 304/central processing computer 303 combination and/or link.

The apparatus 300 of the present invention, in the preferred embodiment, may be utilized, in the manner described below and with reference to FIGS. 12A, 12B, and 12C, in order to facilitate account holder authorization, notification, and/or security or security measures, in transactions involving a respective account, which account can be any one or more of the herein-described credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other accounts.

In the preferred embodiment, the apparatus 300 of the present invention can provide an authorization, notification, and/or security, apparatus and method which provides a notification of a transaction on or involving any one or more of the accounts described herein along with an image, a digital copy, a photograph, or a picture, of a document, authorization form, authorization request form, benefit request form, claim form, draft, bank draft, deposit form, withdrawal form, check, form, receipt, request form, or other entity, or any number, group, or combination of, documents, authorization forms, authorization request forms, benefit request forms, claim forms, drafts, bank drafts, deposit forms, withdrawal forms, checks, forms, receipts, request forms, or other entities, which is, or which are, offered, presented, submitted, processed, related to, or used, in or involving a transaction on or involving an account or a policy associated with or corresponding to the account.

In this manner, the apparatus 300 of the present invention may be utilized to obtain account holder authorization in an account-related transaction.

Figure 12A:
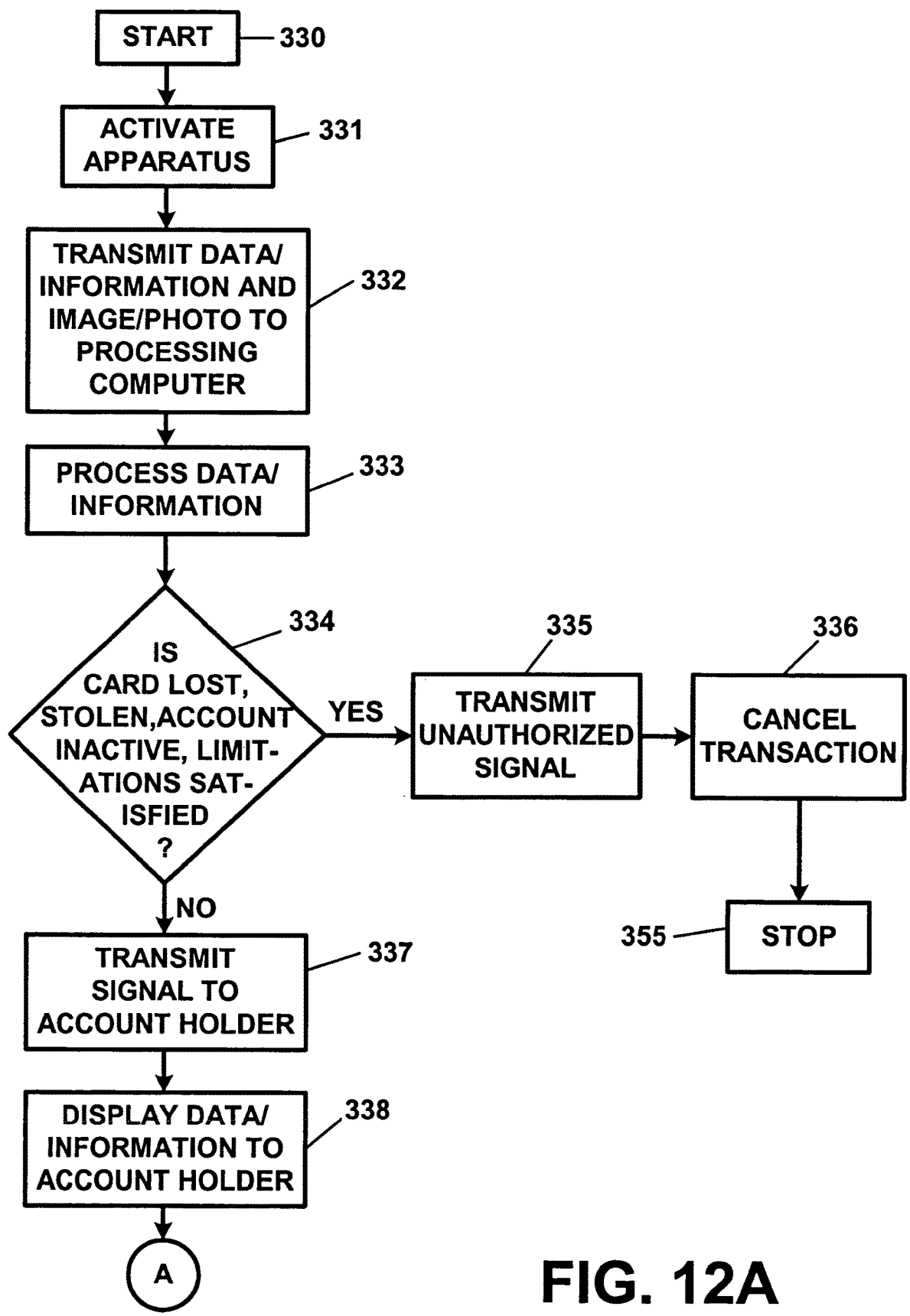
FIGS. 12A, 12B, and 12C illustrate the operation of the apparatus of FIG. 10, in flow diagram form.
Figure 12B:
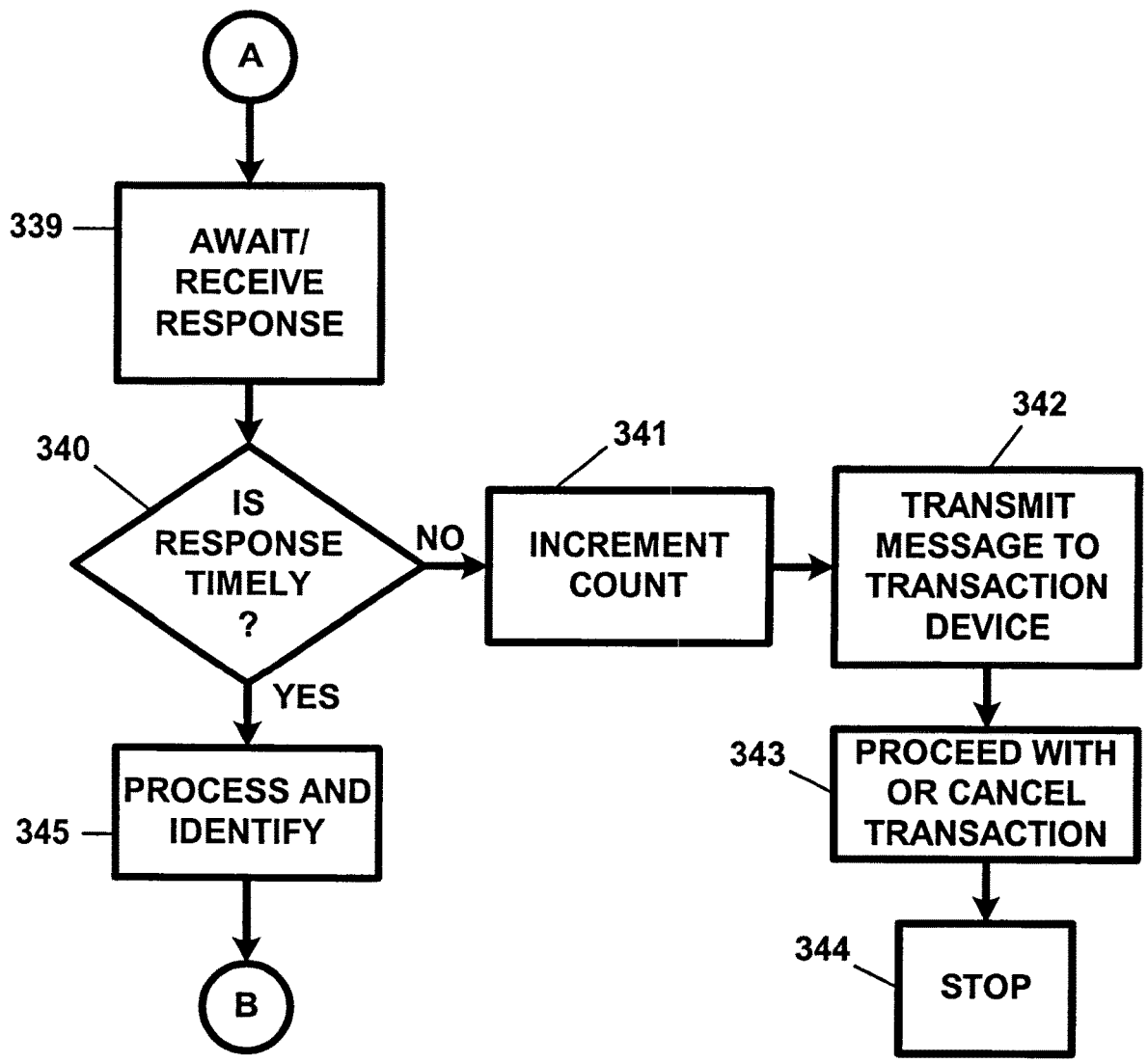
Figure 12C:
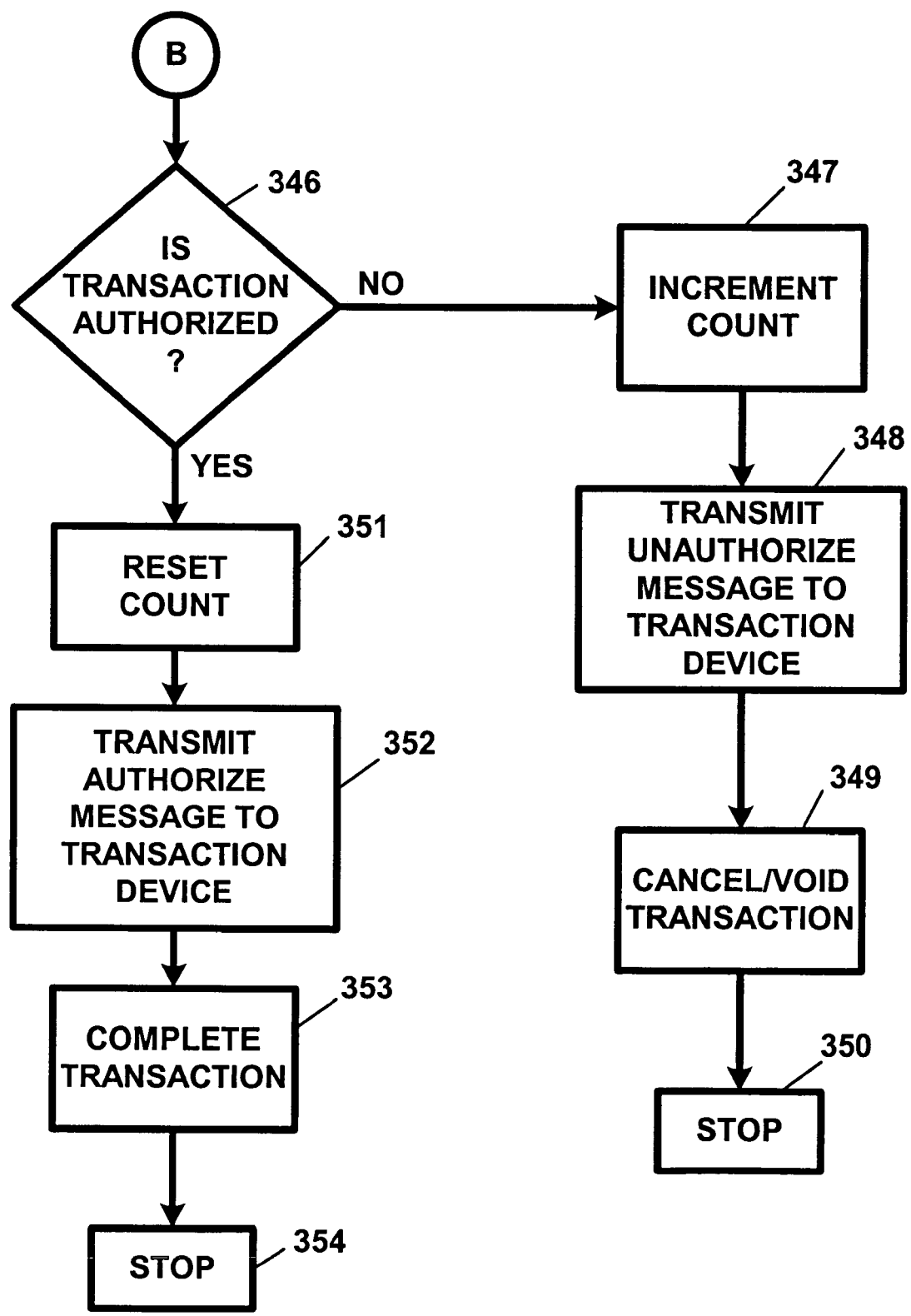

FIGS. 12A, 12B, and 12C illustrate a preferred embodiment operation of the apparatus 300 in flow diagram form. The apparatus 300 can be utilized, or can operate, in the manner described herein with reference to FIGS. 12A, 12B, and 12C, for processing a transaction, or information regarding a transaction, on or involving credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other accounts, as well as any cards, devices, and/or other entities, which can be used with or which can be associated with any of the herein-described accounts.

In the preferred embodiment, the apparatus 300 of the present invention can provide an authorization, notification, and/or security, apparatus and method which provides a notification of a transaction on or involving any one or more of the accounts described herein, along with an image, a digital copy, a photograph, or a picture, of a document, authorization form, authorization request form, benefit request form, claim form, draft, bank draft, deposit form, withdrawal form, check, form, receipt, request form, or other entity, or any number, group, or combination of, documents, authorization forms, authorization request forms, benefit request forms, claim forms, drafts, bank drafts, deposit forms, withdrawal forms, checks, forms, receipts, request forms, or other entities, which is or were, or which are, offered, presented, submitted, processed, involved, or used, in or involving, or related to, a transaction or transactions on or involving a respective account.

For the sake of simplicity, the operation of the apparatus 300 is described herein for an "account" or for a "respective account", it being understood that the account or respective account can be a credit card account, credit account, charge card account, charge account, debit card account, debit account, bank account, checking account, savings account, brokerage account, pension account, individual retirement account (IRAs), self-employed pension (SEP) account, "smart card account, currency card account, healthcare account, Medicare account, Medicaid account, employee benefits account, cafeteria account, spending account, subscription account for any good, product, or service, insurance account, healthcare insurance account, healthcare spending account, life insurance account, disability insurance account, tuition account, pharmacy account, credit report account, cable television account, digital television account, satellite television account, social security account, liability insurance account, lease insurance account, ticket account, telephone calling card account, utility account, electrical utility account, gas utility account, fuel oil utility account, account monitoring use of an official seal, account monitoring use of a private, individual, and/or organizational, seal or access code, security access account, computer access code account, facility access account, facility security account, financial account, electronic money account, electronic cash account, communication account, telephone account, wireless communication device account, non-wireless communication device account, cellular communication device account, cellular telephone account, Internet account, Internet service provider account, electronic signature account, e-mail account, membership account, club membership account, entertainment membership account, entertainment ticket account, sports ticket account, theatre ticket account, concert or opera ticket account, consumer or purchaser membership account, sports club membership account, health club membership account, merchant credit account for a customer, merchant account, association membership account, professional association membership account, trade association membership account, or any other account.

With reference to FIGS. 12A, 12B, and 12C, the operation of the apparatus 300 commences at step 330 when the account or a card, or when a document, authorization form, authorization request form, benefit request form, claim form, draft, bank draft, deposit form, withdrawal form, check, form, receipt, request form, or other entity, is offered, presented, transmitted, submitted, processed, involved, or used, in or involving, or related to, a transaction on or involving a respective account, or when an image, a digital copy, a photograph, or a picture, of a document, authorization form, authorization request form, benefit request form, claim form, draft, bank draft, deposit form, withdrawal form, check, form, receipt, request form, or other entity, is offered, presented, transmitted, submitted, processed, involved, or used, in or involving, or related to, a transaction on or involving respective account, or which is to be utilized in connection with a transaction on or involving the account, is presented in the transaction. At step 331, the attendant or transaction device operator (hereinafter "transaction device operator") will activate the apparatus 300 in any typical manner, such as by obtaining a communication line or link by entering account or card information, or information regarding the respective document, authorization form, authorization request form, benefit request form, claim form, draft, bank draft, deposit form, withdrawal form, check, form, receipt, request form, or other entity, or the image, digital copy, photograph, or picture, of same, into the transaction device 302, or other suitable device. For the card, this data entry is typically performed by swiping the magnetic strip of the card through the card reader 302B.

In the case of a document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, an image or a digital copy of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, can be obtained, scanned, or generated, and/or stored, by or in the transaction device 302 using the user input device 302E of the transaction device 302 or other suitable device, or a photograph or a picture of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, can obtained, taken, recorded, or generated, or stored, in or by the transaction device 302 using the camera/microphone system 302J of the transaction device 302 or other suitable device.

In another preferred embodiment, at step 332, the individual involved in the transaction will be requested or instructed to look into, or pose for, the camera of the camera/microphone system 302J so that a photograph, a picture, or a video clip, can be taken of the individual's face. In the preferred embodiment, a photograph, picture, or video clip, is taken of the individual's face with the camera and a digital file of same is created and stored at the transaction device 302. At step 332, the individual will be requested or instructed to recite a predetermined voice message into the microphone of the camera/microphone system 302J, so that a voice recording or a voice print can be obtained. The pre-determined voice message can be any appropriate message such as "My name is Raymond Joao" or "This is my account", or any other appropriate message. In a preferred embodiment, the voice message should be the same as that voice message for which a voice print was previously submitted for storage at the central processing computer 303.

In an Internet transaction, or other on-line transaction, wherein the transaction is being performed with a remote transaction device 302, the individual can take the photograph, picture, or video clip, by using a camera or web camera associated with his or her computer, home computer, personal computer, laptop computer, notebook computer, netbook computer, cellular telephone, personal digital assistant, or other communication device, and/or record the voice message or voice print on a microphone or other audio recording device associated with the respective computer, home computer, personal computer, laptop computer, notebook computer, netbook computer, cellular telephone, personal digital assistant, or other communication device. The respective photograph, picture, or video clip, and/or voice message or voice print can thereafter be transmitted to the receiver 302H of the transaction device 302.

The information and/or data pertinent to the transaction, and/or the card, along with the image, digital copy, photograph, or picture, of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, and/or the photograph, picture, and/or video clip, and/or the voice recording, and/or voice print, of the individual involved in the transaction, is then transmitted, at step 332, to the central processing computer 303. In a preferred embodiment, at step 332, the information and/or data pertinent to the transaction, and/or the card, along with the image, digital copy, photograph, or picture, of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, and/or the photograph, picture, and/or video clip, and/or the voice recording, and/or voice print, of the individual involved in the transaction, can also be transmitted to the communication device 304 to inform the account holder and to provide him or her information regarding the transaction, along with the image, digital copy, photograph, or picture, of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, and/or any and/or all of the other herein-described information.

At step 332, the information regarding the transaction, along with the image, digital copy, photograph, or picture, of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, and/or the photograph, picture, and/or video clip, and/or the voice recording, and/or voice print, of the individual involved in the transaction, can also be stored in the central processing computer 303 and, in particular, in the database 303H, and can be retrieved at any time by any authorized individual.

The information and/or data pertinent to the transaction, and/or the card, or the account, along with the image, digital copy, photograph, or picture, of the respective document, authorization form, authorization request form, benefit request form, claim form, draft, bank draft, deposit form, withdrawal form, check, form, receipt, request form, or other entity, which is offered, presented, transmitted, submitted, processed, involved, or used, in or involving, or related to, the transaction on or involving the respective account, and/or the photograph, picture, and/or video clip, and/or the voice recording, and/or voice print, of the individual involved in the transaction, can thereafter be provided to the account holder via the communication device 304.

In a preferred embodiment, the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, can be in the body of a message containing the information or data sent, such as in the body of the message, or the respective document, authorization form, authorization request form, benefit request form, claim form, draft, bank draft, deposit form, withdrawal form, check, form, receipt, request form, or other entity, involved in, used in, or related to, the transaction can be, or can be included in, an attachment to the message. In a preferred embodiment, the message, or the information or data pertinent to the transaction, can be included in, or can include, an electronic mail (e-mail) message, an instant message, a text message, or any other suitable message, electronic, digital, or otherwise, or other electronic transmission. In a preferred embodiment, the photograph, picture, and/or video clip, and/or the voice recording, and/or voice print, of the individual involved in the transaction, can also be included in the body of the message containing the information or data sent, such as in the body of the message, or the respective photograph, picture, and/or video clip, and/or the voice recording, and/or voice print, of the individual involved in the transaction, can be, or can be included in, an attachment to the message. The account holder can then, at step 332, or at any other time, review the information in the message, including viewing or reviewing the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, or viewing or reviewing the photograph, picture, and/or video clip, and/or the voice recording and/or voice print, of the individual involved in the transaction.

At any time, if the account holder determines that the transaction is a fraudulent transaction or an unauthorized transaction, or that the individual is not an individual authorized for engaging in a transaction involving the respective account, the account holder can transmit an unauthorized message to the transaction device 302 so as to stop, cancel, or prevent, the transaction. The account holder, in another preferred embodiment, can place an immediate or real-time telephone call, or other communication, to a telephone or other device associated with the transaction device 302 and inform the operator of the transaction device 302 that the transaction is unauthorized and/or fraudulent. The above telephone call can be a conventional telephone call or a voice over IP telephone call.

The central processing computer 303 will, at step 333, process the information and/or data pertinent to the transaction and/or to the account and may request, if needed or desired, that the transaction device operator enter additional information regarding the transaction, such as, for example, transaction description, transaction description as it pertains or relates to the account, transaction amount, service description, good or product description, security information, provider or vendor identification, benefit sought, account claim request, request made involving the account, or any other pertinent information which may be needed or desired by any entity or person processing the transaction, or processing information regarding the transaction, on or involving the account. The central processing computer 303 will then process the information and/or data pertinent to the transaction in conjunction with the account information in order to determine if the card has been lost, stolen and/or cancelled and/or de-activated or whether the account is active or inactive. Further, the central processing computer 303 will perform a test to determine if the account can still be utilized by the individual or account holder or whether the maximum benefits available pursuant to the account have been provided for a given time period, or whether any benefits under the account can still be provided to the account holder or individual. For a credit, charge, or debit account, the central processing computer 303 can determine if a maximum credit, charge, or debit spending limit has been reached. The central processing computer 303 can also perform any other suitable test for any of the herein-described accounts.

The central processing computer 303 can also process the photograph or picture against the "file photograph" or "file picture" and/or can process the voice message against the "file voice print".

The central processing computer 303 may utilize any of the widely known data processing and/or software routines, which are known to those skilled in that art, in order to process transaction requests and/or authorizations involving the use of the respective account(s).

Once the information and/or data processing has been completed at step 333, the central processing computer 303, at step 334, will determine if the card has been lost, stolen, and/or cancelled and/or de-activated, or if the account is active or inactive, or if any limit associated with a use of the card or the account has been reached and/or exceeded.

The central processing computer 303 will, at step 334, also perform a test in order to determine if the predetermined maximum number of unauthorized transactions have occurred on the account. The unauthorized transactions count refers to transactions which are not authorized by the account holder as will be described herein. The authorized transaction count (UNAUTHCT) is a variable which is pre-set to zero (0) at the time the account is created or established. Each time an unauthorized transaction occurs, the unauthorized transaction count is incremented by one (1). Once the unauthorized transaction count reaches a pre-defined limit of, for example, three (3), the central processing computer 303 will cancel the transaction and de-activate the account as well as any card associated with the account. The central processing computer 303 will then notify the account holder. In this manner, the apparatus 300 will enable the central processing computer 303 of an account issuing and/or account servicing entity to cancel and/or de-activate the account as well as the card associated with the account, either permanently and/or temporarily, in cases when the account holder may have failed to respond or to reply to transaction notices, which may be the case when the account holder is not aware that the card has been lost or stolen, or when the card or account number has been duplicated, "cloned", or in other ways utilized without the account holder's authorization, and/or when the account holder is unable to respond or reply to the transaction notices for some other reason(s). This feature of the present invention serves to put a usage limit on the use of the account as well as the card associated with the account. The central processing computer 303, at step 334, will also perform a test(s) to determine if any additional limitations and/or restrictions have been met and/or satisfied. The central processing computer 303 can also process the photograph or picture against the "file photograph" or "file picture" and/or can process the voice message against the "file voice print" to determine if the individual is not the account holder or other authorized individual.

If any of the above listed conditions exist (i.e. card is lost, stolen, cancelled, and/or de-activated, account inactive, unauthorized transaction limit reached or exceeded, or pre-defined, pre-selected and/or programmed, or other, limitations and/or restrictions are violated, etc.), the central processing computer 303 will, at step 335, transmit a signal to the transaction device 302 indicating that the transaction is not approved and/or is not authorized. The transaction device operator may then cancel the transaction, at step 336. The transaction device operator may then confiscate the card and/or alert the authorities. Upon the completion of step 336, the apparatus 300 will cease operation at step 355. At step 334, if requested pursuant to a pre-existing agreement between the respective operator of the central processing computer 303, and/or if requested by the transaction device operator during the transaction, the central processing computer 303 can retrieve and transmit a "file photograph" or "file picture", of the account holder or authorized individual or authorized individuals, to the transaction device 302 for display thereat. If the transaction device operator does not recognize the individual involved in the transaction as being the account holder or other authorized individual, then the transaction device operator can stop, void, or cancel, the transaction at that moment and at step 355 and so inform the central processing computer 303 and/or the account holder by transmitting an appropriate signal or message to the central processing computer 303 or the account holder's communication device 304.

If, at step 334, the central processing computer 303 determines that the card is not lost, stolen, cancelled or de-activated, that the account is not inactive, that the unauthorized transaction limit has not been reached or exceeded, or that any pre-defined, pre-selected and/or programmed, or other limitations and/or restrictions have not been violated, the central processing computer 303 will, at step 337, transmit a signal and/or data, containing any and/or all of the herein-described information regarding the transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the respective photograph, picture, and/or video clip, and/or the voice recording, and/or voice print, of the individual involved in the transaction, can also be transmitted to, or re-transmitted to, the communication device 304, which can be any one or more of the communication devices 4 described herein, which is located at the account holder.

In this regard, at step 337, a signal and/or data containing any and/or all of the above-described information regarding the transaction, including, but not limited to, information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or any other entity, involved in, used in, or related to, the transaction, and/or the respective picture, photograph or image, video clip, and/or audio clip or voice print, of the individual involved in the transaction, can also be transmitted to, or re-transmitted to, the communication device 304, which can be any one or more of the communication devices 304 described herein, which is located at the account holder or account owner.

At step 337, the central processing computer 303 will then also transmit respective signals and/or data, containing any and/or all of the above-described information regarding the transaction, including the information and/or data pertinent to the transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the respective photograph, picture, and/or video clip, and/or the voice recording, and/or voice print, of the individual involved in the transaction, to any one or more of the account holder's designated fax machine 305, personal computer 306, telephone 307, telephone answering machine 308, alternate telephone 309, alternate telephone answering machine 310, network computer 311, and/or alternate beeper 312 or alternate pager 313, or any other communication device. The signals and/or data can be transmitted to more than one of the above devices 305-313, or to any other communication device, either sequentially or simultaneously.

The information and/or data which is transmitted to the communication device 304 includes information and/or data identifying the transaction and can include, in addition to any of the herein-described information, the information pertinent to the transaction, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and/or the respective photograph, picture, and/or video clip, and/or the voice recording, and/or voice print, of the individual involved in the transaction, and may also include information identifying the account, the name of the individual involved in the transaction, the name of the store or the service provider involved in the transaction, the type of transaction, the amount of the transaction, or any other information pertinent to the transaction, as well as the photograph, picture, and/or video clip, and/or the voice recording, and/or voice print. The information and/or data may also provide the time of the transaction, the location (i.e. city, town, village, state, country etc.) of the transaction, or any other information regarding the transaction, the account, or any party, counterparty, or parties involved. The information and/or data may also include the phone number of the central processing office and/or computer servicing the account so that the account holder may telephone same in order to authorize or cancel the transaction. The information and/or data may also be supplemented to include the type of goods or services, or other subject of the transaction, involved in the transaction, if such information can be entered at the transaction device 302.

At step 338, the information and/or data which is transmitted from the central processing computer 303 and received at the communication device 304 is displayed to the account holder on the display device 304E of the communication device 304. The information displayed on the display device 304E can include information and/or data identifying the transaction and may include information identifying the account, the name of the individual involved in the transaction, the name of the store or the service provider involved in the transaction, the type of transaction, the amount of the transaction, or any other information pertinent to the transaction, as well as the photograph, picture, and/or video clip, and/or the voice recording, and/or voice print. The information and/or data displayed may also provide the time of the transaction, the location (i.e. city, town, village, state, country etc.) of the transaction, or any other information regarding the transaction, the account, or any party, counterparty, or parties involved. The information and/or data displayed may also include the phone number of the central processing office and/or computer servicing the account so that the account holder may telephone same in order to authorize or cancel the transaction. The information and/or data displayed may also be supplemented to include the type of goods or services, or other subject of the transaction, involved in the transaction, if such information can be entered at the transaction device 302.

In an instance where the account holder has not responded earlier, the apparatus 300 will then, at step 339, wait for the account holder to respond to the transmission. During this time, the account holder may utilize a cellular telephone, a personal digital assistant, a wireless telephone, a home computer, a personal computer, a laptop computer, a notebook computer, a netbook computer, a television, an interactive television, a digital television, a beeper, or a pager, or any of the communication devices 304 described herein, and/or a reply or two-way pager feature on the communication device 304, or any other communication device, in order to either approve or authorize the transaction, or disapprove of, or void, the transaction. At step 339, the central processing computer 303 will also receive the response if one is sent. At step 340, the apparatus 300 will determine if the account holder has made a reply or response within the pre-defined time limit which is chosen, in the preferred embodiment, to be one (1) minute. The account holder may also transmit a signal via an appropriate key or button suspending use of the account, or the card associated with the account, such as when he or she may first be apprised of the fact that the card has been lost or stolen. In instances when the communication device 304 does not have a reply feature or means for communicating with the central processing computer 303, the account holder may simply telephone the central processing office or a processing center for the account in order to personally appraise the center or office of his or her response to the central processing computer transmission regarding the transaction.

If the account holder does not respond or reply to the central processing office within the pre-specified time, chosen, in the preferred embodiment, to be one (1) minute, the central office computer will, at step 341, increment the unauthorized transaction count (UNAUTHCT) by one (1) and will, at step 342, transmit a signal and/or data to the transaction device 302 indicating that, with the exception of receiving the authorization of the account holder, the transaction is otherwise approved. The transaction device operator may then, at step 343, either proceed to consummate the transaction, try to obtain additional information from the individual, or cancel the transaction. The action taken by the transaction device operator may be dictated by the specific agreement in effect between the account servicing entity and the account holder. Upon the completion of step 343, the operation of the apparatus 300 will cease at step 344. If the account holder should reply or respond to the transaction notice at a later period, the response or reply information may then be utilized in order to approve of, or to disapprove and/or to dispute, the transaction.

If, at step 340, the response or reply is determined to be timely, the central processing computer 303 will, at step 345, process and identify the account holder response. At step 346, the central processing computer 303 will determine if the account holder has replied or responded so as to authorize the transaction. If the account holder's response is to cancel, disapprove or, or not to authorize, the transaction, the central processing computer 303 will, at step 347, increment an unauthorized transaction count by 1. At this juncture, it is important to note that the unauthorized count (UNAUTHCT) is set to zero at the time of the establishment or creating of the account. After the unauthorized transaction count has been incremented, the central processing computer 303 will, at step 348, transmit a signal and/or data to the transaction device 302 which will notify and/or instruct the transaction device operator that the transaction is not authorized and should, therefore, be cancelled or voided. The transaction device operator may then cancel the transaction at step 349. The transaction device operator may then confiscate the card and/or alert the authorities. Upon the completion of step 349, the apparatus 300 will cease operation at step 350.

If, at step 346, the central processing computer 303 identifies the account holder reply or response as being one to authorize the transaction, the central processing computer 303, at step 351, will reset the unauthorized transaction count (UNAUTHCT) to 0. An unauthorized transaction count (UNAUTHCT) of 0 will signify that any string of unauthorized transactions has now been broken by the account holder, and further, that the present transaction is approved by the account holder. The central processing computer 303 will then, at step 352, transmit a signal and/or data to the transaction device 302 which will notify and/or instruct the transaction device operator that the transaction is authorized and/or approved. In another preferred embodiment, the account holder can also transmit an authorization message to the transaction device 302.

The transaction device operator may then complete the transaction, at step 353. After the transaction has been completed at step 353, the operation of the apparatus 300 will cease at step 354.

In instances when the account holder is a party to the transaction, he or she, having the communication device 304 on his or her person, may authorize the transaction at the transaction device location or while in communication with the transaction device location. If the transaction is a telephone and/or other remotely made transaction, the account holder may authorize the transaction from his or her remote location. The account holder may also program and/or set the communication device 304 to automatically authorize or disapprove or disallow transactions. In this regard, the communication device 304 may be programmable so as to receive and analyze the transaction information and/or data and reply and/or respond to same automatically and/or with preset and/or programmed relies and/or responses. The communication device 304 may also be programmable so as to limit the amounts of transactions. In this regard, the account holder may provide for temporary transaction types or temporary transaction amounts.

The communication device 304, in the preferred embodiment, is provided with a memory device for storing any of the information or data described herein as being capable of being provided by the apparatus 300 for any number of transactions so that the account holder may review his or her account activity and/or transactions which have occurred involving his or her account. In this manner, the account holder may "scroll" through and/or in other ways review card and/or account activity. The communication device 304 may also be equipped to service more than one account.

The apparatus and method of the present invention provides for the real-time, as well as non-real-time, notification of transactions involving any of the herein-described accounts which also provides information regarding the transaction, along with an image, digital copy, photograph, or picture, of the respective document, authorization form, authorization request form, benefit request form, claim form, draft, bank draft, deposit form, withdrawal form, check, form, receipt, request form, or other entity, involved in, used in, or related to, the transaction, and which also enables an account holder to monitor, in real-time or otherwise, activity involving his or her accounts. The apparatus and method of the present invention also provides a means and a mechanism by which to inform a account holder that his or her card(s) associated with an account are lost or stolen, and/or that the respective card(s), and/or the account numbers corresponding thereto, are utilized without his or her authorization and also provides an indication to the account holder of where his or her accounts, account numbers, or card(s) associated with the respective account(s) is being utilized in transactions while also providing the account holder with an image, digital copy, photograph, or picture, of a respective document, authorization form, authorization request form, benefit request form, claim form, draft, bank draft, deposit form, withdrawal form, check, form, receipt, request form, or other entity, involved in, used in, or related to, the transaction. The account holder may then report the account has having been compromised, or as having been, or as being, involved in, or as being the subject of, fraudulent or unauthorized activity, and/or the account holder can cancel and/or de-activate the account or can cancel and/or de-activate a card associated with the account.

The account owner may then report the unauthorized or fraudulent activity.

The present invention also provides a means and a mechanism by which to monitor the number of transactions which are unauthorized by the account holder and to determine whether or not to authorize transactions and/or cancel or de-activate the card(s) and/or the account. In the above manner, the apparatus and method of the present invention provides an apparatus and a method for preventing and/or for drastically limiting fraudulent and/or unauthorized use of accounts, and/or cards and/or the account numbers corresponding to these accounts.

The present invention also provides a means and a mechanism by which to monitor the number of transactions which are deemed to be unauthorized by the account holder and to determine whether or not to authorize transactions and/or cancel or de-activate a respective account or accounts or a card or cards associated with same. In the above manner, the apparatus and method of the present invention provides an apparatus and a method for preventing and/or for drastically limiting fraudulent and/or unauthorized use of any of the herein-described accounts. The present invention also provides a means and a mechanism for providing an image, digital copy, photograph, or picture, of the respective document, authorization form, authorization request form, benefit request form, claim form, draft, bank draft, deposit form, withdrawal form, check, form, receipt, request form, or other entity, involved in, used in, or related to, a transaction or transactions, for any number of transactions and for any number or types of accounts.

In another preferred embodiment, wherein a number of transactions may be batch processed or otherwise processed in batches or processed in groups, the apparatus 300 can, at step 332 and/or at step 337, transmit the information and/or data pertinent to each of and/or all of the transactions processed in the batch processing routine, and/or the account used in same, along with the image, digital copy, photograph, or picture, of the respective document, authorization form, authorization request form, benefit request form, claim form, draft, bank draft, deposit form, withdrawal form, check, form, receipt, request form, or other entity, involved in, used in, or related to, each of the transactions, and/or the photograph, picture, and/or video clip, and/or the voice recording, and/or voice print, of the individual involved in the transaction, associated with each of the transactions, can be transmitted to the communication device 304 and the account holder or account owner can review the information as desired. In this regard, in another preferred embodiment, all of the herein-described information pertaining to each transaction processed in a batch processing of transactions on or involving an account or accounts, can be processed, obtained, gathered, or stored, and/or can be transmitted, in a single message, or in any number of messages, to the communication device 304 at step 332 and/or at step 337.

The apparatus and method of the present invention may also be utilized in connection with an on-line service and/or on, or over, the Internet and/or the World Wide Web, so as to provide for a means by which the respective cardholder, account owner, account holder, and/or cellular telephone owner, may utilize the apparatus and method in conjunction with a home and/or a personal computer, a laptop computer, a notebook computer, a netbook computer, a personal communications device, and/or a commercial or industrial computer system (i.e., an internet server computer), and/or any other appropriate device, in any appropriate network, system or medium.

Figure 13:
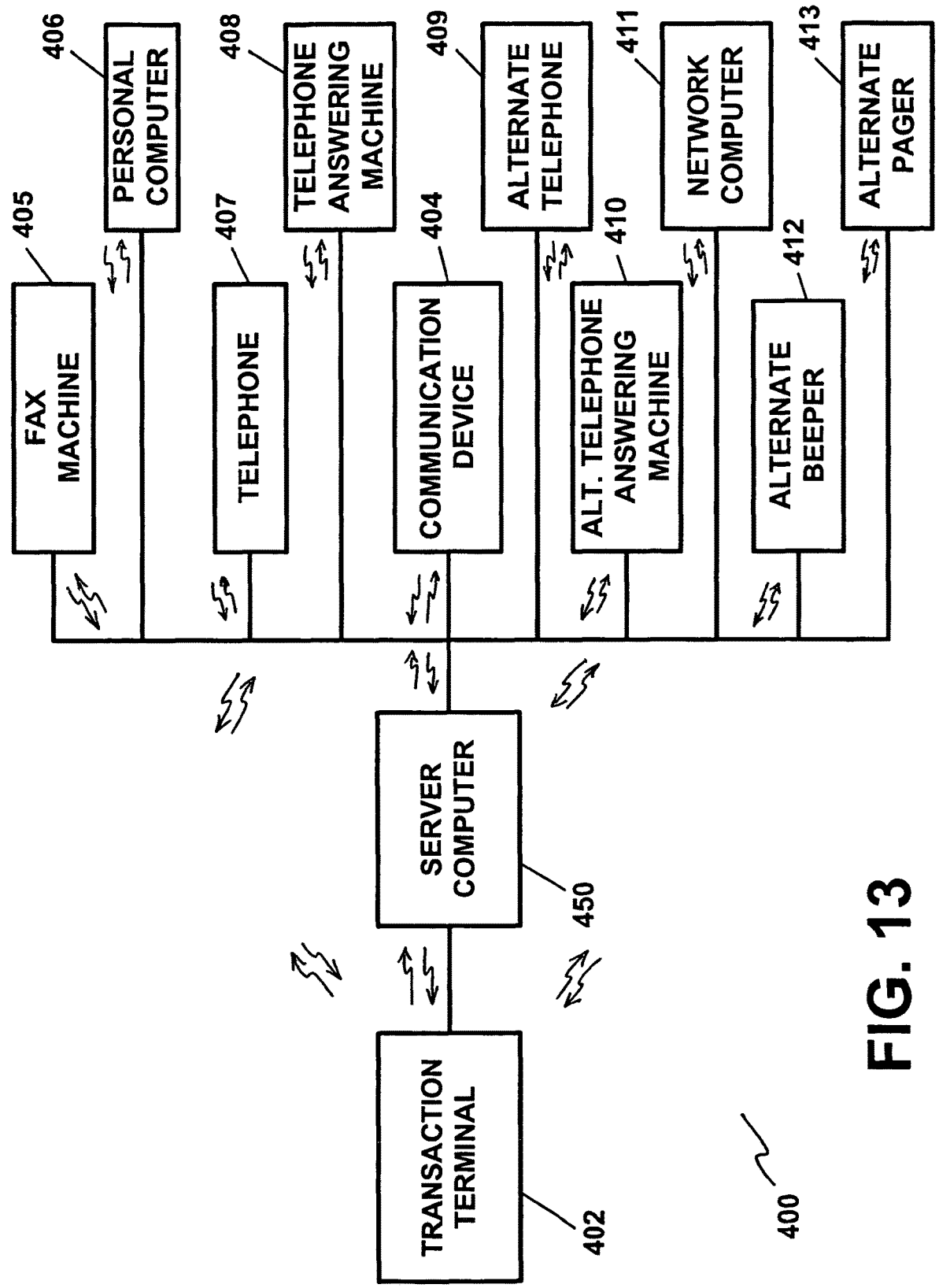
FIG. 13 illustrates yet another alternate embodiment of the present invention wherein the apparatus of the present invention is utilized on, or over, an on-line service, the Internet and/or the World Wide Web or other suitable communication network or medium.

FIG. 13 illustrates yet another alternate embodiment of the present invention wherein the apparatus and method of any of the embodiments described herein may be utilized on, or over, an on-line service, the Internet and/or the World Wide Web, and/or any other suitable communication network or medium. In FIG. 13, the apparatus, which is denoted generally by the reference numeral 400, comprises a transaction terminal 402, which may be a transaction terminal or a cellular telephone or communication device, depending upon the application, a server computer 450, which is a central processing computer for processing data and/or information in an on-line, and/or Internet and/or World Wide Web, communication environment, network, or medium.

The server computer 450 may be a mainframe computer, a mini-computer, a micro-computer, a server computer, such as those utilized in conjunction with on-line services and/or in a network environment, and/or any other suitable computer or computer system. The server computer 450, in the preferred embodiment, should have associated therewith a suitable receiver(s) or transmitter(s) which may be a fax/modem and/or any other device(s) which are well known to those skilled in the art for providing communications and/or a link with a server computer in such a network environment.

The apparatus of FIG. 13 also comprises a communications device 404 which may be or which may comprise a cellular telephone, a personal digital assistant, a wireless telephone, a home computer, a personal computer, a laptop computer, a notebook computer, a netbook computer, a television, an interactive television, a digital television, a beeper, or a pager, or any of the communication devices described herein, and/or a reply or two-way pager feature on the communication device 404, or any other communication device, or any one or more of the herein-described personal communications devices, so that the individual may access the apparatus 400, and in particular, the server computer 450, at any time and from any location. Basically, the embodiment of FIG. 13 serves to replace the central processing computer of the previously described embodiments with a server computer for utilization on, or over, an on-line service, the Internet, the World Wide Web, and/or any other suitable communications network or medium. The apparatus of FIG. 13 operates and is utilized in the same, in similar and/or an analogous, manner as described herein in conjunction with the previously described embodiments.

Figure 14:
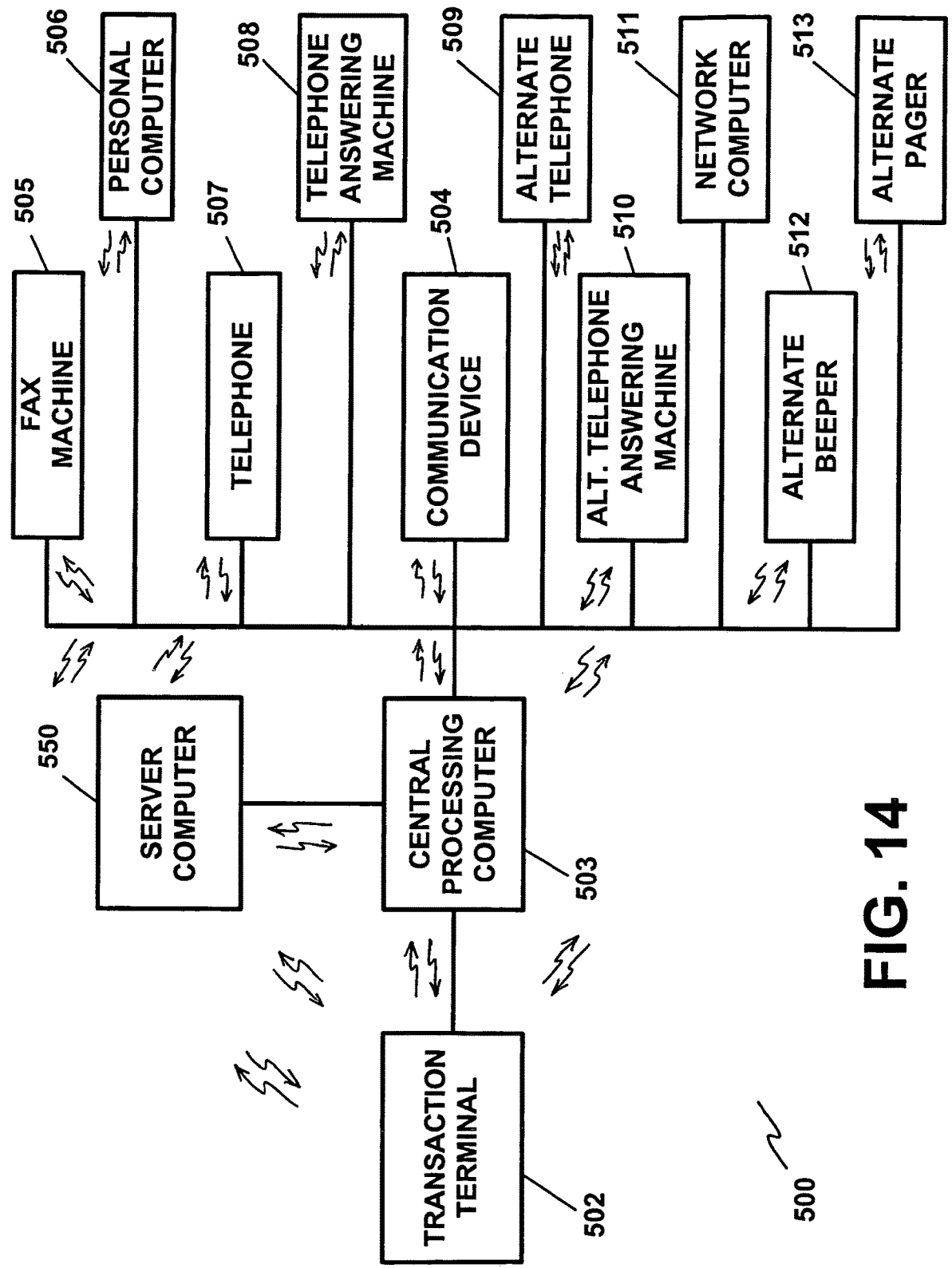
FIG. 14 illustrates yet another alternate embodiment of the present invention which is also utilized in conjunction with an on-line service and/or on, or over, the Internet and/or the World Wide Web or the suitable communication network or medium.

FIG. 14 illustrates yet another alternate embodiment of the present invention, wherein the present invention is also utilized in conjunction with an on-line service and/or on, or over, the Internet and/or the World Wide Web, and/or any other suitable communication network or medium. In FIG. 14, the apparatus, which is denoted generally by the reference numeral 500, comprises a transaction terminal 502, which may be a transaction terminal and/or a cellular telephone and/or cellular communications device, depending upon the application.

The apparatus of FIG. 14 also comprises a central processing computer 503 which provides processing and/or control over the apparatus 500 in the manner described above in conjunction with the previously described embodiments. The central processing computer 503 and/or the server computer 550 may be a mainframe computer, a mini-computer, a micro-computer, a server computer, such as those utilized in conjunction with on-line services and/or in a network environment, and/or any other suitable computer or computer system.

The apparatus 500 of FIG. 14 also comprises a communications device(s) 504 such as those described herein and in conjunction with the apparatus 400 of FIG. 13. The apparatus also comprises a server computer 550 which may either perform parallel operations and/or processing of the data and/or information which is performed and/or processed by the central processing computer 503 and/or may simply receive the data and/or information processed by the central processing computer 503. In any event, the server computer 550 provides the means by which the data and/or information, which is provided by the apparatus, can be accessed and or utilized via an on-line service and/or on, or over, the Internet and/or the World Wide Web, and/or any other communications network or medium.

The server computer 550 should have associated therewith a suitable receiver(s) or transmitter(s) which may be a fax/modem and/or any other device(s) which are well known to those skilled in the art for providing communications and/or a link with a server computer in such a network environment. The apparatus of FIG. 14 also comprises a communications device 504 which may be or which may comprise a cellular telephone, a personal digital assistant, a wireless telephone, a home computer, a personal computer, a laptop computer, a notebook computer, a netbook computer, a television, an interactive television, a digital television, a beeper, or a pager, or any of the communication devices described herein, and/or a reply or two-way pager feature on the communication device 504, or any other communication device, or any one or more of the herein-described personal communications devices, so that the individual may access the apparatus, and in particular, the server computer 550, at any time and from any location. The apparatus of FIG. 14 is utilized and/or operates in the same, a similar and/or an analogous, manner as any of the embodiments described herein.

In any and/or all of the embodiments described herein, it can be required, and the respective apparatus and/or its respective components can be so programmed, that a picture, and/or a voice sample or voice print, of the individual involved in the transaction be obtained during the transaction in order for the transaction to be allowed, approved, or authorized. In this regard, the respective apparatus and/or its respective components can be programmed to require that a picture, and/or a voice sample or voice print, be obtained from the individual involved in the transaction as a pre-requisite to transaction allowance, approval, or authorization. In this regard, any transactions in which a picture, and/or voice sample or voice print, is not obtained can be disallowed, disapproves, or not authorized.

Applicant hereby incorporates by reference herein all of the methods and/or techniques for providing information and/or data over on-line service and/or on, or over, the Internet and/or the World Wide Web, and/or any other suitable communication network or medium, along with client/server and/or Web Site technology and methods and/or techniques utilized in conjunction therewith, which are known as of the filing date of this application.

In any and/or all of the embodiments described herein, each and every one the components of the apparatus, which include, but which are not limited to, the described transaction terminals, cellular telephones and/or other cellular communications devices, central processing computers, server computers, if utilized, and any of the various communications devices, may transmit and/or receive signals and/or data, and/or be capable or transmitting and/or receiving signals and/or data, to and from any and all of the other apparatus components which may be utilized in conjunction therewith, in and for a given embodiment. In this regard, it is important to note, with respect to the embodiments of FIGS. 13 and 14, and any of the other embodiments described herein, that each and every component involved in the transmission and/or reception of signals, data and/or information may include an associated transmitter, receiver and/or suitable communication device.

The communication system or medium should provide for the transmission and/or for the reception of a multitude of remote electrical, electronic, electromagnetic, and/or other suitable signals, over long distances and/or in a mobile and/or a wireless communications environment. Telephone signals and telephone communication devices can be utilized in the present invention as well as personal computers and associated peripheral devices which may be utilized with telecommunications and/or other suitable communication systems and/or mediums.

The apparatus and method of the present invention may operate over any appropriate communications system, network and/or medium and/or other suitable communications systems, including radio signal, optical, satellite, digital, digital satellite, and/or other communications systems. The communications system utilized may operate anywhere in the electromagnetic and/or radio frequency spectrum. As noted above, the present invention may also be utilized in conjunction with a satellite communications system, in which case, the receivers and transmitters which are utilized in conjunction with the apparatus should be satellite communication receivers and transmitters, respectively. For example, the associated receiver(s) may be a satellite dish receiver(s).

In this regard, the respective cardholder, account owner, account holder, or cellular telephone owner, may utilize the apparatus and method of the present invention to its fullest capabilities over an on-line service and/or on, or over, the Internet and/or the World Wide Web, and/or any other suitable communication network or medium. In this manner, the embodiment of FIGS. 13 and 14 may allow the cardholder, account owner, account holder, or cellular telephone owner, to utilize the apparatus and/or to monitor the operation of the apparatus over the on-line service and/or on, or over, the Internet and/or the World Wide Web, and/or any other communication network or medium, from any suitable computer or device, and/or from any location.

The system receiver(s) may also be utilized in conjunction with a home and/or a personal computer and/or other personal communications device(s) and/or apparatuses which may be utilized with an associated receiver or equivalent peripheral device(s). The apparatus may also be utilized in conjunction with a computer network such as an on-line service and/or on, or over, the Internet and/or the World Wide Web, by employing any appropriate server computer and/or an associated Web Site and/or Web Site technology in conjunction with an appropriate communication medium and communication equipment.

In any of the above described embodiments, the present invention may be utilized in conjunction with any suitable communication device(s) and/or communication system(s). In this manner, the present invention may be utilized in conjunction with a telephone, a line-connected and/or a permanent telephone, a touch-tone telephone, a cordless telephone and/or a cellular or mobile telephone, a home and/or a personal computer having associated telecommunication devices or other suitable peripheral device(s), such as a modem and/or a fax/modem, and/or other suitable personal communication devices which can operate over an appropriate communications system, and/or other suitable communications systems and/or mediums, including radio signal, optical, satellite, digital, and/or other communications systems and/or mediums.

Any suitable communication system and/or medium may be utilized. Personal communication service (PCS) systems and devices, including stationary, portable and/or handheld devices, may also be utilized. Digital signal communications devices and systems may also be utilized. Televisions, interactive and/or digital televisions, personal communication devices, personal communication services (PCS) devices, personal digital assistants, cellular telephones, display telephones, video telephones, display cellular telephones and electronically equipped watches and/or other devices and/or effects and/or accessories, may also be utilized for performing user interactive control, monitoring, authorization, notification and/or security functions in conjunction with the present invention.

It should be noted that the telephone/telephone beeper or pager system, or any other communication device combination, including two-way pager systems, may be replaced with any other type of transmitter/receiver combination, electronic or otherwise, which provides for the transmission and reception of a multitude of remote electrical, electronic, electromagnetic, and/or other suitable signals, over long distances and/or in a mobile and/or a wireless communications environment. As noted above, a personal computer system which may be adapted to such operation, or a personal communication device(s) or personal communication services (PCS) device(s) may also be utilized for, or in, any of the transmitter/receiver system combinations described herein. In the preferred embodiment, the communication device 4 which is utilized is a cellular telephone, a personal digital assistant, a wireless telephone, a personal computer, a laptop computer, a notebook computer, a netbook computer, an interactive television, and/or a pager with a reply feature and/or device, or any of the other devices described-herein as being utilized as a communication device. Two-way pagers and reply pagers may also be utilized for any, or in any, of the transmitter/receiver system combinations described herein.

The communication device(s) utilized in the present invention, as well as the associated transaction terminal and/or cellular communications device(s) and/or associated central processing computer may be personal communication services (PCS) devices and/or other suitable communications devices. A television, appropriately equipped to receive and/or to transmit signals may also be utilized. It is also envisioned that digital televisions, interactive televisions, personal communications devices, personal communications services (PCS) devices, personal digital assistants, display telephones, electronically equipped watches, cellular telephones and/or display cellular telephones may also be utilized in conjunction with the present invention.

It is also important to note that the communication device(s), in any of the embodiments described herein may be a home and/or a personal computer having associated therewith an appropriate receiver(s) and transmitter(s) such as, for example, a fax/modem.

It is important to note that the telephone/telephone beeper system, described above, or any other communication device combination, may be replaced with any remote transmitter/receiver system, such as by a remote transmitter, i.e., a television-type remote control unit, which control unit would require a user interface feature and which has the capability to remotely transmit a multitude of signals over long distances to an associated receiver. In the preferred embodiment, the communication device 4 which is utilized is a cellular telephone, a personal digital assistant, a wireless telephone, a personal computer, a laptop computer, a notebook computer, a netbook computer, an interactive television, and/or a pager with a reply feature and/or device, or any of the other devices described-herein as being utilized as a communication device. A two-way pager, a reply pager, or any other appropriate two-way communication device may also be utilized. A home and/or a personal computer, a laptop computer, a notebook computer, a netbook computer, with requisite peripheral devices, a personal communication device and/or a personal communication services (PCS) device may also be utilized. Digital communications devices, interactive televisions and/or digital televisions may also be utilized. It is also envisioned that digital televisions, interactive televisions, personal communications devices, personal communications services (PCS) devices, personal digital assistants, display telephones, video telephones, electronically equipped watches and/or other effects or accessories, cellular telephones, wireless telephones, display cellular telephones, televisions, interactive televisions, or digital televisions, may also be utilized.

The apparatus of the present invention may be designed or programmed to telephone an owner, user, operator, occupant, or other authorized central office individual or other authorized individual, at a primary phone number, at an alternate or forwarding phone number and/or at a business phone number, send a beeper or pager message to the individual or central office and/or send a facsimile message, an electronic mail message, a voice mail message and/or an answering service message to, or for, the individual or central office. In this manner, the apparatus may report a theft and/or a malfunction situation to the interested individual(s) by utilizing multiple notification and/or reporting avenues and/or schemes so as to provide and ensure that the interested individual (s) are in fact notified as soon as possible. The multiple notification transmissions may be sequentially and/or simultaneously performed.

The apparatus and method of the present invention may also be programmable for programmed and/or automatic activation, self-activation, programmed and/or automatic operation and/or self-operation. The apparatus and method of the present invention may provide for an immediate, as well as for a deferred, control, monitoring and/or security function, and/or response thereto, so as to provide for the immediate and/or the deferred control, activation, de-activation, programming, monitoring and/or security, etc., of any one or more the herein described credit cards, charge cards, debit cards, currency or "smart" cards, banking and/or financial accounts and associated transaction cards, cellular telephones and/or cellular or mobile communications devices, credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other cards, devices, or accounts, and/or any other suitable application in and for which the present invention may be utilized.

In any of the herein-described embodiments, the communications devices and associated transaction terminals and/or cellular communications devices and associated central processing computers, may be devices for receiving, and transmitting, respectively, radio signals, satellite communication signals, telecommunications signals, optical communication signals and/or other signals and/or those signals, including digital signals, which are utilized in conjunction with personal communication devices and/or personal communication services (PCS) devices. The devices utilized should, however, be of the same type and/or operate compatibly with the corresponding transmitters and receivers of the apparatus of the present invention.

The present invention may also be equipped with, and be utilized in conjunction with, hardware and software necessary for providing self-monitoring functions, automatic control and/or responses to occurrences, providing automatic notice of an occurrence and/or a situation to an owner, user and/or authorized individual. In this regard, any and all of the embodiments described above may comprise a monitoring device, a triggering device and/or any other suitable device for detecting an occurrence and/or a transaction which may warrant providing notice to the respective cardholder, account owner, account holder, and/or cellular telephone owner. In this regard, the apparatus may provide for an appropriate signal, data and/or information transmission to the central processing computer, and/or server computer, if utilized. The signal, data and/or information may be conveyed in the form of a communication transmission, depending upon the communication medium utilized, a telephone call, a voice message, a beeper and/or a pager message, an electronic mail message, a fax transmission, and/or any other mode of communication which may be utilized in conjunction with any of the embodiments described herein.

The present invention, in any of the embodiments described herein, may be designed to be user-friendly. In this regard, the present invention may be menu-driven, and/or its operation may be menu-selected, from audio menus, visual menus, or both audio and visual menus.

While the present invention has been illustrated and described as being utilized in conjunction with providing notice and for obtaining authorizations with regard to transactions involving credit cards, charge cards, debit cards, and/or currency or "smart" cards, banking and/or financial accounts, and/or in conjunction with cellular and/or mobile telephones, credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other cards, devices, or accounts, it is also envisioned that the present invention may be utilized in any similar type of transactional activity, such as purchasing and/or sale activity over an on-line service, the Internet and/or the World Wide Web and/or in any other type of transaction wherein frequent notice and/or account holder authorization may be utilized to guard against theft and/or fraud and/or unauthorized transactions.

The apparatus of the present invention may be accessed at any time by the respective cardholder, account owner, account holder, and/or cellular telephone owner and/or cellular communications device owner so as to obtain information regarding activity on his or her respective account. The respective cardholder, account owner, account holder, and/or cellular telephone owner and/or cellular communications device owner, may access the apparatus and, in particular, the central processing computer, and/or the server computer, if utilized, so as to obtain transaction records regarding any transaction, group or string of transactions, transactions by goods and/or service type, transactions by dollar amount, etc.

The respective cardholder, account owner, account holder, and/or cellular telephone owner and/or cellular communications device owner, may also obtain, via the central processing computer, and/or the server computer, if utilized, periodic transaction records showing all transactions for a given week or other selected time period or interval, which may by provided weekly, bi-weekly, monthly, yearly, and/or for or at any other given and/or desired time period and/or time interval. In a preferred embodiment, for each transaction, the apparatus and method of the present invention can provide a respective cardholder, account owner, account holder, and/or cellular telephone owner and/or cellular communications device owner, with periodic transaction records showing all transactions on or involving any of the herein-described accounts, for any given time period, which may by provided weekly, bi-weekly, monthly, yearly, and/or for or at any given and/or desired time period and/or for or at any time interval or period. For each transaction, information regarding the transaction, along with an image, digital copy, photograph, or picture, of a respective document, authorization form, authorization request form, benefit request form, claim form, draft, bank draft, deposit form, withdrawal form, check, form, receipt, request form, or other entity, involved in, used in, or related to, each transaction, and/or the respective picture, photograph or image, video clip and/or and audio clip or voice print, of the individual involved in the transaction, can be provided to, or can be transmitted to, a respective cardholder, account owner, account holder, and/or cellular telephone owner and/or cellular communications device owner.

The apparatus and, in particular, the central processing computer, and/or the server computer, if utilized, may be designed and/or programmed so as to automatically and/or periodically provide and/or transmit any of the above-described account and/or transaction information to the respective cardholder, account owner, account holder, and/or cellular telephone owner and/or cellular communications device owner, by transmitting same to the respective communications device, which may be any of the devices described herein which are utilized as the communications device.

The apparatus and, in particular, the central processing computer, and/or the server computer, if utilized, may also be designed and or programmed to transmit any of the above-described account information and/or transaction information to any one or all of the respective cardholder's, account owner's, account holder's, and/or cellular telephone owner's and/or cellular communications device owner's, facsimile (fax) machine, personal computer, laptop computer, notebook computer, netbook computer, telephone, telephone answering machine, alternate telephone, alternate telephone answering machine, network computer, and/or alternate beeper or pager. Such multiple notification transmissions, if utilized, may be performed sequentially and/or simultaneously.

The central processing computer may be linked with a fax machine, a personal computer, a laptop computer, a notebook computer, a netbook computer, a telephone, an associated answering machine, an alternate telephone and associated answering machine, a network computer, and/or an alternate beeper or pager via any suitable communication system. The telecommunications link or telephone line or link, which may or may not be a wireless link, depending on the device and/or the circumstances, is utilized in order to link the central processing computer with each of the fax machine, the personal computer, the laptop computer, the notebook computer, the netbook computer, the telephone, the associated answering machine, the alternate telephone, the alternate telephone answering machine, the network computer, and/or the alternate beeper or pager.

In any of the herein-described and/or envisioned embodiments, the respective central processing computer which is utilized may comprise a plurality of computers and/or computer systems. Further, the respective central processing computer may be the processing computer for processing account information, and/or for servicing, and/or monitoring, the respective account(s) activity, and/or the central processing computer may be a separate and/or distinct computer or computer system which is associated with and/or linked with the processing computer.

In any of the herein-described and/or envisioned embodiments, the respective communication device which may be utilized may operate independently of, and/or in conjunction with, a central service and/or a communications service. For example, a beeper or pager may be utilized in conjunction with a corresponding beeper or pager communications service, which communications service may serve to relay signals, data and/or information, to, and from, the beeper or pager, whichever the case may be. The communication device which may be utilized may also be capable of transmitting signals, data and/or information, directly to, and receiving signals, data and/or information, directly from, a component(s) of the apparatus, without the need for a central service and/or a communications service and/or a relay system.

It is also envisioned that the apparatus and method of the present invention may provide for transmitting signals, data and/or information to the cardholder, account owner, accountholder, and/or cellular telephone owner, via transmissions made to, and received at a television, radio, car radio, computer and/or other communication device which receives signals transmitted via any suitable communication system. In this manner, for example, a cardholder, account owner, account holder, and/or cellular telephone owner, may be notified by having signals, data and/or information transmitted to their television, radio, car radio, computer, etc., in such a manner so as to interrupt the normal operation of same, so as to convey the information and/or message to the cardholder, account owner, account holder, and/or cellular telephone owner, in real-time and/or upon the occurrence of the event triggering or giving rise to same.

In any and/or all of the above described embodiments, the apparatus may be programmed and/or be programmable by the respective cardholder, account owner, account holder, and/or cellular telephone, owner or cellular device owner, for his or her account. In conjunction with the use of credit cards, charge cards, debit cards, the cardholder may program the central processing computer, and/or the server computer, if utilized, so as to change the credit limits on his or her account, periodically and/or at any desired time. For example, a cardholder having a credit card with a $10,000.00 dollar credit limit, but who very seldom utilizes his or her card for much more than $500.00 dollars during a monthly billing period, may program the apparatus and, in particular, the central processing computer, or server computer, if utilized, so as to temporarily reduce his or her credit limit.

If the cardholder should then desire to make a major purchase with his or her credit card of, for example, a purchase in the amount of $8500.00, the cardholder may, prior to the transaction, reprogram the central processing computer and/or server computer, if utilized, so as to temporarily increase his or her temporary credit limit. The apparatus may then be programmed so that, after the major purchase has been made, the apparatus may revert operation back to the reduced credit limit.

The cardholder may program the central processing computer, and/or the server computer, if utilized, via the communication device, which may be any one or more of the devices described herein. The cardholder may also perform the above-described programming via a touch-tone telephone. In the same manner, the cardholder may program the apparatus so as to limit the types of transactions involving, and/or the goods and/or services which may be purchased with, his or her card, and/or the stores and/or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage. In a similar manner, the cardholder may similarly program the apparatus as described above in conjunction with use of any of the hereindescribed cards.

In a similar manner, a cardholder of a currency and/or "smart" card may program the apparatus so as to limit the types of transactions involving, and/or the goods and/or services which may be purchased with, his or her card, and/or the stores or service providers which may be authorized to accept the card, limits on the dollar amounts of transactions pertaining to each authorized vendor, seller and/or service provider, daily spending limits, the vendors, sellers, and/or service providers with which the card may be utilized, the geographical area or location within which the card may be utilized, and/or authorized times for card usage (i.e. specific days, dates, times of day, times of month, year, etc.), and/or any other limitations and/or restrictions regarding amount of transaction, parties involved, geographical area, and or times of allowed usage.

In the case of savings accounts, checking accounts, and/or automated teller machine accounts, the account owner or account holder may program the apparatus and, in particular, the central processing computer, and/or the server computer, if utilized, so as to limit the amount of any one transaction or transactions, individuals who may make the transactions, proof of identity of which the types of proof may be specified, specific banks and/or financial institutions authorized to accept and/or perform transactions for the account, geographical areas and/or location within which banks and/or financial institutions may be authorized to accept and/or perform transactions with the account, specific times of day, specific days, dates and/or time of the month in, or on, which transactions may be authorized, limits of charge-backs, returned item amount withdrawals, maintenance and/or other fee charge withdrawals, etc. and/or authorized times for account usage (i.e. specific days, dates, times of day, times of month, year, etc.), and/or any other limitations and/or restrictions regarding amount of transaction, parties involved, geographical area, and or times of allowed usage.

With regards to automated teller machine accounts, it is also possible to specify and programmably change personal identification numbers and/or any other access code(s) and provide for various personal identification numbers and/or access codes for different locations, different automated teller machines, different days, different times and/or different transaction amounts.

In the cases of cellular telephones and/or cellular communications devices, the cellular telephone owner and/or cellular communication device owner may program the apparatus and, in particular, the central processing computer, and/or the server computer, if utilized, so as to limit the phone numbers which may be called, and/or the numbers from which incoming calls may be accepted and/or received, the geographical areas and/or locations which may be called and/or accessed or from which calls may be received, the times of day, specific days, dates, times of month or year, during which the cellular telephone and/or cellular communication device may be utilized, specific phone numbers which may be called, specific time durations for a phone call and/or any authorized times for cellular telephone and/or cellular communication device usage (i.e. specific days, dates, times of day, times of month, year, etc.), and/or any other limitations and/or restrictions, regarding amount of transaction, parties involved, geographical area, and or times of allowed usage.

In the cases of credit card accounts, credit accounts, charge card accounts, charge accounts, debit card accounts, debit accounts, bank accounts, checking accounts, savings accounts, brokerage accounts, pension accounts, individual retirement accounts (IRAs), self-employed pension (SEP) accounts, "smart card accounts, currency card accounts, healthcare accounts, Medicare accounts, Medicaid accounts, employee benefits accounts, cafeteria accounts, spending accounts, subscription accounts for any goods, products, or services, insurance accounts, healthcare insurance accounts, healthcare spending accounts, life insurance accounts, disability insurance accounts, tuition accounts, pharmacy accounts, credit report accounts, cable television accounts, digital television accounts, satellite television accounts, social security accounts, liability insurance accounts, lease insurance accounts, ticket accounts, telephone calling card accounts, utility accounts, electrical utility accounts, gas utility accounts, fuel oil utility accounts, accounts monitoring use of official seals, accounts monitoring use of private, individual, and/or organizational, seals or access codes, security access accounts, computer access code accounts, facility access accounts, facility security accounts, financial accounts, electronic money accounts, electronic cash accounts, communication accounts, telephone accounts, wireless communication device accounts, non-wireless communication device accounts, cellular communication device accounts, cellular telephone accounts, Internet accounts, Internet service provider accounts, electronic signature accounts, e-mail accounts, membership accounts, club membership accounts, entertainment membership accounts, entertainment tickets accounts, sports tickets accounts, theatre tickets accounts, concert or opera tickets accounts, consumer or purchaser memberships accounts, sports club membership accounts, health club membership accounts, merchant credit accounts for customers, merchant accounts, association membership accounts, professional association membership accounts, trade association membership accounts, or any other cards, devices, or any other accounts, the account holder may program the central processing computer, and/or the server computer, if utilized, via the communication device, which may be any one or more of the devices described herein. The account holder may also perform the above-described programming via a touch-tone telephone.

In the same manner, the account holder may program the apparatus so as to limit the types of transactions involving, and/or the goods and/or services which may be purchased with or on, his or her account, and/or the stores and/or service providers which may be authorized to engage in transaction on or involving the account, limits on the dollar amounts of transactions pertaining to each authorized account servicing entity or provider, daily account spending limits, the geographical area or location within which the account may be utilized, and/or authorized times for account usage (i.e. specific days, dates, times of day, times of month, year, etc.), and/or any other limitations and/or restrictions regarding amount of transaction, parties involved, geographical area, and or times of allowed usage.

In a similar manner, the account holder may similarly program the apparatus as described above in conjunction with use of any of the herein-described cards associated with an account.

In a similar manner, an account holder may program the apparatus so as to limit the types of transactions involving, and/or the goods and/or services which may be purchased with, his or her account, the types of claims or requests which can be made pursuant to the account, authorized account service providers or account servicing entities who can engage in transactions on or involving the account. The account holder may also program the apparatus and, in particular, the central processing computer, and/or the server computer, if utilized, so as to limit the amount of any one transaction or transactions, individuals who may make the transactions, proof of identity of which the types of proof may be specified, providers authorized to accept and/or perform transactions for, on, or involving, the account.

The account holder can also programmably change, for the account, personal identification numbers and/or any other access code(s) and/or provide for various personal identification numbers and/or access codes for different locations, different providers, different types of claims or requests, different days, different times, and/or different transaction amounts.

The account holder may also program the apparatus and, in particular, the central processing computer, and/or the server computer, if utilized, in order to provider any other limitation or restriction on the use of any of the herein-described accounts, or the use of any cards associated with any of the herein-described accounts, in order to impose any kind or type of limitation or restriction on the use of the account.

The present invention may also be utilized so as to provide financial transaction and/or wireless communication device authorization, notification, and/or security, for any number and/or types of accounts, including credit card accounts, charge card accounts, debit card accounts, currency or "smart" card accounts, and/or other transaction card accounts, savings accounts, checking accounts, automated teller machine accounts, cellular telephone accounts and/or cellular communication device accounts. In this manner, the apparatus may comprise a communication device or communications devices which may receive and/or transmit signals, data and/or information, for any number and/or types of the above accounts, and/or for each of the respective accounts utilized, from and to the respective central processing computer and/or central processing computers for the respective accounts. In this manner, an individual may utilize a single communication device so as to monitor all of his or her accounts and/or types of accounts.

The apparatus and method of the present invention provides for the real-time notification of financial transactions involving credit cards, charge cards, debit cards, and/or currency or "smart" cards, which enables a cardholder to monitor, in real-time, activity involving his or her card(s) and the corresponding accounts. The apparatus and method of the present invention also provides a means and a mechanism by which to inform a cardholder that his or her card(s) are lost, stolen, or is being utilized in an unauthorized manner and provides an indication to the cardholder of when and where his or her card(s) is being utilized in transactions. The cardholder may then report the card lost or stolen and/or cancel and/or de-activate the card. The apparatus and method of the present invention provides the same, and/or analogous, features and/or functions for banking and/or financial accounts, brokerage accounts, and/or for cellular telephone accounts.

While the communications device(s) described above are described, in each of the respective embodiments, as being utilized for specific uses (i.e. credit and other cards transactions, banking and/or financial transactions, and/or cellular telephone transactions, the communication device(s) may also be adapted and/or programmed for use in all of these aforementioned transactions so that an individual may utilize a single communication device for all of the above described and/or envisioned transaction types.

In any and/or all of the embodiments described herein, any of the data, information, images, digital copies, photographs, pictures, videos, or voice prints, described herein, can be stored in, maintained in, and retrieved from and/or via, any of the respective point-of-sale terminals or devices, transaction terminals or devices, devices, transaction devices, cellular telephones, central processing computers, server computers, or communication devices, described herein, or in any other device or computer described herein as being used in connection with any of the herein-described, or other, embodiments of the apparatus and methods of present invention.

It is envisioned that the apparatus and method of the present invention may be utilized in conjunction with other apparatuses and methods in the prior art, and that the present invention may be incorporated with these known apparatuses and methods so as to improve upon them and so as to find additional applications for the present invention.

Applicant hereby incorporates by reference herein the subject matter and teachings of U.S. Provisional Patent Application Ser. No. 60/701,770, filed Jul. 22, 2005, and entitled "TRANSACTION SECURITY APPARATUS AND METHOD", in its entirety.

Applicant hereby incorporates by reference herein the following United States Patents: U.S. Pat. No. 5,173,594 which teaches a system for printing personalized charge-card service receipts at remote locations; U.S. Pat. No. 5,479,510 which teaches an automated data card payment verification method; U.S. Pat. No. 5,473,667 which teaches a paging system with third party authorization; U.S. Pat. No. 3,723,655 which teaches a credit authorization terminal; U.S. Pat. No. 5,485,510 which teaches a secure credit/debit card authorization; U.S. Pat. No. 5,406,619 which teaches a universal authentication device for use over telephone lines; U.S. Pat. No. 5,444,616 which teaches financial transaction systems and methods utilizing a multi-reader transaction terminal; U.S. Pat. No. 5,513,250 which teaches telephone based credit card protection; U.S. Pat. No. 4,485,300 which teaches a loss control system; U.S. Pat. No. 4,758,714 which teaches a point-of-sale mechanism; U.S. Pat. No. 4,947,027 which teaches a system for identifying authorized use of credit cards; U.S. Pat. No. 5,357,563 which teaches a data card terminal for receiving authorizations from remote locations; U.S. Pat. No. 5,444,763 which teaches a translation and connection device for radio frequency point of sale transaction system; U.S. Pat. No. 5,243,645 which teaches an automatic system for forwarding of calls; and U.S. Pat. No. 3,938,090 which teaches a terminal apparatus.

While the present invention has been described and illustrated in various preferred and alternate embodiments, such descriptions are merely illustrative of the present invention and are not to be construed to be limitations thereof. In this regard, the present invention encompasses any and all modifications, variations, and/or alternate embodiments, with the scope of the present invention being limited only by the claims which follow.

What is claimed is:

1. An apparatus, comprising:
   a transaction terminal, further comprising:
      an input device or a receiver, wherein the input device inputs or the receiver receives information regarding an account and transaction information regarding a transaction on or involving the account;
      a camera or a video recording device, wherein the camera or the video recording device obtains or records a photograph or a video clip of an individual involved in the transaction;
   a processor, wherein the processor processes the transaction information; and
   a computer, further comprising:
      a database, wherein the database stores information regarding the transaction and the photograph or the video clip of the individual involved in the transaction,
      wherein the information regarding the transaction and the photograph or the video clip of the individual involved in the transaction is transmitted to a communication device independently of any processing of the transaction by a transaction authorization processing computer.

2. The apparatus of claim 1, wherein the camera of the video recording device is located on the transaction terminal.

3. The apparatus of claim 2, wherein the transaction terminal further comprises:
a microphone or an audio recording device, wherein the microphone or the audio recording device is located on the transaction terminal, and further wherein the microphone or the audio recording device obtains or records an audio clip of the individual involved in the transaction, and further wherein the apparatus transmits the audio clip to the communication device.

4. The apparatus of claim 2, wherein the transaction terminal is an automated teller machine (ATM) terminal.

5. The apparatus of claim 2, wherein the transaction terminal is a teller terminal.

6. The apparatus of claim 2, wherein the photograph or the video clip of the individual involved in the transaction is transmitted to the communication device as or in a notification message.

7. The apparatus of claim 2, further comprising:
a scanner, wherein the scanner obtains a copy of a document, an authorization form, an authorization request form, a draft, a bank draft, a deposit form, a withdrawal form, a check, a receipt, or a request form, offered, presented, submitted, processed, involved, or used, in the transaction on or involving the account, and further wherein the apparatus stores information regarding an image, a digital copy, a photograph, or a picture, of the document, the authorization form, the authorization request form, the draft, the bank draft, the deposit form, the withdrawal form, the check, the receipt, or the request form, offered, presented, submitted, processed, involved, or used, in the transaction on or involving the account, and further wherein the image, the digital copy, the photograph, or the picture, of the document, the authorization form, the authorization request form, the draft, the bank draft, the deposit form, the withdrawal form, the check, the receipt, or the request form, offered, presented, submitted, processed, involved, or used, in the transaction on or involving the account is transmitted to the communication device.

8. The apparatus of claim 2, wherein the communication device is associated with an individual account holder.

9. An apparatus, comprising:
a camera or a video recording device, wherein the camera or the video recording device obtains or records a photograph or a video clip of an individual involved in a transaction;
a processing device, wherein the processing device processes information regarding the transaction and generates a notification message, wherein the notification message contains information regarding the transaction; and
a transmitter, wherein the transmitter transmits the notification message to a communication device, wherein the notification message is transmitted to the communication device independently of any processing of the transaction by a transaction authorization processing computer, wherein the apparatus transmits the photograph or the video clip, or wherein the photograph or the video clip is transmitted, to the communication device independently of any processing of the transaction by the transaction authorization processing computer.

10. The apparatus of claim 9, wherein the communication device is associated with an individual account holder, and further wherein the individual account holder is associated with an account involved in the transaction.

11. The apparatus of claim 9, wherein the camera or video recording device is located on the apparatus.

12. The apparatus of claims 11, wherein the apparatus is an automated teller machine (ATM) terminal.

13. The apparatus of claim 11, wherein the apparatus is a point-of-sale terminal.

14. An apparatus, comprising:
a camera or a video recording device, wherein the camera or the video recording device obtains or records a photograph or a video clip of an individual involved in a transaction on or involving an account;
a processing device, wherein the processing device processes information regarding the transaction, and further wherein the processing device generates a notification message, wherein the notification message contains information regarding the transaction; and
a transmitter, wherein the transmitter transmits the notification message to a communication device, wherein the notification message is transmitted to the communication device independently of any processing of the transaction by a transaction authorization processing computer,
wherein the apparatus is specially programmed to transmit the photograph or the video clip to the communication device associated with the account holder independently of any processing of the transaction by the transaction authorization processing computer.

15. An apparatus, comprising:
a camera or a video recording device for obtaining a photograph, a picture, or a video clip, of an individual involved in a transaction on an account;
an input device for inputting transaction information regarding the transaction or a receiver for receiving transaction information regarding the transaction;
a processing device, wherein the processing device processes information regarding the transaction and generates a message, wherein the message contains information regarding the transaction; and
a transmitter, wherein the transmitter transmits the message to a communication device, and further wherein the message is transmitted to the communication device independently of any processing of the transaction by a transaction authorization processing computer, wherein the apparatus transmits the photograph, the picture, or the video clip, to the communication device, wherein the photograph, the picture, or the video clip, is transmitted to the communication device independently of any processing of the transaction by the transaction authorization processing computer.

16. An apparatus, comprising:
an input device or a receiver, wherein the input device inputs, or the receiver receives, transaction information regarding a transaction on an account;
a camera or a video recording device for obtaining a photograph, a picture, or a video clip, of an individual involved in the transaction;
a processing device, wherein the processing device processes information regarding the transaction and generates a notification message, wherein the notification message contains information regarding the transaction; and a transmitter, wherein the transmitter transmits the notification message to a communication device, and further wherein the notification message is transmitted to the communication device independently of any processing of the transaction by a transaction authorization processing computer, wherein the apparatus transmits the photograph, the picture, or the video clip, to the communication device, wherein the photograph, the picture, or the video clip, is transmitted to the communication device independently of any processing of the transaction by the transaction authorization processing computer.

17. An apparatus, comprising:

an input device for inputting or entering, or a receiver for receiving, information regarding a transaction on or involving an account or involving an individual;

a camera or a video recording device for obtaining or recording a photograph, a picture, or a video clip, of the individual;

a processing device for processing the information regarding the transaction, wherein the processing device is adapted for generating a notification message containing information regarding the transaction; and a transmitter for transmitting the notification message to a communication device independently of any processing of the transaction by a transaction authorization processing computer, wherein the transmitter or the apparatus is specially configured or adapted to transmit the photograph, the picture, or the video clip, to the communication device independently of any processing of the transaction by the transaction authorization processing computer.

18. A computer-implemented method, comprising:

inputting, via an input device, or receiving, via or with a receiver, transaction information regarding a transaction on an account involving an individual;

obtaining a photograph, a picture, or a video clip, of the individual with a camera or a video recording device;

processing, with a processing device or with a computer, information regarding the transaction;

generating, with the processing device or with the computer, a message, wherein the message contains information regarding the transaction;

transmitting the message, with or from a transmitter or with or from the computer, to a communication device, wherein the message is transmitted to the communication device independently of any processing of the transaction by a transaction authorization processing computer; and transmitting the photograph, the picture, or the video clip, to the communication device independently of any processing of the transaction by the transaction authorization processing computer.

19. An apparatus, comprising:

an input device or a receiver, wherein the input device inputs, or the receiver receives, transaction information regarding a transaction on or involving an account;

a camera or a video recording device, wherein the camera or the video recording device obtains or records a photograph or a video clip of an individual involved in the transaction;

a microphone or an audio recording device, wherein the microphone or the audio recording device obtains or records an audio clip of the individual involved in the transaction;

a processing device, wherein the processing device processes the information regarding the transaction and generates a notification message, wherein the notification message contains information regarding the transaction; and a transmitter, wherein the apparatus transmits the notification message to a communication device, and further wherein the notification message is transmitted to the communication device independently of any processing of the transaction by a transaction authorization processing computer, wherein the apparatus is specially programmed to transmit the photograph, the video clip, or the audio clip, to the communication device independently of any processing of the transaction by the transaction authorization processing computer.

20. A computer-implemented method, comprising:

inputting, entering, or receiving, with or using an input device or a receiver, information regarding an account an transaction information regarding a transaction on or involving the account;

obtaining or recording, with or using a camera or a video recording device, a photograph or a video clip of an individual involved in the transaction;

processing, with or using a processor, the transaction information;

storing, in a database, information regarding the transaction and the photograph or the video clip of the individual involved in the transaction, and transmitting the information regarding the transaction and the photograph or the video clip of the individual involved in the transaction to a communication device independently of any processing of the transaction by a transaction authorization processing computer.

* * * * *